(12) United States Patent
Maeda et al.

(10) Patent No.: US 8,161,225 B2
(45) Date of Patent: Apr. 17, 2012

(54) SEMICONDUCTOR MEMORY CARD, ACCESS DEVICE AND METHOD

(75) Inventors: Takuji Maeda, Osaka (JP); Shinji Inoue, Osaka (JP); Yoshiho Gotoh, Osaka (JP); Jun Ohara, Ehime (JP); Masahiro Nakanishi, Kyoto (JP); Shoichi Tsujita, Kyoto (JP); Tomoaki Izumi, Osaka (JP); Tetsushi Kasahara, Osaka (JP); Kazuaki Tamura, Osaka (JP); Kiminori Matsuno, Osaka (JP); Koichi Horiuchi, Nara (JP); Manabu Inoue, Osaka (JP); Makoto Ochi, Osaka (JP)

(73) Assignee: Panasonic Corporation, Osaka (JP)

( * ) Notice: Subject to any disclaimer, the term of this patent is extended or adjusted under 35 U.S.C. 154(b) by 914 days.

(21) Appl. No.: 10/567,241

(22) PCT Filed: Aug. 3, 2004

(86) PCT No.: PCT/JP2004/011427
§ 371 (c)(1),
(2), (4) Date: Jan. 4, 2007

(87) PCT Pub. No.: WO2005/015406
PCT Pub. Date: Feb. 17, 2005

(65) Prior Publication Data
US 2007/0183179 A1 Aug. 9, 2007

(30) Foreign Application Priority Data

Aug. 6, 2003 (JP) .................................. 2003-287914
Sep. 18, 2003 (JP) .................................. 2003-325811

(51) Int. Cl.
*G06F 12/00* (2006.01)
*G06F 13/00* (2006.01)
*G06F 13/28* (2006.01)

(52) U.S. Cl. ......................... 711/103; 711/163; 711/170
(58) Field of Classification Search .................. 711/103, 711/154, 163, 170
See application file for complete search history.

(56) References Cited

U.S. PATENT DOCUMENTS 5,329,491 A   7/1994  Brown et al.
5,434,618 A   7/1995  Hayashi et al.
(Continued)

FOREIGN PATENT DOCUMENTS

JP   63-228281 A   9/1988
(Continued)

OTHER PUBLICATIONS

"Information Technology—Volume and File Structure of Disk Cartridges for Information Interchange", Nov. 1994, pp. 1-40, second edition, ISO/IEC 9293, ISO/IEC, Switzerland.

(Continued)

*Primary Examiner* — Jared Rutz
*Assistant Examiner* — Ryan Bertram
(74) *Attorney, Agent, or Firm* — Greenblum & Bernstein, P.L.C.

(57) ABSTRACT

A card information-storing portion is provided in a semiconductor memory card, and information relating to access performance such as access condition and access rate is held in the storing portion. Further, an access device acquires the held information from the semiconductor memory card to make it possible that the information can be used for control of a file system. This optimizes processing of the access device and the semiconductor memory card independent of differences in characteristics of semiconductor memory cards and management methods used, realizing high-rate access from the access device to a semiconductor memory card.

24 Claims, 47 Drawing Sheets

U.S. PATENT DOCUMENTS

| | | |
|---|---|---|
| 6,094,693 A | 7/2000 | Haneda |
| 6,438,086 B1 | 8/2002 | Haneda |
| 6,766,417 B1 | 7/2004 | Tanaka et al. |
| 2002/0031349 A1 | 3/2002 | Hayashi |
| 2003/0026030 A1 | 2/2003 | Koizumi et al. |
| 2005/0080985 A1 | 4/2005 | Sasaki |

FOREIGN PATENT DOCUMENTS

| | | |
|---|---|---|
| JP | 64-76316 A | 3/1989 |
| JP | 6-350907 A | 12/1994 |
| JP | 7-28968 A | 1/1995 |
| JP | 7-320018 A | 12/1995 |
| JP | 10-69420 A | 3/1998 |
| JP | 2000-122923 A | 4/2000 |
| JP | 2001-36904 A | 2/2001 |
| JP | 2001-184257 A | 7/2001 |
| JP | 2001-231001 A | 8/2001 |
| JP | 2001-245249 A | 9/2001 |
| JP | 2001-29101 A | 1/2002 |
| JP | 2002-91806 A | 3/2002 |
| JP | 2003-308240 A | 10/2003 |
| WO | 00/49537 A | 8/2000 |
| WO | WO 03088044 A1 * | 10/2003 |

OTHER PUBLICATIONS

"OSTA Universal Disk Format Specification", Feb. 1997, pp. 1-112, revision 1.50, Optical Storage Technology Association, Santa Barbara, USA.

* cited by examiner

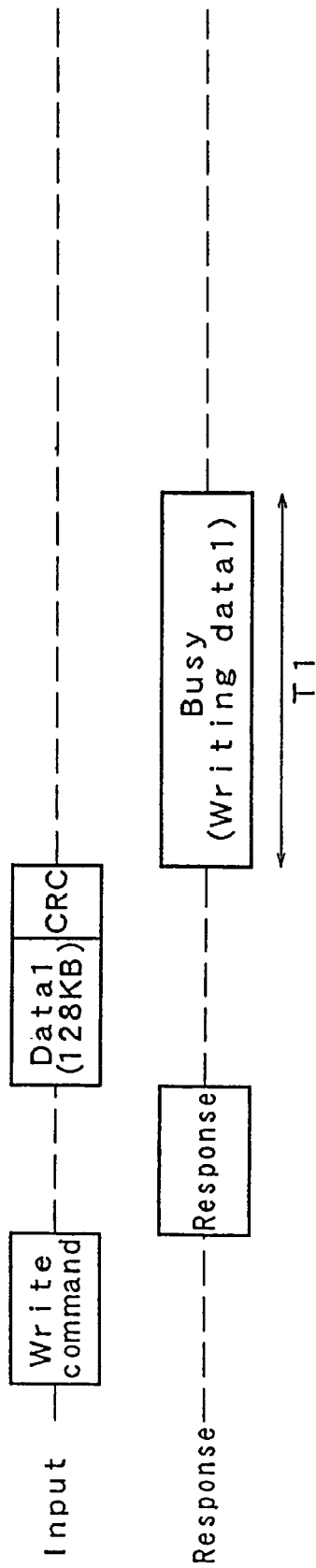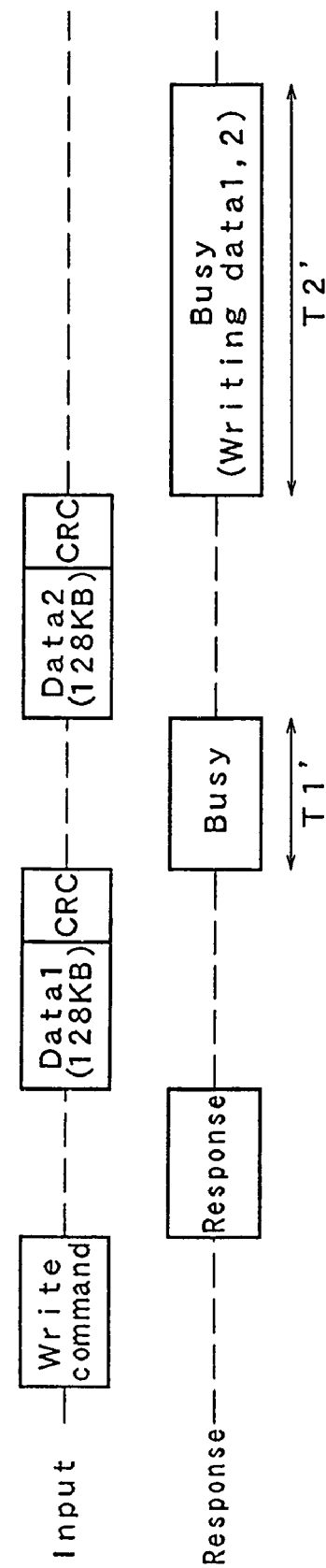

FIG. 7

| Types | Items |
|---|---|
| First info. | Memory type |
| | The number of memories |
| | Management method of memory |
| | Erase block size |
| | Management block size |
| | Temperature condition |
| | Power consumption |
| | Current value |
| | Voltage value |
| | Card type |
| Second info. | Process type |
| | Process unit size |
| | Process unit boundary |
| | Process unit time |
| | Access method |
| | Min. sequential area at S.A. |
| | Input clock frequency |
| | Bit width |
| Third info. | Rate performance level |
| | Data size/Unit time |
| | Process time/Unit size |
| | Transfer rate |
| | Process time inside card |
| Fourth info. | Error occurrence probability |
| | Worst value of error notification time |
| Fifth info. | Rate performance level determination ref. |
| | Rate performance level |
| | Power consumption level |

F I G. 8
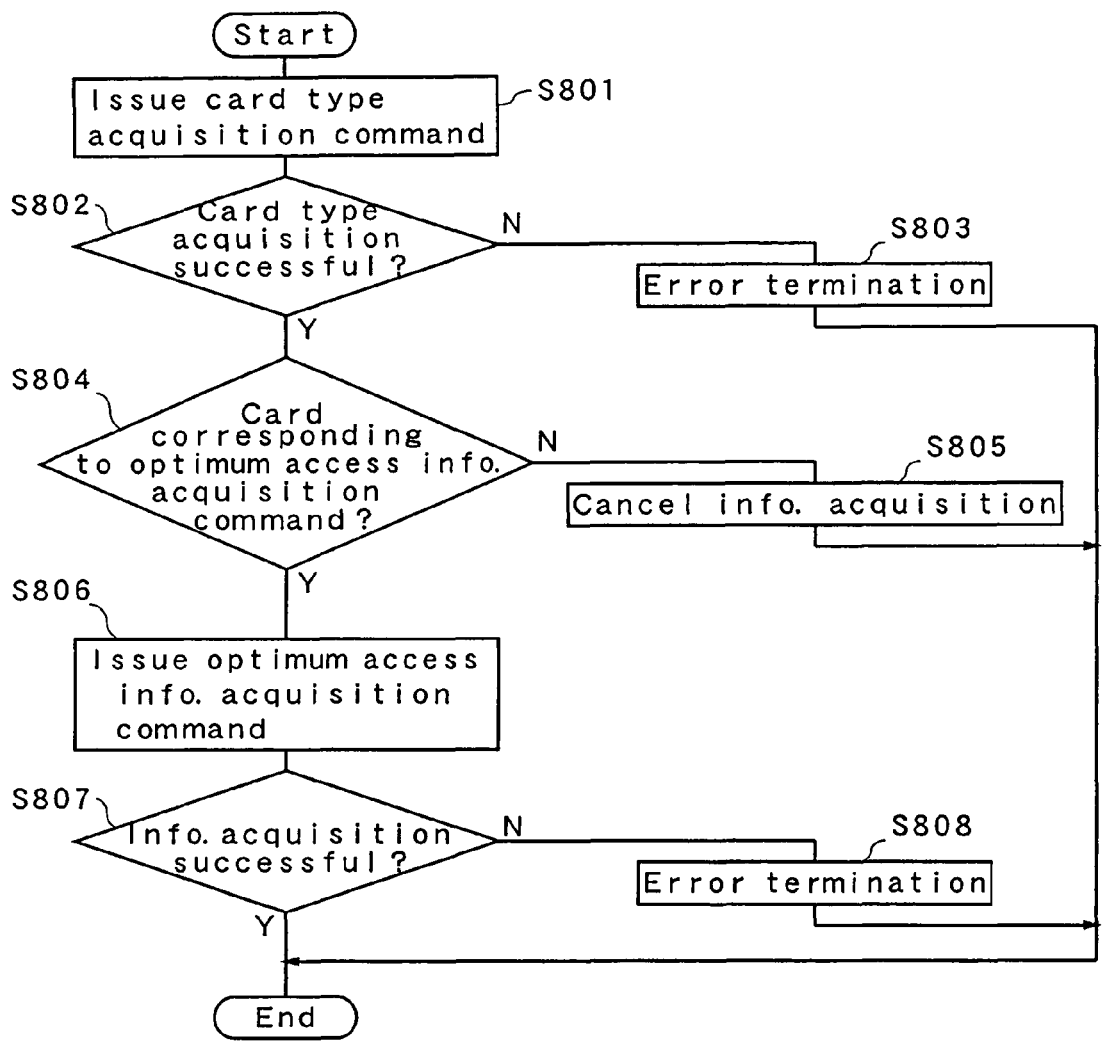

FIG. 11A

| Items | Condition values |
|---|---|
| Process unit size | Multiple length of 128 KB |
| Process unit boundary | Multiple length of 128 KB |
| Access method | Sequentially accessing to sequential area having 256 KB over |
| Input clock frequency | 25 MHz over |
| Bit width | 4 bits |

FIG. 11B

| |
|---|
| Transfer rate of reading(standard) = 11 MB/s |
| Transfer rate of writing(standard) = 10 MB/s |
| Transfer rate of erasing(standard) = 10.3 MB/s |
| Transfer rate of reading(worst) = 6 MB/s |
| Transfer rate of writing(worst) = 5 MB/s |
| Transfer rate of erasing(worst) = 5.1 MB/s |

| Items | Condition values |
|---|---|
| Process unit size | 128 KB |
| Process unit boundary | 128 KB |
| Access method | Sequentially accessing to sequential area having 256 KB |
| Input clock frequency | 25 MHz |
| Bit width | 4 bits |

(b)

| |
|---|
| Transfer rate of reading(standard) = 11 MB/s |
| Transfer rate of writing(standard) = 10 MB/s |
| Transfer rate of erasing(standard) = 10.3 MB/s |
| Transfer rate of reading(worst) = 6 MB/s |
| Transfer rate of writing(worst) = 5 MB/s |
| Transfer rate of erasing(worst) = 5.1 MB/s |

FIG. 19A

| | | Process contents | | |
|---|---|---|---|---|
| | | Reading | Writing | Erasing |
| Rate performance level | High | Standard trans. rate >=8.0MB/s | Standard trans. rate >=8.0MB/s | Standard trans. rate >=8.0MB/s |
| | Medium | 4.0MB/s<= Standard trans. rate <8.0MB/s | 4.0MB/s<= Standard trans. rate <8.0MB/s | 4.0MB/s<= Standard trans. rate <8.0MB/s |
| | Low | Standard trans. rate <4.0MB/s | Standard trans. rate <4.0MB/s | Standard trans. rate <4.0MB/s |

FIG. 19B

| Transfer rate | Rate performance level |
|---|---|
| Transfer rate of reading(standard) = 11 MB/s | High |
| Transfer rate of writing(standard) = 10 MB/s | High |
| Transfer rate of erasing(standard) = 10.3 MB/s | High |
| Transfer rate of reading(worst) = 6 MB/s | High |
| Transfer rate of writing(worst) = 5 MB/s | High |
| Transfer rate of erasing(worst) = 5.1 MB/s | High |

FIG. 23A

| Process contents | | |
|---|---|---|
| Reading | Writing | Erasing |
| Table 1-A | Table 1-B | Table 1-C |

APBIL

FIG. 23B

| Process unit size | Standard value | | | | Worst value | | | |
|---|---|---|---|---|---|---|---|---|
| | SA | | RA | | SA | | RA | |
| 512 Bytes | 17 ms | | 25 ms | | 25 ms | | 51 ms | |
| 16 KB | 43 μs | | 690 μs | | 128 μs | | 1.6 ms | |
| 128 KB | 9.2 μs | | 22 μs | | 60 μs | | 86 μs | |
| 256 KB | 9.2 μs | | 22 μs | | 60 μs | | 86 μs | |
| 1 MB | 9.2 μs | | 22 μs | | 60 μs | | 86 μs | |

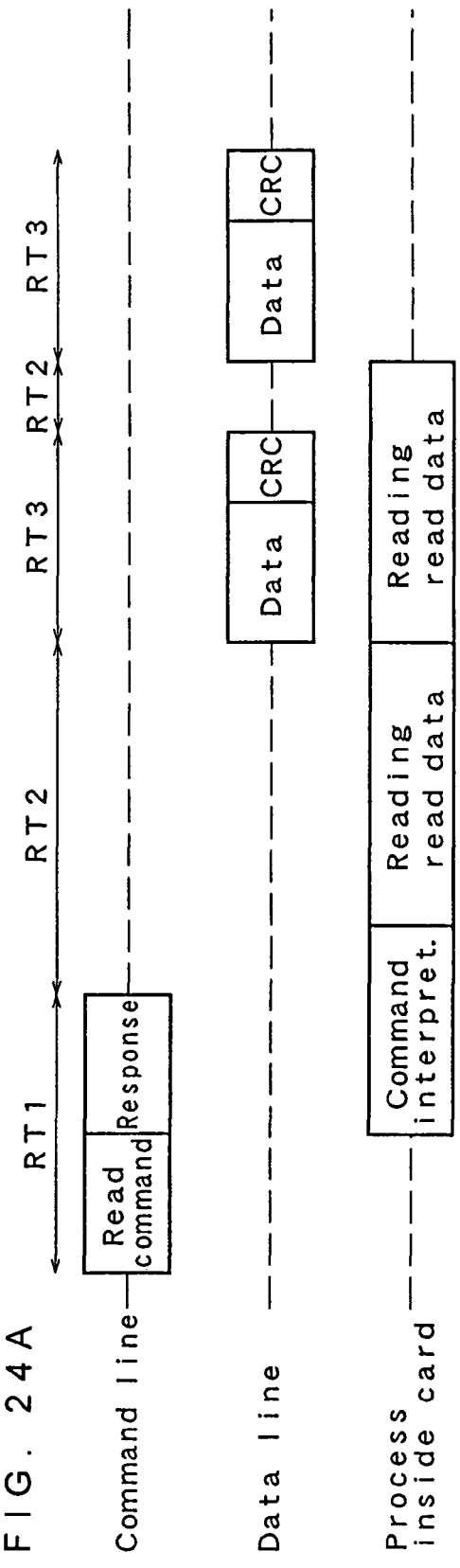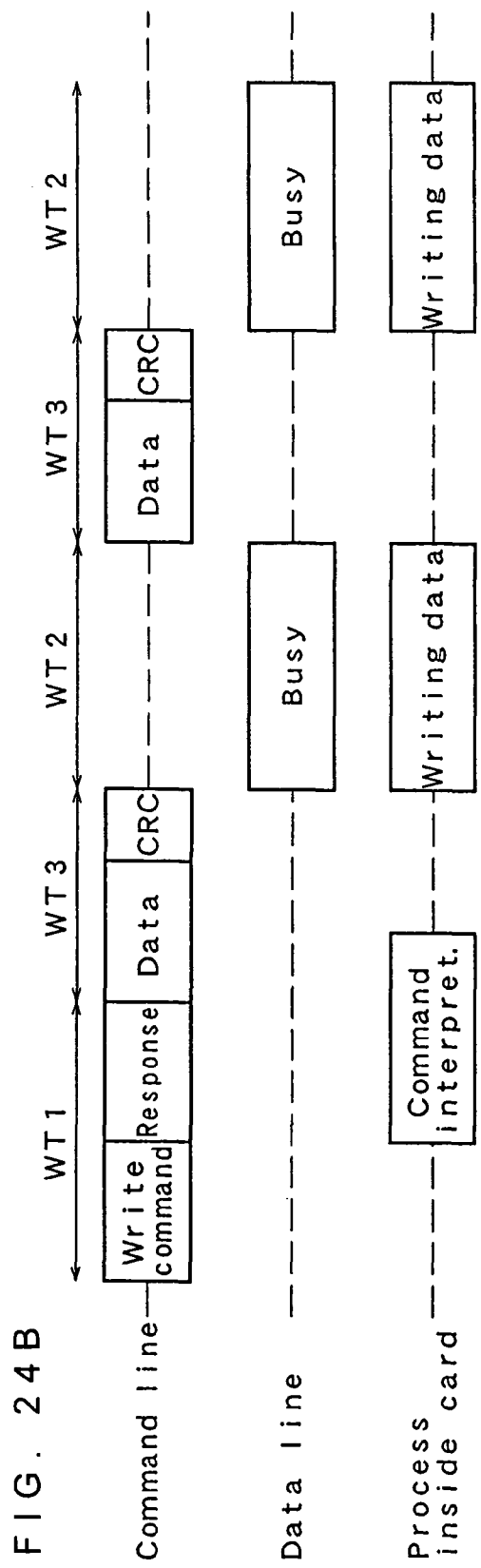

FIG. 26A

| Input clock | Process contents | | |
|---|---|---|---|
| | Reading | Writing | Erasing |
| 12.5 MHz | Table 1-A | Table 1-B | Table 1-C |
| 25 MHz | Table 2-A | Table 2-B | Table 2-C |
| 50 MHz | Table 3-A | Table 3-B | Table 3-C |

FIG. 26B

| Process unit size | Standard value | | Worst value | |
|---|---|---|---|---|
| | SA | RA | SA | RA |
| 512 Bytes | 0.03 MB/s | 0.02 MB/s | 0.02 MB/s | 0.01 MB/s |
| 16 KB | 6 MB/s | 0.7 MB/s | 3 MB/s | 0.3 MB/s |
| 128 KB | 10 MB/s | 8 MB/s | 5 MB/s | 4 MB/s |
| 256 KB | 10 MB/s | 8 MB/s | 5 MB/s | 4 MB/s |
| 1 MB | 10 MB/s | 8 MB/s | 5 MB/s | 4 MB/s |

FIG. 27A

| Input clock | Process contents | | |
|---|---|---|---|
| | Reading | Writing | Erasing |
| 12.5 MHz | Table 1-A | Table 1-B | Table 1-C |
| 25 MHz | Table 2-A | Table 2-B | Table 2-C |
| 50 MHz | Table 3-A | Table 3-B | Table 3-C |

FIG. 27B

| Process unit size | Standard value | | Worst value | |
|---|---|---|---|---|
| | SA | RA | SA | RA |
| 512 Bytes | 17 ms | 26 ms | 26 ms | 51 ms |
| 16 KB | 3 ms | 23 ms | 5 ms | 55 ms |
| 128 KB | 13 ms | 16 ms | 26 ms | 33 ms |
| 256 KB | 26 ms | 33 ms | 52 ms | 66 ms |
| 1 MB | 105 ms | 131 ms | 210 ms | 262 ms |

FIG. 28A

| Input clock | Process contents | | |
|---|---|---|---|
| | Reading | Writing | Erasing |
| 12.5 MHz | Table 1-A | Table 1-B | Table 1-C |
| 25 MHz | Table 2-A | Table 2-B | Table 2-C |
| 50 MHz | Table 3-A | Table 3-B | Table 3-C |

FIG. 28B

| Process unit size | Standard value | | Worst value | |
|---|---|---|---|---|
| | SA | RA | SA | RA |
| 512 Bytes | 0.03 MB/s | 0.02 MB/s | 0.02 MB/s | 0.01 MB/s |
| 16 KB | 6 MB/s | 0.7 MB/s | 3 MB/s | 0.3 MB/s |
| 128 KB | 10 MB/s | 8 MB/s | 5 MB/s | 4 MB/s |
| 256 KB | 10 MB/s | 8 MB/s | 5 MB/s | 4 MB/s |
| 1 MB | 10 MB/s | 8 MB/s | 5 MB/s | 4 MB/s |

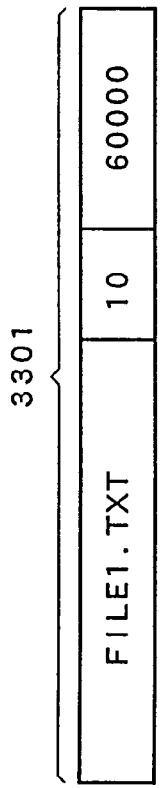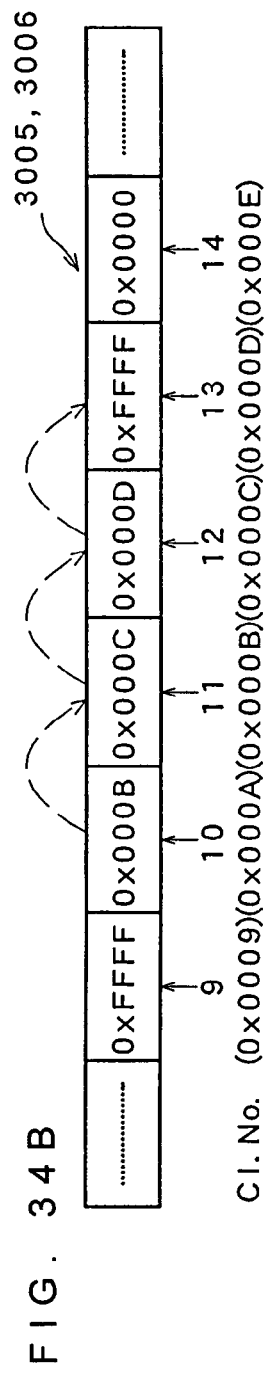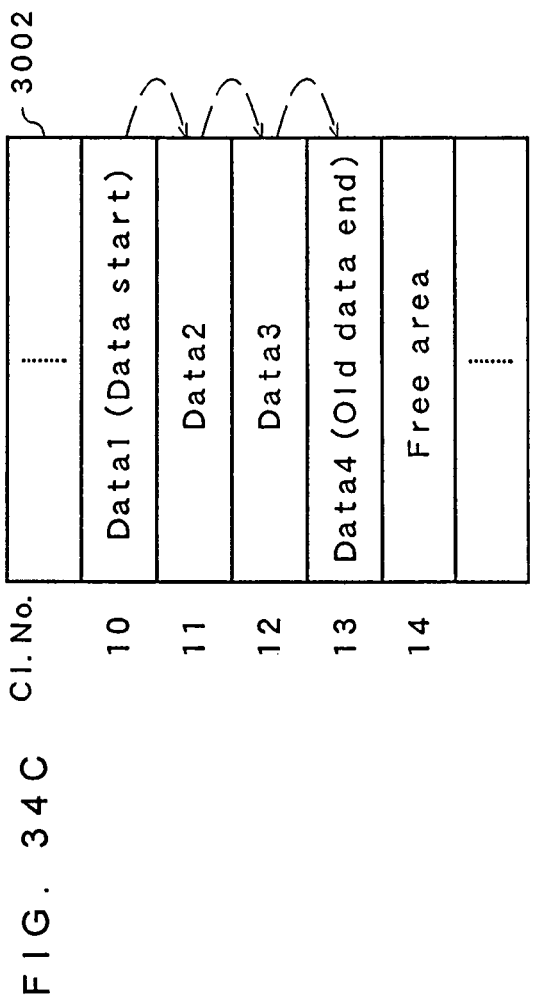
FIG. 34A
FIG. 34B
FIG. 34C

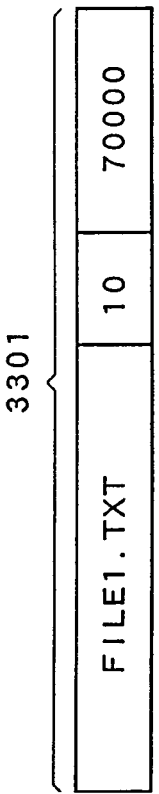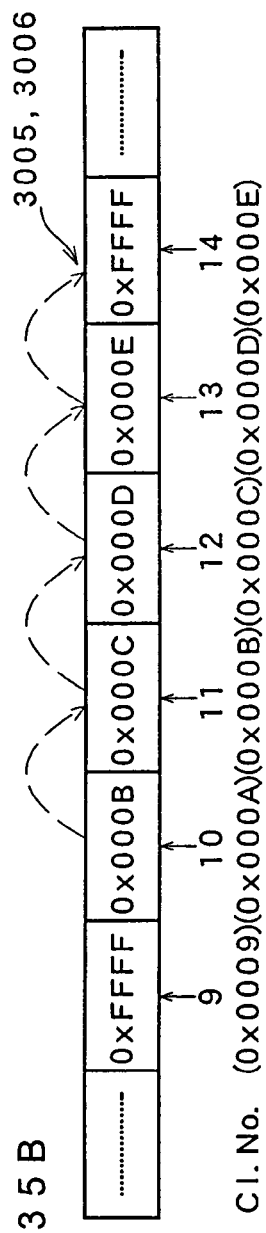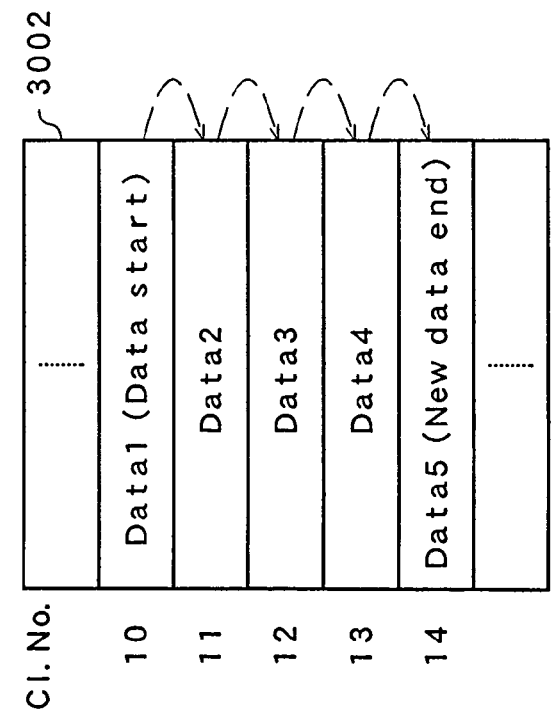
F I G. 35A
F I G. 35B
F I G. 35C

FIG. 44

| Cl. No. | | 3002 |
|---|---|---|
| FSAU-0 | 2 | FILE1 |
| | 3 | FILE1 |
| | 4 | FILE2 |
| | 5 | FILE2 |
| | 6 | Free |
| | 7 | Free |
| | 8 | Free |
| | 9 | Free |
| FSAU-1 | 10 | DIR1 |
| | 11 | DIR1 |
| | 12 | DIR2 |
| | 13 | Free |
| | 14 | Free |
| | 15 | Free |
| | 16 | Free |
| | 17 | Free |
| FSAU-2 | 18 | Free |
| | 19 | Free |
| | 20 | Free |
| | 21 | Free |
| | 22 | Free |
| | 23 | Free |
| | 24 | Free |
| | 25 | Free |

# SEMICONDUCTOR MEMORY CARD, ACCESS DEVICE AND METHOD

TECHNICAL FIELD

The present invention relates to a semiconductor memory card, and an access device and a method for accessing the semiconductor memory card.

BACKGROUND ART

There are various types of recording media, for example, magnetic disks, optical disks and magneto-optical disks, that record digital data such as music contents and video data therein. Since a semiconductor memory card as a sort of the recording media uses a semiconductor memory such as a flash ROM as a recording device to miniaturize the recording media, the semiconductor memory card has been rapidly spreading especially in compact portable equipment such as a digital still camera and cellular phone terminal.

Data stored in the semiconductor memory card is managed according to a file system and the user can easily handle the stored data as a file. Conventionally used file systems include a FAT file system disclosed in ISO/IEC9293, "Information Technology-Volume and file structure of disk cartridges for information", 1994. In addition, there are UDF (Universal Disk Format) described in OSTA Universal Disk Format Specification Revision 1.50, 1997 and NTFS (New Technology File System). Since the semiconductor memory card in which the data is managed according to the file systems can share the file between equipments interpreting the same file system, data can be exchanged between the equipments.

The file system manages an information recording area for recording data by dividing the recording area into sectors as minimum access units and clusters as sets of sectors, and manages one or more clusters as a file. A free area is allocated in units of clusters as the area in which the data contained in the file is stored and the data contained in the file is not necessarily stored in a consecutive area. When a file which is not stored in the consecutive area is read or written, there has been a problem that the reading/writing rate becomes lower as compared with the case where a file stored in a consecutive area is read or written since a seek operation occurs during the reading or writing.

Conventionally, when a host device, for example, a video recording camera performs a data writing process for a semiconductor recording medium in real time, there has been a case where data rewriting process can not follow data loading process depending on usage state of the semiconductor recording medium, that is, the state of an internal data recording area. As a result, data rewriting cannot has become impossible, there has often been problems such as an interruption in video streaming.

Conventionally, a method for controlling data writing so as to store data for 1 page of a manuscript in the consecutive area in an image processing device is provided in Japanese Unexamined Patent Publication No. 2002-29101 as a method for solving the above-mentioned problems. In the conventional method, by necessarily writing data in a consecutive area having a fixed length in data writing, it can be secured that process can be certainly finished within a certain process time in data reading.

In Japanese Unexamined Patent Publication Sho63-228281 a memory card from which a host device can acquire a type, capacity and rate of a memory is disclosed. In unexamined Patent Publication Hei 1-76316 and Japanese Unexamined Patent Publication Hei 7-320018, a memory card which holds a plurality of transfer rates therein and switches the transfer rate in response to an instruction from a host is disclosed.

The above mentioned conventional arts, however, have the following problem. In the conventional control method, data size for 1 page of the draft as process unit of the image processing device is used as a unit of consecutive area. That is, the unit of consecutive area is determined based on the size suitable for data to be handled by an application. This method is effective for the recording medium which causes no difference in writing rate due to distinction of writing unit to the recording medium. However, in the semiconductor memory card, since the writing unit has a great influence on the writing rate and the relationship between the writing unit and writing rate varies depending on characteristics and management method of the semiconductor memory for use, an optimum access method for all semiconductor memory cards are not uniquely determined, and even when the data size is fixed as in the conventional example, it is impossible for all of the semiconductor memory cards to be accessed at high-rate.

DISCLOSURE OF INVENTION

In consideration of said problem, the present invention is characterized by holding information on access performance of a semiconductor memory card in the semiconductor memory card and by making it possible to acquire at least a part of the information from an access device. The access device intends to achieve the high-rate access to the semiconductor memory card by changing process contents of the file system on the basis of the acquired information.

A semiconductor memory card of the present invention is a semiconductor memory card connected to an access device while being used and comprises: a host interface which transmits a control signal and data to the access device and receives a signal from the access device; a nonvolatile memory in which a plurality of continuous sectors are grouped into an erase block as a minimum unit for data erasing and which includes an address management information area and user data area; a memory controller which controls erasing, writing and reading of data with respect to said nonvolatile memory; a card information storage memory including a card information storage part which stores information on access performance of said nonvolatile memory therein; and a control part which controls each part on the basis of the control signal acquired via said interface, reads the information on the access performance of said card information storage part and transmits the information to said access device.

An access device of the present invention is a access device for accessing a semiconductor memory card in which a plurality of continuous sectors are grouped into a block as a minimum unit for data erasing and stored data is managed according to a file system, and comprises: a card information acquisition part for acquiring information on access performance of said attached semiconductor memory card from said semiconductor memory card; a card use condition storage part for storing information on access condition which can be used when said access device accesses said semiconductor memory card and information on access rate desirable for said semiconductor memory card; an access condition determination part for determining access condition on the basis of the information on access performance of said semiconductor memory card acquired by said card information acquisition part and information stored in said card use condition storage part; a file system control part for acquiring access condition determined by said access condition determination part and performing file access suitable for said access condition; and an access control part for accessing said semiconductor memory card in response to an access request from said file system control part.

Further, an access method of the present invention is an access method for accessing a semiconductor memory card in which a plurality of continuous sectors are grouped into a block as a minimum unit for data erasing and stored data is managed according to the file system, and comprises: a card information acquisition step for acquiring information on access performance of said loaded semiconductor memory card from said semiconductor memory card; a card use condition storage step for storing information on access condition which can be used when accessing said semiconductor memory card and information on access rate desirable for said semiconductor memory card; an access condition determination step for determining access condition on the basis of the information on access performance of said semiconductor memory card acquired in said card information acquisition step and information stored in said card use condition storage step; a file system control step for acquiring access condition determined in said access condition determination step and accessing a file in said semiconductor memory card so as to meet said access condition; and an access control step for accessing said semiconductor memory card in response to an access request from said file system control part.

According to the present invention, in the semiconductor memory card which manages data stored therein according to the file system and the access device which accesses the semiconductor memory card, high-rate accessing to the semiconductor memory card can be realized by holding information on access performance of the semiconductor memory card in the semiconductor memory card and by optimizing processes in either side of the access device or semiconductor memory card, or both of them on the basis of the information.

BRIEF DESCRIPTION OF DRAWINGS

FIGS. 6A-6B are explanation views showing an example of an access timing of the semiconductor memory card using the two flash memories in accordance with the first embodiment of the present invention.

FIG. 7 is an explanation view showing information stored in a card information storage part in accordance with the first embodiment of the present invention.

FIG. 8 is a flow chart showing internal process of the access device in a first method in accordance with the first embodiment of the present invention.

FIGS. 11A-11B are explanation views showing an example of access condition and access rate values in the first method in accordance with the first embodiment of the present invention.

FIGS. 14A-14B are explanation views showing an example of access condition and access rate values in the second method in accordance with the first embodiment of the present invention.

FIGS. 19A-19B are explanation views showing an example of the level determination reference of rate performance in a fifth method in accordance with the first embodiment of the present invention.

FIGS. 23A-23B are explanation views showing an example of the access performance basic information list in the seventh method in accordance with the first embodiment of the present invention.

FIGS. 24A-24B are explanation views showing an example of access timing between the access device and semiconductor memory card in reading process, writing process and erasing process in the seventh method in accordance with the first embodiment of the present invention.

FIGS. 26A-26B are explanation views showing an example of an access performance table using data size which can be processed per unit time in an eighth method in accordance with the first embodiment of the present invention.

FIGS. 27A-27B are explanation views showing an example of the access performance table using required time for data process of a unit size in the eighth method in accordance with the first embodiment of the present invention.

FIGS. 28A-28B are explanation views showing an example of the access performance table in the eighth method in accordance with the first embodiment of the present invention.

FIGS. 34A-34C are explanation views showing a state before data writing of the FAT file system in accordance with the second embodiment of the present invention.

FIGS. 35A-35C are explanation views showing a state after data writing of the FAT file system in accordance with the second embodiment of the present invention.

FIG. 44 is an explanation view showing an example of data arrangement after defragmentation process using the FS access unit in the fourth method in accordance with the second embodiment of the present invention.

BEST MODE FOR CARRYING OUT THE INVENTION

Hereinafter, embodiments of a semiconductor memory card and an access device and method in accordance with the present invention will be described with referring to figures.

First Embodiment

Figure 1:
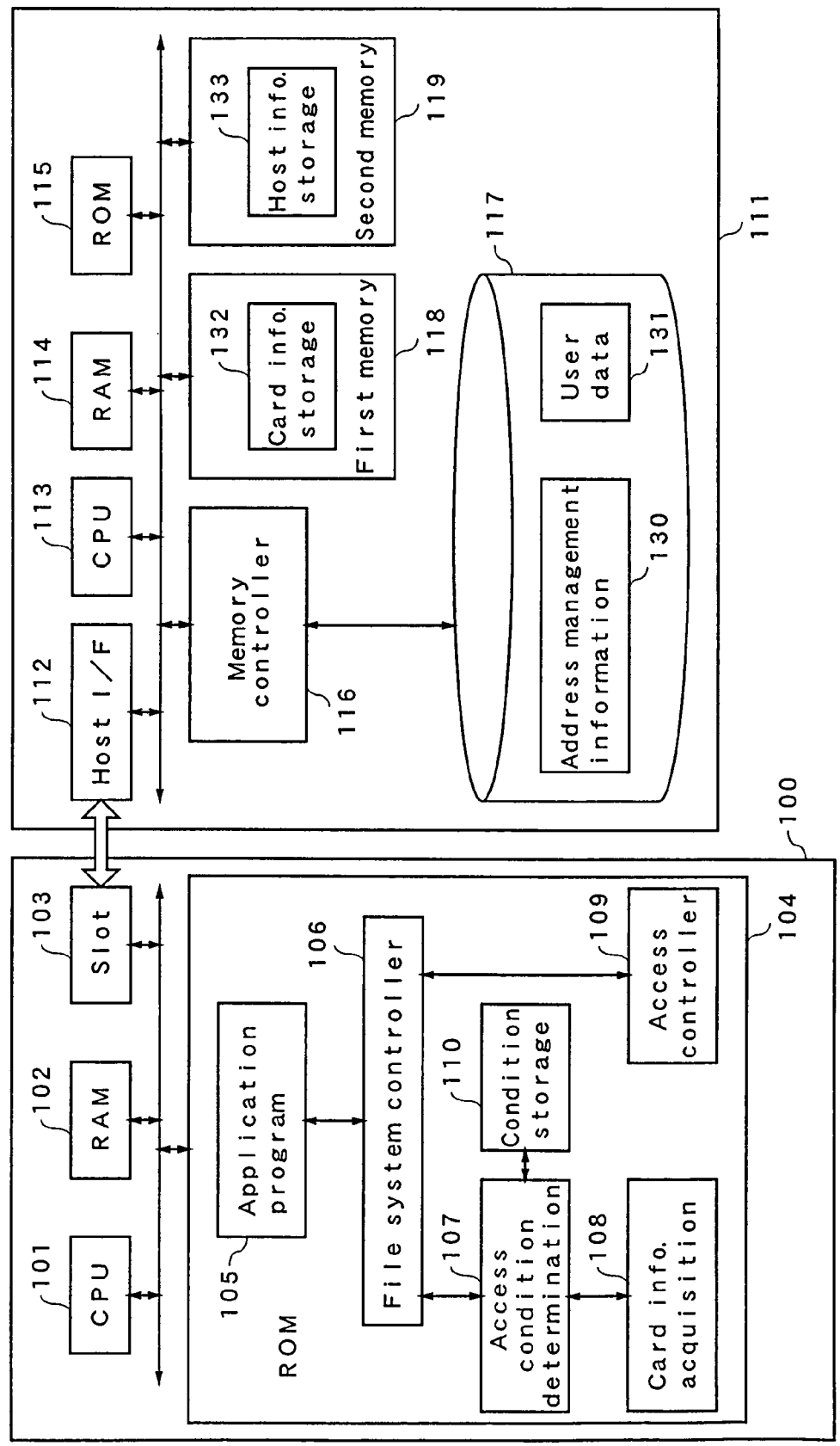
FIG. 1 is an explanation view showing a semiconductor memory card and an access device in accordance with a first embodiment of the present invention.

FIG. 1 is a block diagram showing a semiconductor memory card and access device in accordance with a first embodiment of the present invention. In FIG. 1, an access device 100 includes a CPU 101, RAM 102, slot 103 and ROM 104. The ROM 104 stores a program for controlling the access device 100 therein. The CPU 101 is a controller which operates using the RAM 102 as a temporary storage area according to the program. The slot 103 is a connector between a semiconductor memory card 111 and the access device 100. A control signal and data are transmitted/received between the access device 100 and semiconductor memory card 111 through the slot 103. Further, the ROM 104 includes an application program 105, a file system controller 106, an access condition determination part 107, a card information acquisition part 108, an access controller 109 and a condition storage part 110 for storing card use condition.

On the other hand, the semiconductor memory card 111 includes a host interface (I/F) 112, CPU 113, RAM 114, ROM 115, memory controller 116, nonvolatile memory 117, first memory 118 and second memory 119. The host interface 112 is an interface for transmitting/receiving a control signal and data to/from the access device 100. The ROM 115 stores a program for controlling the semiconductor memory card 111 therein, and the program uses the RAM 114 as a temporary storage area and operates on the CPU 113. The memory controller 116 is a device for controlling the nonvolatile memory 117 as the data storage area in the semiconductor memory card 111. The semiconductor memory 117 includes an address management information 130 and a user data 131. The address management information 130 is a table which administrates correspondence between a physical address in the nonvolatile memory 117 and a logical address which the access device 100 uses for access. The user data 131 is data recorded in the semiconductor memory card 111 by the user. The first memory 118 is an updatable nonvolatile memory, which includes a card information storage section 132 for storing information on access performance of the semiconductor memory card 111. The first memory 118 is used as a card information storage memory. The second memory 119 is an updatable nonvolatile memory and includes a host information storage part 133 for storing information on the access device 100 which accesses the semiconductor memory card 111.

Subsequently, characteristics of a semiconductor memory used for the nonvolatile memory 117 as a data recording device in the semiconductor memory card 111 will be described. The semiconductor memory used for the nonvolatile memory 117 uses a nonvolatile memory called EEPROM or flash ROM (hereinafter referred to as a flash memory) as a device for information recording. An NAND memory used in a lot of information recording media has characteristic that recorded data in the medium must be erased once prior to writing of data to return to an unrecorded state and then the data must be written.

Here, a data erase unit is referred to as an erase block and managed as a block consisting of a plurality of sectors which are minimum unit of access (for example, 512 byte). Each erase block is generally grouped in order to design an area in which $2^i$ (i is an integer of 0 or more) sectors is continuous to be the erase block as minimum unit of data erase.

Figure 2:
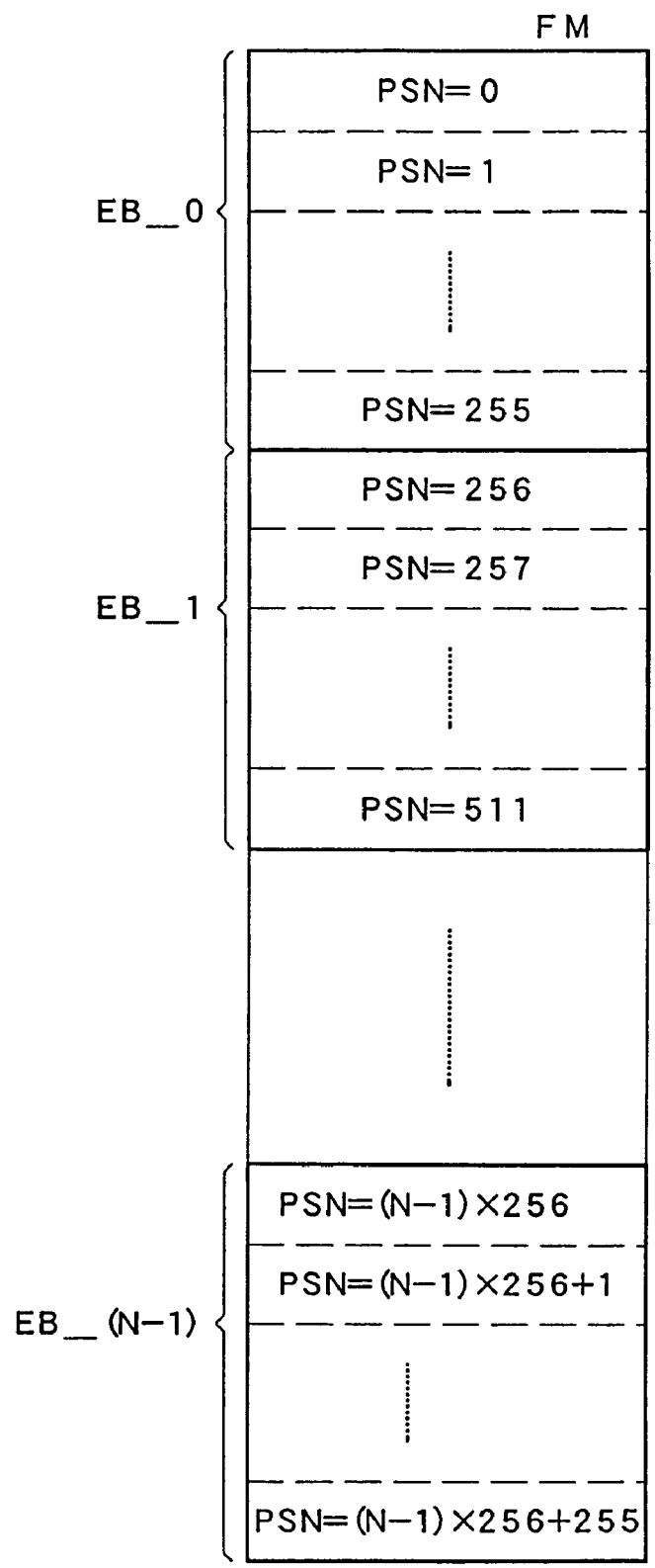
FIG. 2 is an explanation view showing relationship between an erase block and a sector in accordance with the first embodiment of the present invention.

FIG. 2 is a view showing an example of the relationship between the erase block and sector in a flash memory FM. In an example of FIG. 2, an erase block EB consists of N, from 0 to (N−1), blocks and 1 erase block is defined as 128 KB, for example. One erase block consists of 256 sectors and a series of physical sector numbers PSN=0 to (N−1)×256+255 are given to the erase block. Access can be performed in units of sectors, while data erasing process necessary before writing is performed in erase block unit (128 KB).

Figure 3:
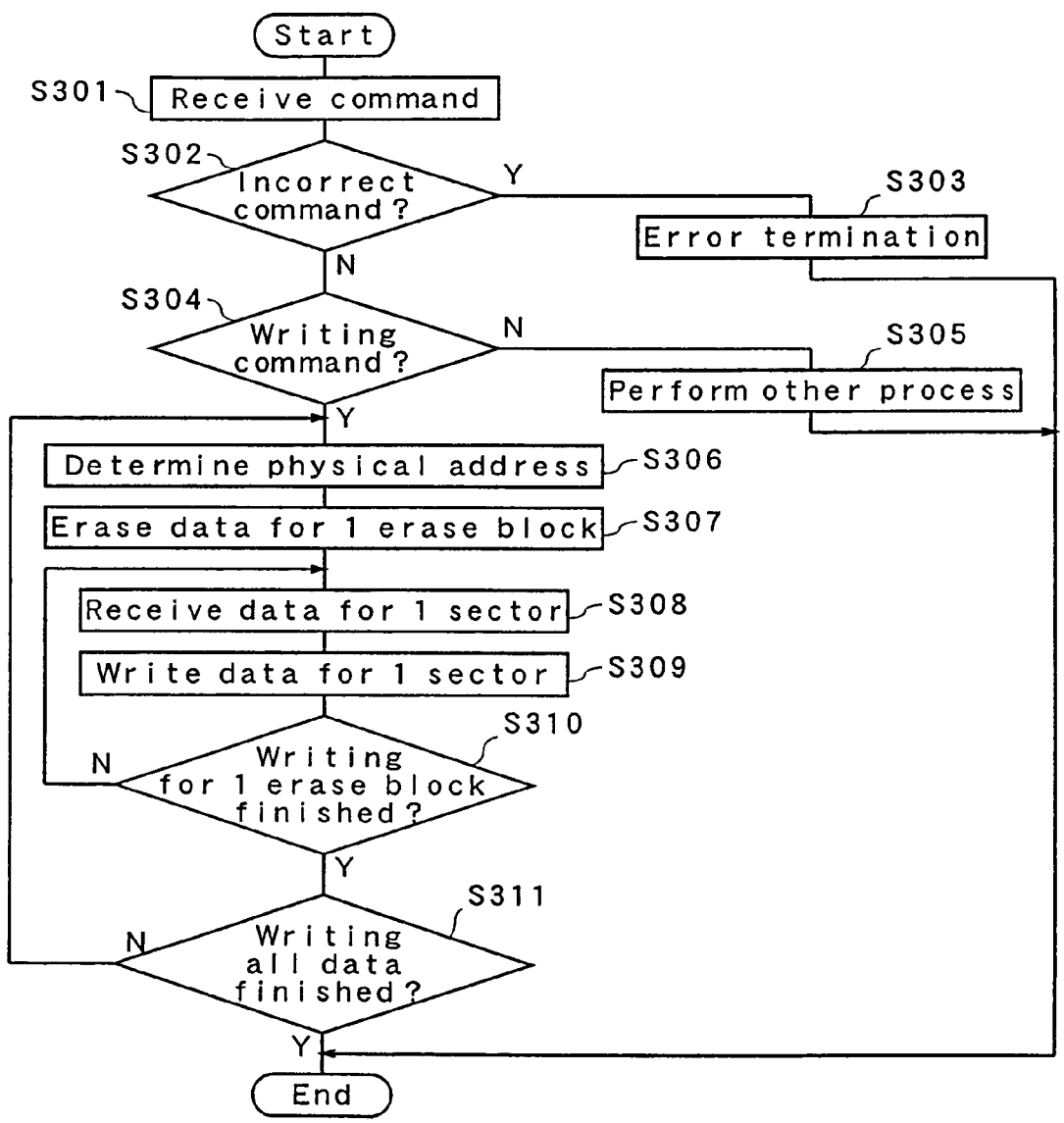
FIG. 3 is a flow chart showing data writing process with having a length of multiples of the erase block to the semiconductor memory card in accordance with the first embodiment of the present invention.

Examples of data erasing process and writing process in the semiconductor memory card 111 will be described referring to FIGS. 3 and 4. FIG. 3 shows process order in the semiconductor memory card 111 in the case where data having a length of multiples of the erase block is written as an example of the writing process.

In data recording process in FIG. 3, first, a command and argument transmitted from the access device 100 are received through the host interface 112 (S301). Next, the received command is referred to determine whether or not the command is an inrecognizable incorrect command (S302). In the case of an incorrect command, error is informed to the access device 100 and the process finishes (S303). In the case of a recognizable command, determination is made whether or not the command is a writing command (S304). In the case of a command other than the writing command, the other process corresponding to each command is performed (S305). In the case of the writing command, a physical address of the erase block at which data is actually written in the flash memory is determined from information on a writing position and writing size stored in the argument (S306). Next, prior to writing, data existing in the erase block in the flash memory, which is determined in the S306, is erased through the memory controller 116 (S307). Next, data for 1 sector is received from the access device 100 through the host interface 112 (S308). When data reception is finished, the received data for 1 sector is written to the flash memory through the memory controller 116 (S309). In this manner, the data reception and writing process is repeatedly performed until writing of the data for 1 erase block is finished (S310). The data writing process for 1 erase block from S306 to S310 is repeatedly performed until the data writing designated from the access device 100 is finished (S311). When the data writing for the writing size designated from the access device 100 is finished, the process is finished.

Figure 4:
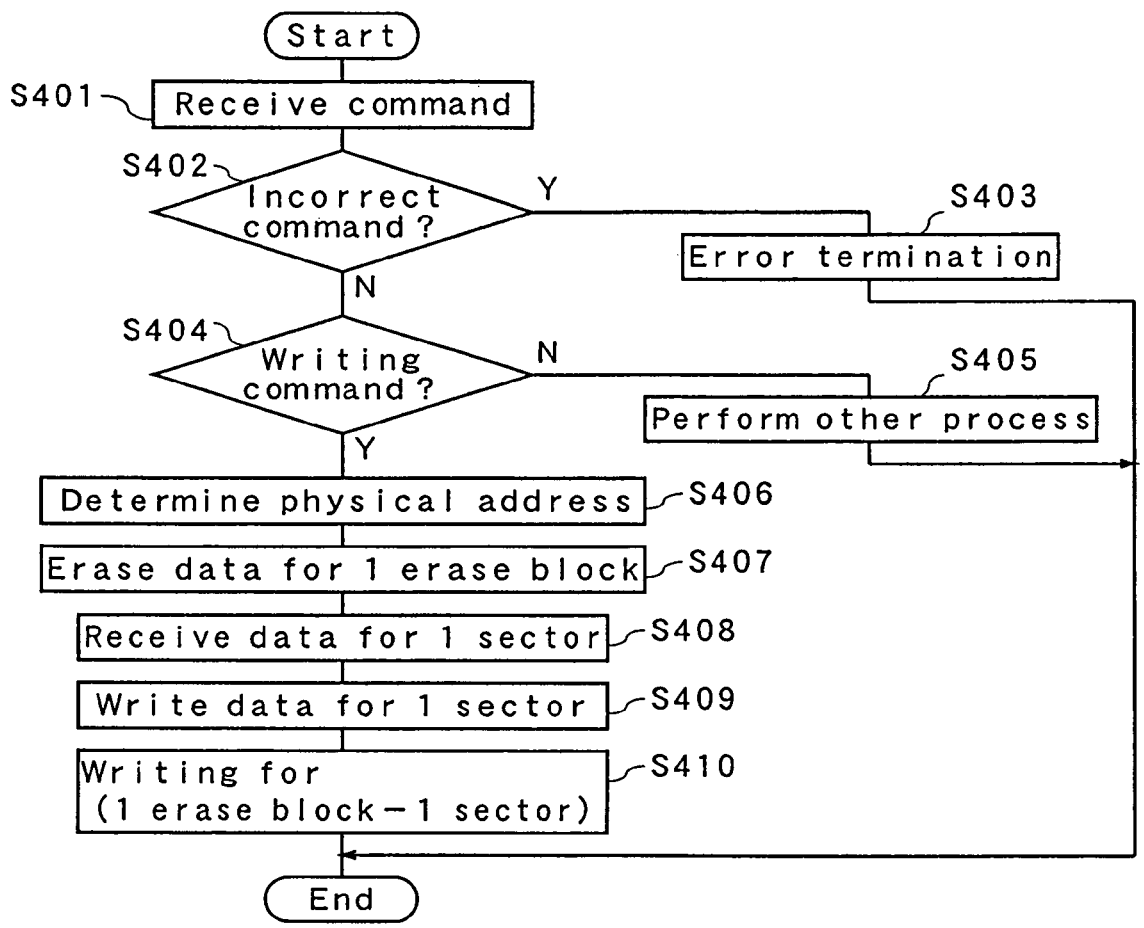
FIG. 4 is a flow chart showing data writing process for 1 sector to the semiconductor memory card in accordance with the first embodiment of the present invention.

Subsequently, FIG. 4 shows process order in the semiconductor memory card 111 in the case where data for 1 sector is written. In data recording process in FIG. 4 is different from the process in FIG. 3 in that data other than the data for 1 sector received from the access device 100 of data contained in the erase block to be written in S410 is written to the erase block determined in S406. In the NAND type memory, data needs to be erased once prior to data writing and the erasing process can be performed only in erase block unit. Thus, also when data for 1 sector is written, it is necessary to erase data for 1 erase block and, rewrite existing data contained in the same erase block to a new erase block as in the process in S410.

As shown in FIGS. 3 and 4, the data recording process is roughly divided into three processes of command interpretation process, data erasing process and data writing process. For example, a flash memory by which command interpretation overhead takes 3 ms, writing process for 1 sector takes 200 μs and erasing process for 1 erase block (for example, 128 KB) takes 2 ms is assumed. When in data writing for 1 erase block (128 KB) to this flash memory, the process shown in FIG. 3 is performed, and it takes 3 ms for command interpretation, 2 ms for erasing process and 256×200 μs for writing process, or 56.2 ms in total. Similarly, when in data writing for 1 sector (512 B), the process shown in FIG. 4 is performed, and it takes 3 ms for command interpretation, 2 ms for erasing process and 200 μs+255×200 μs for writing process, or 56.2 ms in total. That is, data writing of 128 KB and data writing of 512 B take the same time period. Although the case where there is an extreme difference in performance with disregard to data transfer time, and etc. is described in this example, in the actual flash memory, writing time becomes shorter when writing is performed in units of erase blocks.

Figure 5:
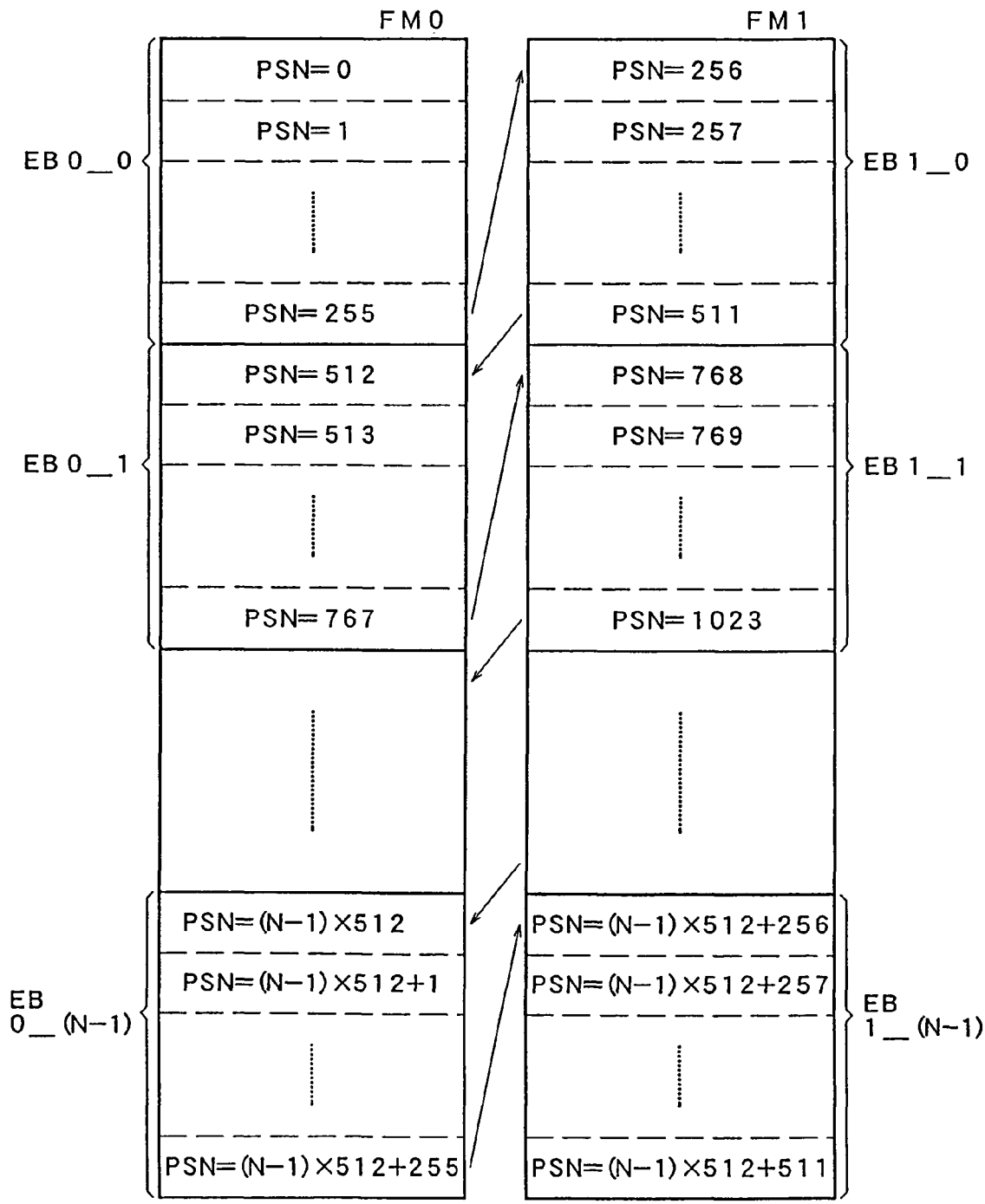
FIG. 5 is an explanation view showing an example of the configuration of the semiconductor memory card using two flash memories in accordance with the first embodiment of the present invention.

In the semiconductor memory card 111, a plurality of flash memories may be used as recording devices. FIG. 5 is a view showing configuration of the semiconductor memory card 111 in which two flash memories FM0 and FM1 are used as the nonvolatile memory 117. In the two flash memories shown in FIG. 5, each of erase blocks 0_0 to 1_(N−1) consists of 256 sectors and physical sector numbers PSN in an ascending order are given to each sector existing in the two flash memories so that the two flash memories may be alternatively replaced in units of 256 sectors. In the case of the semiconductor memory card 111 having the nonvolatile memory 117 consisting of a plurality of flash memories, high-rate access can be achieved by performing reading/writing process from/to a plurality of flash memories in parallel. For example, in the example shown in FIG. 5, when data is written in 512 sectors having the physical sector numbers PSN0 to PSN 511, data can be written at high-rate by writing the data to the two erase blocks EB0_0 and EB1_0 in parallel.

FIG. 6 shows timing of writing to the semiconductor memory card 111, FIG. 6(a) shows an example of timing of writing to 1 erase block and FIG. 6(b) shows an example of timing of parallel writing to the two erase blocks. In FIG. 6, T1 represents required time for writing process of 1 erase block. T1'+T2' represents required time for writing process of two erase blocks. That is, writing process time in the case where data is written in one by one erase block in two writings becomes T1×2 and writing process time in the case where data is written to two erase blocks in parallel becomes the T1'+T2'. The T1' is required time for the process without writing to the flash memories and is very short. The T2' is required time for parallel writing process to the two flash memories and is slightly longer than the time T1 required for writing process to one flash memory, and however, does not reach time twice as much as T1. For this reason, in the example shown in FIG. 6, writing time becomes shortest when data is written to the semiconductor memory card 111 in units of two erase blocks.

In other words, writing time to the semiconductor memory card 111 depends on the number of flash memories used in the semiconductor memory card 111 and management method of the flash memory as well as the size of the erase block. Furthermore, access performance of the semiconductor memory card 111 varies depending on differences in generation and manufacturer of the semiconductor memory card 111.

Thus, in this embodiment, information on access performance which varies from semiconductor memory card 111 to the memory card 111 is held in the memory card 111 so as to be acquired by the access device 100. Whereby, the access device 100 can recognize an optimum access method for each semiconductor memory card 111 so that high-rate access to the semiconductor memory card 111 can be realized.

Subsequently, a card information storage part 132 in this embodiment will be described in detail. The card information storage part 132 is a storage part for storing information on access performance of the semiconductor memory card 111 therein. FIG. 7 is a view showing an example of information stored in the card information storage part 132, which stores at least one of first to fifth information therein. Each item by information type will be described below.

First information contained in card information is information on internal physical characteristics of the semiconductor memory card 111. The information includes, for example, the type of a flash memory used in the semiconductor memory card 111, the number of used memories, management method of the semiconductor memory such as presence or absence of parallel writing to the memory, erase block size of the flash memory, management block size in the semiconductor memory card 111, temperature condition, power consumption, current value, voltage value and card type. The card type information is information for discriminating the type of the card such as a version of standard to which the semiconductor memory card 111 conforms and command set which the semiconductor memory card 111 supports. Such information includes information which serves as a basis for determining the access performance of the semiconductor memory card 111, for example, the number of flash memories which affects improvement in efficiency of parallel writing process and erase block size which affects optimum process unit size for the semiconductor memory card 111. When 1 flash memory is used as shown in FIG. 2, the management block size is the same as the erase block size, and when 2 flash memories are used as shown in FIG. 5, the management block size is the size by which process is performed at the highest rate due to simultaneous erasing, that is, twice as much as the erase block size. When more flash memories are used in parallel, the management block size is that the number of the parallelly-disposed flash memories multiplies by erase block size. It is noted that the first information only needs to include at least one of these pieces of information.

Second information contained in card information is information on access condition in the timing that the access device 100 accesses the semiconductor memory card 111. The information includes process type, process unit size, process unit boundary, process unit time, access method, minimum sequential area size at sequential access (abbreviated as SA in the figure), input clock frequency and bit width. The process type represents types of process to the semiconductor memory card 111, reading process, writing process and erasing process and etc. are existing. The writing process consists of the following two types of process: writing process including erasing process which becomes necessary when data is overwritten at a position where data has been already written; and process of only writing data at a position where no data exists. The process unit size is the size of one process to the semiconductor memory card 111. The process unit boundary is information representing a process starting position. The process unit boundary represents a boundary at which the rate becomes highest according to process within the process unit size and includes the case where the boundary coincides with the boundary of the process unit size and permits process from its middle position. Assuming that the process unit size is 128 KB, the process unit boundary is expressed as 128 KB when it coincides with the process unit size and is expressed as 64 KB when the process from the middle position is allowable. As described above, the optimum process unit size and process unit boundary for the semiconductor memory card 111 depend on the number of flash memories processed in parallel in the semiconductor memory card 111, management method, erase block size and etc. That is, in the case where the flash memories are not processed in parallel in the semiconductor memory card 111, the erase block size of the flash memory is the same as the process unit size. When the process unit boundary is the same as these sizes at this time, the semiconductor memory card 111 can be efficiently accessed. On the other hand, in the case where a plurality of flash memories are processed in parallel, efficient access can be realized when the process unit size and process unit boundary are the same as the management block size of parallel process. Furthermore, in the case where the optimum process unit boundary for the semiconductor memory card 111 has the length of multiples of the process unit size, it is possible to omit the process unit boundary and determine the boundary using the process unit size.

A process unit time is information representing unit time which serves as a measurement reference of performance value in expressing access performance. The access method represents address designating condition at the time when the access device 100 accesses the semiconductor memory card 111, sequential access (SA) of accessing a continuous area, random access (RA) of accessing a discontinuous area, and etc. are existing. In the semiconductor memory card 111 in which the flash memories are processed in parallel, even when process is not performed in units of management block sizes to be processed in parallel, but performed by dividing it in smaller units such as erase block units, if process is sequentially performed to a continuous area, process at a certain level of high-rate can be realized depending on the management method of the flash memories. Thus, the minimum continuous area size at sequential access represents the size of a minimum continuous area necessary for high-rate access at sequential access. The input clock frequency is information representing basic clock frequency in transmission/reception of a command and data between the access device 100 and semiconductor memory card 111. The bit width is information representing the number of bits of a signal line used for data transfer between the access device 100 and semiconductor memory card 111, for example, 1 bit, 4 bits, and so on. It is noted that the second information only needs to include at least one of these pieces of information.

Third information contained in card information is information on access rate of the semiconductor memory card 111. The information includes rate performance level, data size to be processed within unit time, required time for processing per unit size, transfer rate and process time inside card of the semiconductor memory card 111. The rate performance level expresses rate control of the flash memory card, for example, as high-rate, medium-rate and low-rate, for example, using a flag. The required time for processing per unit size can include an standard value and worst value for each process time of reading process, writing process, erasing process, and etc. The data size to be processed within unit time and process time per unit size may be held as data in an access performance table mentioned later. Furthermore, as mentioned later, the transfer rate can also include an standard value and worst value in each of the reading process, writing process and erasing process. Furthermore, as described later, the process time inside card can be stored as an access performance basic information list. These pieces of information represent access rate of the semiconductor memory card 111 and vary only in expressing method. Furthermore, the information on access rate closely relates to the above-mentioned first information and second information. For example, when the input clock frequency is low, the transfer rate of data input/output from/to the semiconductor memory card becomes lower, as a result, in the access performance of the semiconductor memory card 111 descends. When the process unit size for accessing the semiconductor memory card 111 is small, the access rate of the semiconductor memory card 111 becomes lower for reason such as that access in erase block unit cannot be performed or the effect of parallel process cannot be obtained. As described above, information on the access rate as the third information includes information associated with the first information and second information. It is noted that the third information only needs to include at least one of these pieces of information.

Fourth information contained in the card information is information on abnormal process of the semiconductor memory card 111. The information includes error occurrence probability in each of reading process, writing process, and etc., and worst value of time from when the access device 100 issues a command to the semiconductor memory card 111 until the access device 100 receives an error notice. These pieces of information are used when the access device 100 estimates buffer size necessary for the abnormal process. It is noted that the fourth information only needs to include at least one of these pieces of information.

Fifth information contained in the card information is other information on access performance of the semiconductor memory card 111. The information includes rate performance level determination reference, rate performance level and electrical power consumption level. It is noted that the fifth information only needs to include at least one of these pieces of information. Hereinafter, details of the information will be described.

FIG. 7 shows the above-mentioned 5 types of information as information which can be stored in the card information storage part 132. The card information storage part 132 may store all of the information therein. Alternatively, the card information storage part 132 may select and store information necessary for optimum access between the access device 100 and semiconductor memory card 111. The especially characteristic pieces of card information of this application are the second information relating to access condition and third information relating to access rate.

The main point in the first embodiment is that information on access performance of the semiconductor memory card 111 as shown in FIG. 7 is held in the semiconductor memory card 111 and the access device 100 is made possible to acquire a part or all of the information so as to optimally access the semiconductor memory card 111 from the access device 100. Hereinafter, first to eighth method in which the access device 100 finds access performance of the semiconductor memory card 111 to realize optimum access to the semiconductor memory card 111 will be described below.

Figure 9:
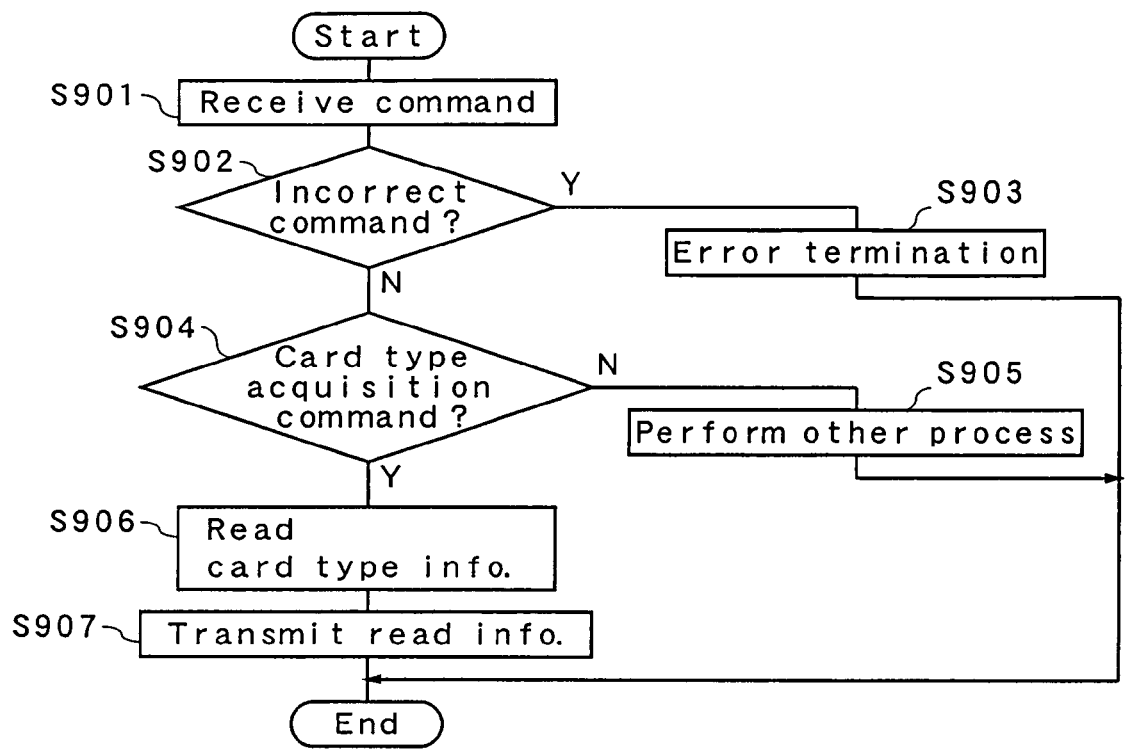
FIG. 9 is a part of a flow chart showing internal process of the semiconductor memory card in the first method in accordance with the first embodiment of the present invention.

A first method in which the semiconductor memory card 111 returns information on access condition and access rate for optimally accessing the semiconductor memory card 111 in response to a request from the access device 100 will be described using FIGS. 8 to 11. FIG. 8 is a view showing acquisition procedure at the side of the access device 100 in this method, FIGS. 9 and 10 are views showing process order at the side of the semiconductor memory card 111 and FIG. 11 is a view showing an example of information on access condition and access rate which the semiconductor memory card 111 returns to the access device 100.

First, the process order at the side of the access device 100 will be described referring to FIG. 8. In FIG. 8, the access device 100 firstly issues a card type acquisition command to the semiconductor memory card 111 to acquire card type information of the semiconductor memory card 111 (S801). Next, it is determined whether or not the card type information is acquired from the semiconductor memory card 111 according to the issued command (S802). When acquisition is unsuccessful, it is determined that an error has occurred and process is finished (S803). When acquisition is successful, based on the acquired information, it is determined whether or not the semiconductor memory card 111 responds to a command (optimum access information acquisition command) to acquire access condition for optimally accessing the semiconductor memory card 111 and access rate values at this time from the semiconductor memory card 111 (S804). When the semiconductor memory card 111 does not responds to the command, acquisition of the access condition and access rate values is canceled and process is finished (S805). When the semiconductor memory card 111 responds to the command, the optimum access information acquisition command is issued to the semiconductor memory card 111 (S806). Next, it is determined whether or not the access condition and access rate values have been acquired from the semiconductor memory card 111 according to the issued command (S807). When acquisition is unsuccessful, it is determined that an error has occurred and process is finished (S808). When acquisition is successful, process is normally finished.

Subsequently, process order at the side of the semiconductor memory card 111 will be described referring to FIGS. 9 and 10. FIG. 9 is a view showing process at the side of the semiconductor memory card 111 when the card type acquisition command is issued from the access device 100 in description of FIG. 8. In the process at the side of the semiconductor memory card 111 as shown in FIG. 9, the semiconductor memory card 111 firstly receives a command from the access device 100 (S901). Next, referring to the received command, it is determined whether or not the command is an unrecognizable incorrect command (S902). When the received command is an incorrect command, an error is informed to the access device 100 and process is finished (S903). When it is a recognizable command, it is determined whether or not the command is the card type acquisition command (S904). When the received command is a command other than the card type acquisition command, other process responding to each command is performed (S905). When the command is the card type acquisition command, the card type information is read from the card information storage part 132 (S906). The card type information read last is transmitted to the access device 100 and process is finished (S907).

Figure 10:
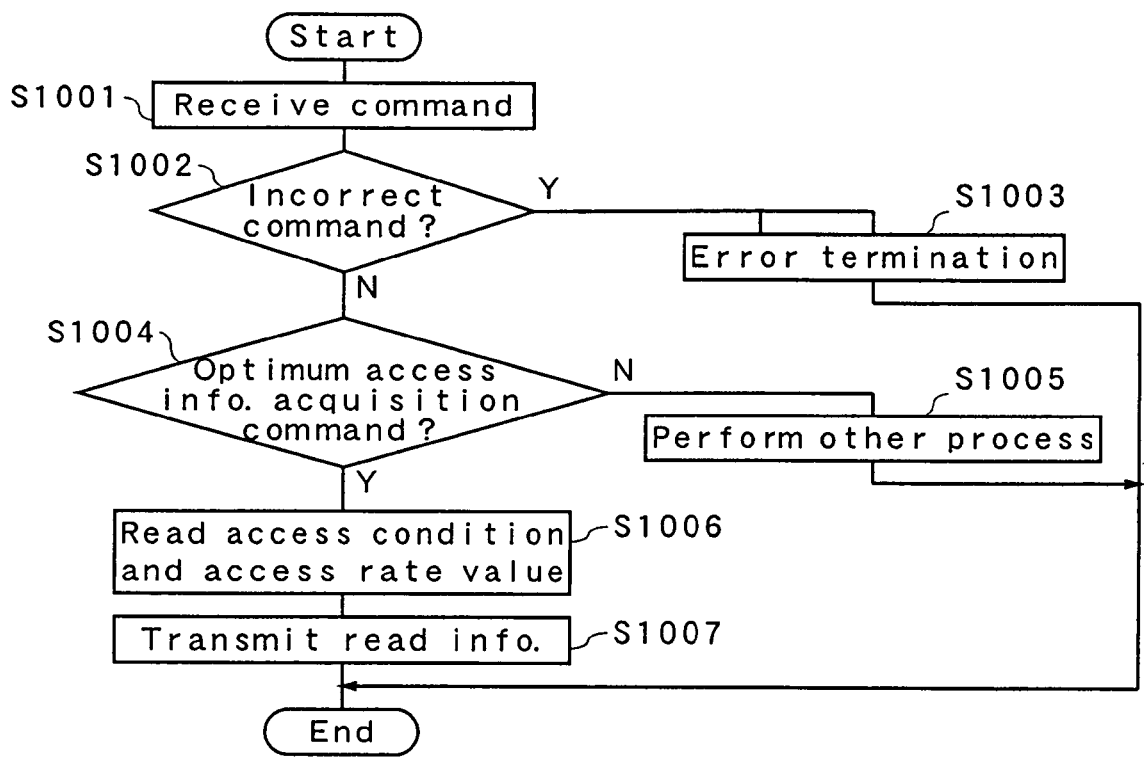
FIG. 10 is another part of a flow chart showing internal process of the semiconductor memory card in the first method in accordance with the first embodiment of the present invention.

FIG. 10 is a view showing process at the side of the semiconductor memory card 111 when the optimum access information acquisition command is issued from the access device 100 in description of FIG. 8. In the process as shown in FIG. 10, the semiconductor memory card 111 receives a command from the access device 100 (S1001). Next, referring to the received command, it is determined whether or not the command is an unrecognizable incorrect command (S1002). When the command is an incorrect command, an error is informed to the access device 100 and process is finished (S1003). When it is a recognizable command, it is determined whether or not the command is the optimum access information acquisition command (S1004). When it is not the optimum access information acquisition command, other process is performed (S1005) and when it is the optimum access information acquisition command, access condition for optimally accessing the semiconductor memory card 111 and access rate values at this time are read from the card information storage part 132 at S1006. Then, at S1007, the read access condition and access rate value are transmitted to the access device 100.

As described above, according to the process order shown in FIGS. 8 to 10, the access device 100 can acquire the access condition for optimally accessing the semiconductor memory card 111 and access rate values at this time from the semiconductor memory card 111. FIG. 11(a) is a view showing the access condition and FIG. 11(b) is a view showing an example of the access values. As shown in FIG. 11(a), the access condition shows information on condition to which the access device 100 should obey to optimally access the semiconductor memory card 111, such as process unit size, process unit boundary, access method, input clock frequency and bit width. Here, for example, the process unit size has a length of multiples of 128 KB, the process unit boundary has a length of multiples of 128 KB, the access method is sequential access to the continuous area of 256 KB or more, the input clock frequency is 25 MHz or more and the bit width is 4 bits. As shown in FIG. 11(b), the access rate values are information showing process performance in the case where the access device 100 performs access according to the above-mentioned access condition, such as an standard value and worst value of transfer rate in each of reading process, writing process and erasing process. By acquiring these pieces of information from the semiconductor memory card 111, the access device 100 can recognize how optimum access to the semiconductor memory card 111 should be made and how much access performance is obtained in this case. Thus, optimum access according to characteristics of the semiconductor memory card 111 can be realized.

Figure 12:
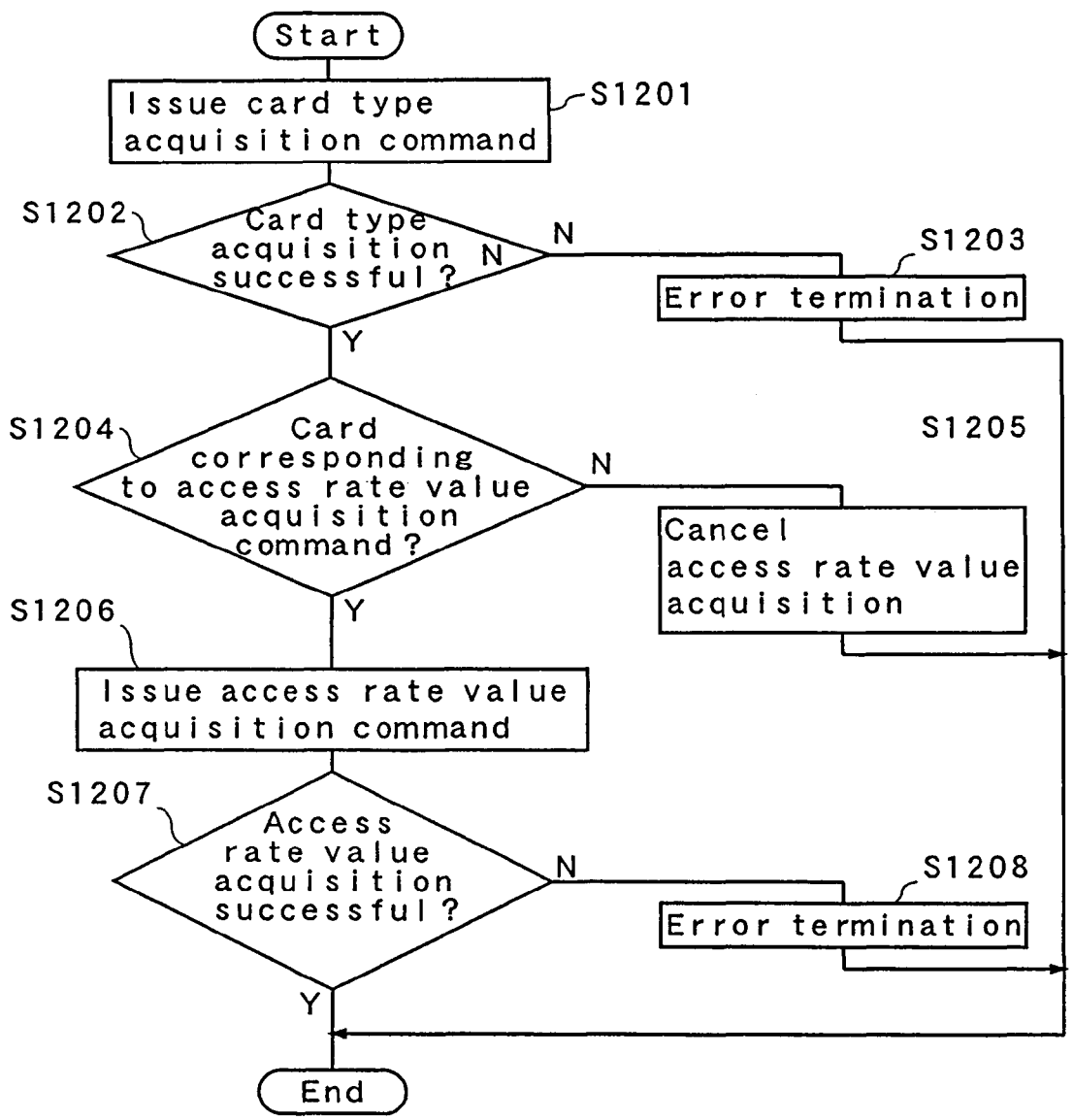
FIG. 12 is a flow chart showing internal process of the access device in a second method in accordance with the first embodiment of the present invention.
Figure 13:
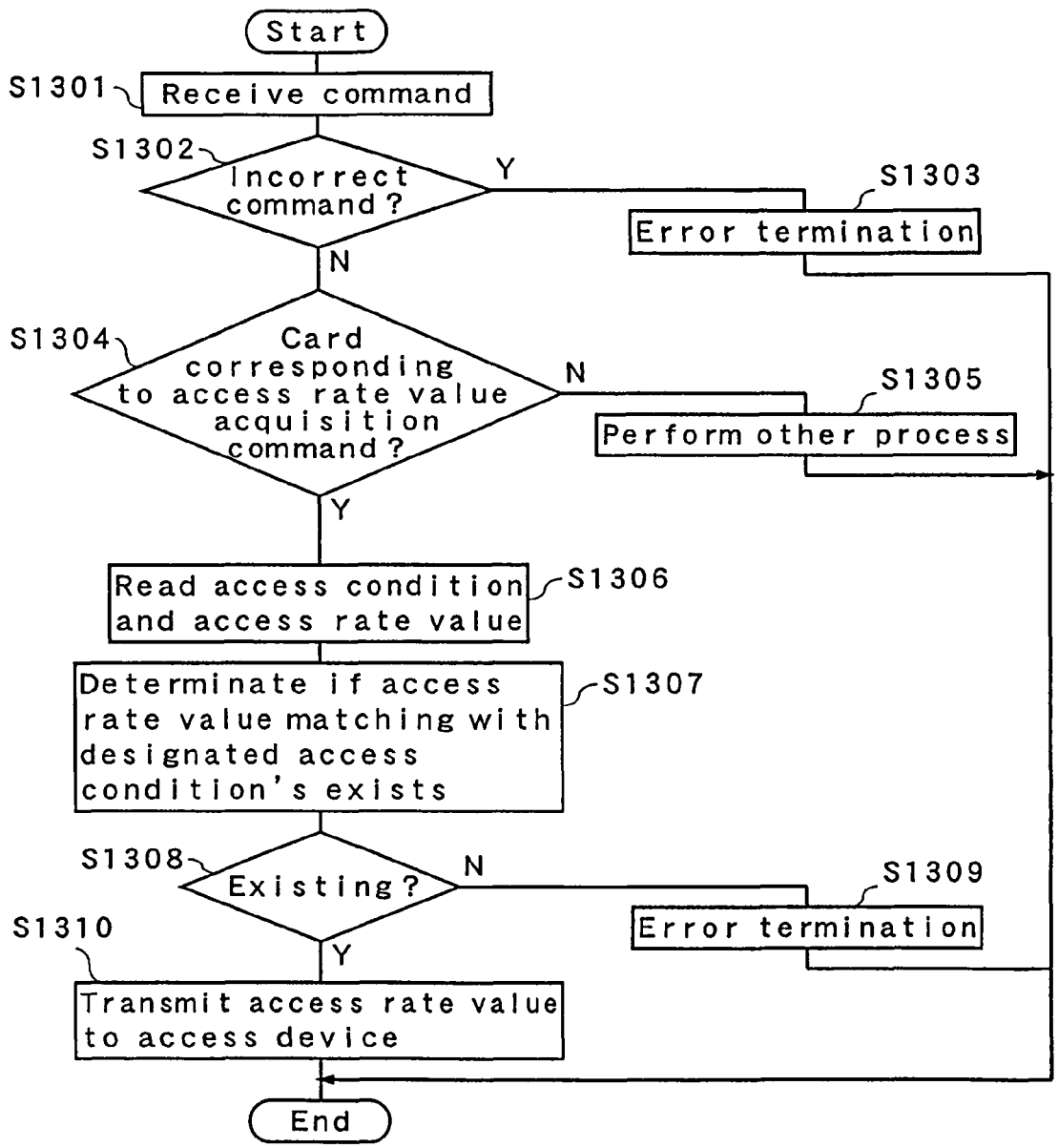
FIG. 13 is a flow chart showing internal process of the semiconductor memory card in the second method in accordance with the first embodiment of the present invention.

Subsequently, a second method in which the access device 100 inputs the access condition in the semiconductor memory card 111 and the semiconductor memory card 111 returns the access rate values will be described using FIGS. 12, 13 and 14. FIG. 12 is a view showing process at the side of the access device 100 in this method. In process order at the side of the access device 100 as shown in FIG. 12, as in the first method shown in FIG. 8, the card type acquisition command is issued (S1201) and when acquisition is unsuccessful, error termination is done (S1202, S1203). When acquisition is successful, it is determined whether or not the card responds to the access rate value acquisition command. When the card does not respond to the command, acquisition of the access rate values is canceled (S1205) and when the card responds to the command, the access rate value acquisition command is issued at a step S1206. It is determined whether or not acquisition of the access rate values is successful (step S1207) and when the acquisition is unsuccessful, error termination is done (S1208) and when the values can be acquired, process is normally finished. In this method, since the access device 100 inputs the access condition to the semiconductor memory card 111, the access rate value acquisition command is a command having the access condition as arguments.

Next, process order at the side of the semiconductor memory card 111 will be described referring to FIG. 13. FIG. 13 is a view showing process at the side of the semiconductor memory card 111 in the case where the access rate value acquisition command is issued from the access device 100 in description of FIG. 12. When the process in FIG. 13 is started, a command is received at S1301, it is determined whether or not the received command is an incorrect command and when the received command is the incorrect command, error termination is done (S1302, S1303). When the command is not an incorrect command, it is determined whether or not the received command is the access rate value acquisition command (S1304), and when the received command is not the command, other process is performed (S1305). When the received command is the command, the semiconductor memory card 111 reads the access condition and access rate values from the card information storage part 132 (S1306). Next, referring to the read access condition and the access rate values corresponding to them, it is determined whether or not the access rate values matching with the access condition which the access device 100 designates in the command arguments exist (S1307). When the access rate values do not exist, an error is informed to the access device 100 and process is finished (S1308, S1309). When the access rate values exist, the concerned access rate values are transmitted to the access device 100 and process is finished (S1310).

As described above, in the process order described in FIGS. 12 and 13, the access device 100 can input the access condition to the semiconductor memory card 111 and acquire the access rate values according to the condition.

FIG. 14(a) is a view showing the access condition input to the semiconductor memory card 111 by the access device 100 and FIG. 14(b) is a view showing an example of the access rate values returned to the access device 100 by the semiconductor memory card 111. The access condition that the access device 100 inputs to the semiconductor memory card 111 are information showing condition when accessing the semiconductor memory card 111, for example, as shown in FIG. 14(a), the process unit size is 128 KB, the process unit boundary is 128 KB, the access method is sequential access to the continuous area of 256 KB, the input clock frequency is 25 MHz and the bit width is 4 bits. The access rate values shown in FIG. 14(b) is the same information as that in FIG. 11(b) and show the access rate values according to the access condition input by the access device 100. In this manner, by inputting the condition at the time when accessing the semiconductor memory card 111 and acquiring the access rate values according to the condition from the semiconductor memory card 111, the access device 100 can determine whether or not desired access performance can be obtained according to the assumed access method.

Subsequently, a third method is a method in which the access device 100 inputs the access rate values to the semiconductor memory card 111 and the semiconductor memory card 111 returns the access condition. This method will be described using FIGS. 15 and 16.

Figure 15:
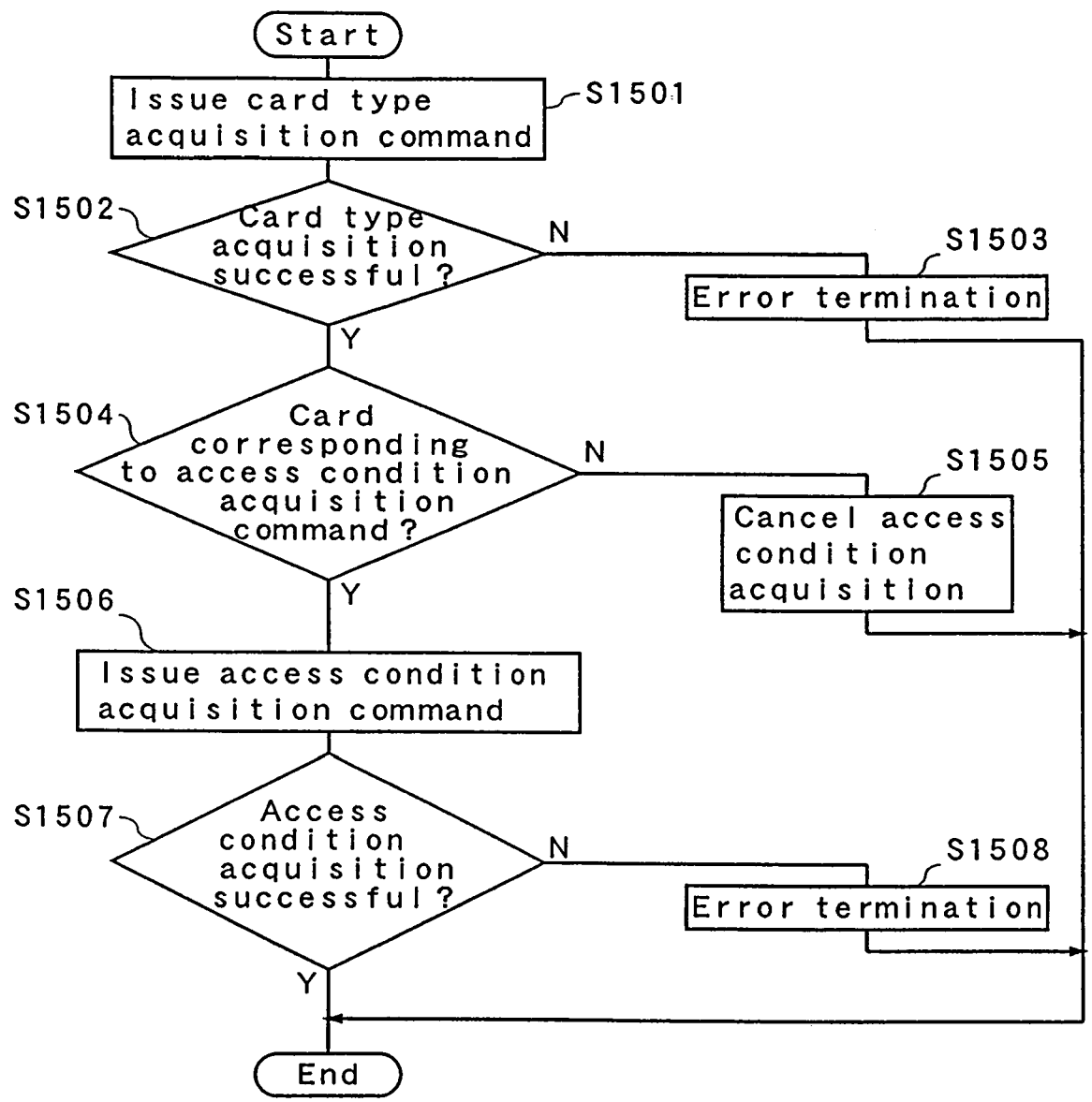
FIG. 15 is a flow chart showing internal process of the access device in a third method in accordance with the first embodiment of the present invention.

FIG. 15 is a view showing the process order at the side of the access device 100 in this method. The process at the side of the access device is the almost same as the operations of the access device in the above-mentioned second method, and instead of issuance of the access rate value acquisition command at the step S1206, an access condition acquisition command is issued at a step S1506 in this method.

Figure 16:
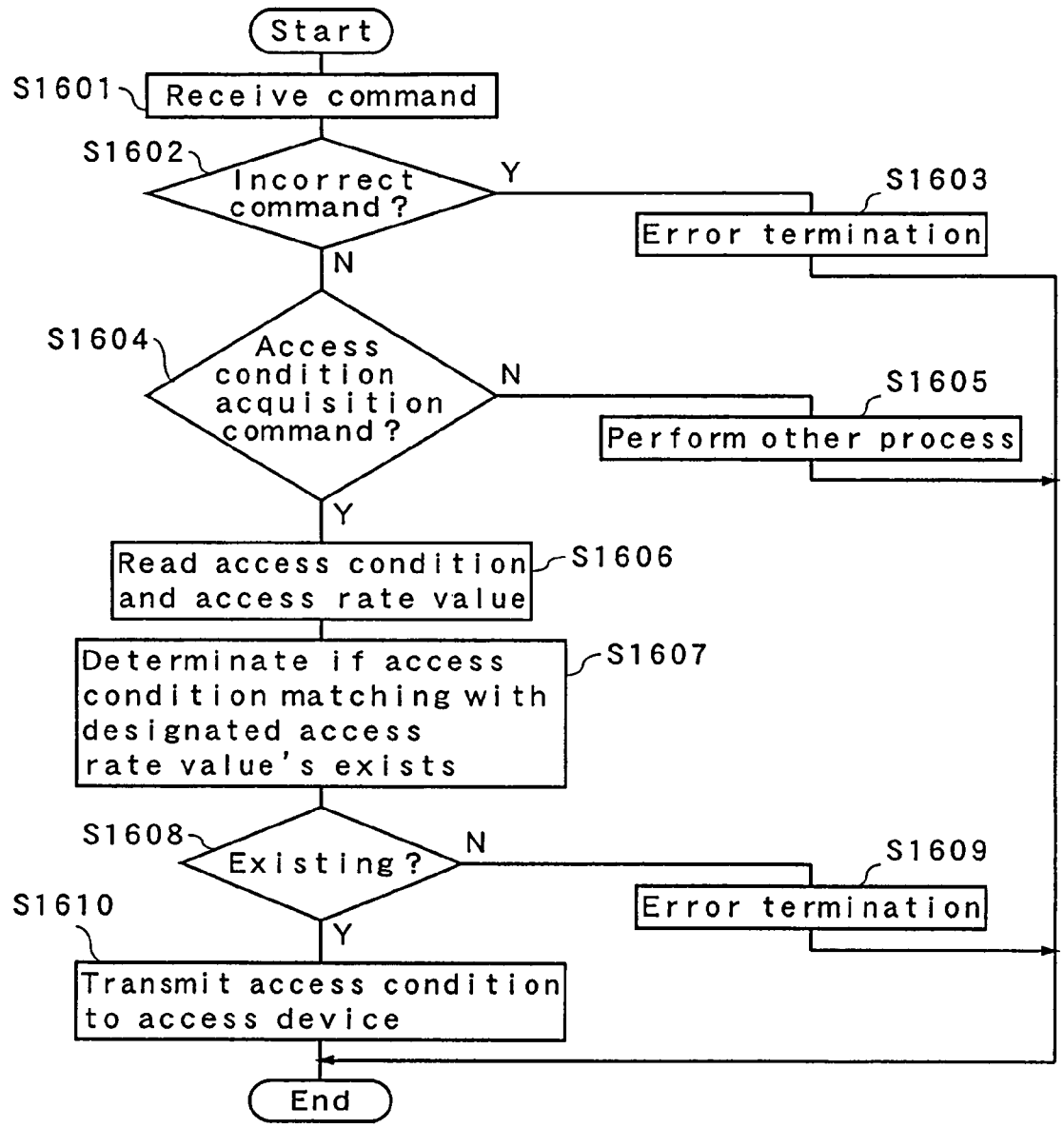
FIG. 16 is a flow chart showing internal process of the semiconductor memory card in the third method in accordance with the first embodiment of the present invention.

FIG. 16 is a view showing the process order at the side of the semiconductor memory card 111 in this method. The process order shown in FIG. 16 is different from the above-mentioned second method in that it is confirmed whether or not a received command is the access condition acquisition command at a step S1604 instead of the access rate value acquisition command at the step S1304 and when the command is the access condition acquisition command, the access rate values are read from the card information storage part 132 (step S1606). Then, based on the access condition read at step 1607, it is determined whether or not the access condition matching with the access rate values designated by the access device exist. When such access condition does not exist at S1608, error termination is done (S1609), and when the access condition exists, the access condition are transmitted to the access device (S1610) and process is finished.

In the process order shown in FIGS. 15 and 16, the access device 100 can input the access rate values to the semiconductor memory card 111 and acquire the access condition according to the rate values. The access condition and access rate values in this method are information shown in FIG. 11(b), for example. In this method, performance values required in accessing to the semiconductor memory card 111 are input and the access condition to which the access device 100 should obey to meet the performance values are acquired from the semiconductor memory card 111. In this manner, the access device 100 can recognize how to access the semiconductor memory card 111 to meet the desired access performance, thereby enabling access with the desired access performance to be realized.

Subsequently, a fourth method is a method in which the access device 100 inputs the access condition and access rate values to the semiconductor memory card 111 and the semiconductor memory card 111 determines to return whether or not the input access rate values are met in the case of access on the input access condition. This method will be described referring to FIGS. 17 and 18.

Figure 17:
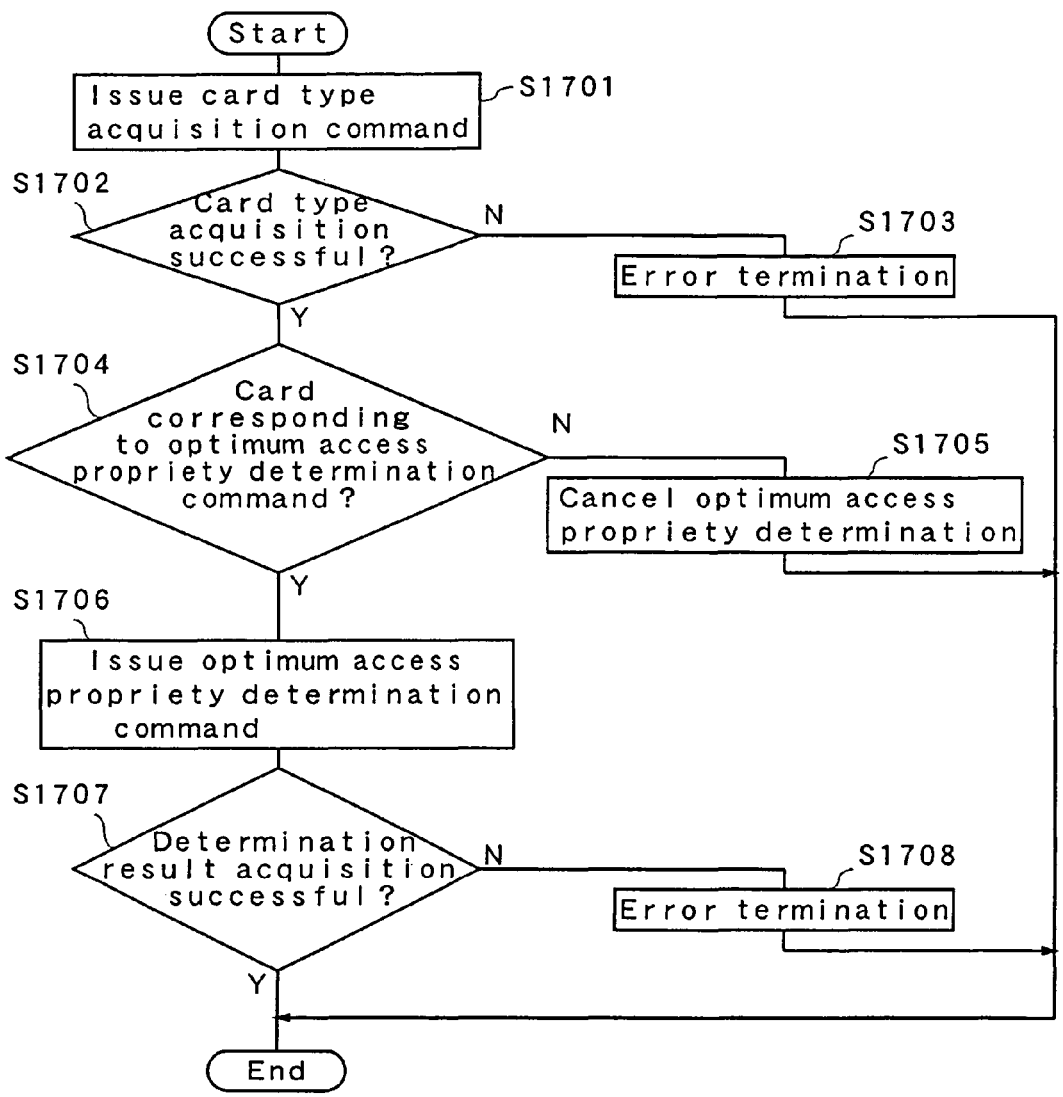
FIG. 17 is a flow chart showing internal process of the access device in a fourth method in accordance with the first embodiment of the present invention.

FIG. 17 is a view showing process order at the side of the access device 100 in this method. In FIG. 17, as in the first method described above, the card type acquisition command is issued and when acquisition is successful, it is determined whether or not the card responds to an optimum access propriety determination command (S1704). When the card does not respond to the command, optimum access propriety determination is canceled (S1705). When the card responds to the command, the optimum access propriety determination command is issued at S1706. In this method, since the access device 100 inputs the access condition and access rate values to the semiconductor memory card 111, the optimum access propriety determination command is a command having the access condition and access rate values as arguments. It is determined whether or not acquisition of the determination result has succeeded (S1707), when acquisition is unsuccessful, error termination is done (S1708) and when acquisition is successful, the process is finished. Information acquired from the semiconductor memory card 111 as the result of the command becomes the determination result of whether the designated access rate values are met in the case of access on the designated access condition.

Figure 18:
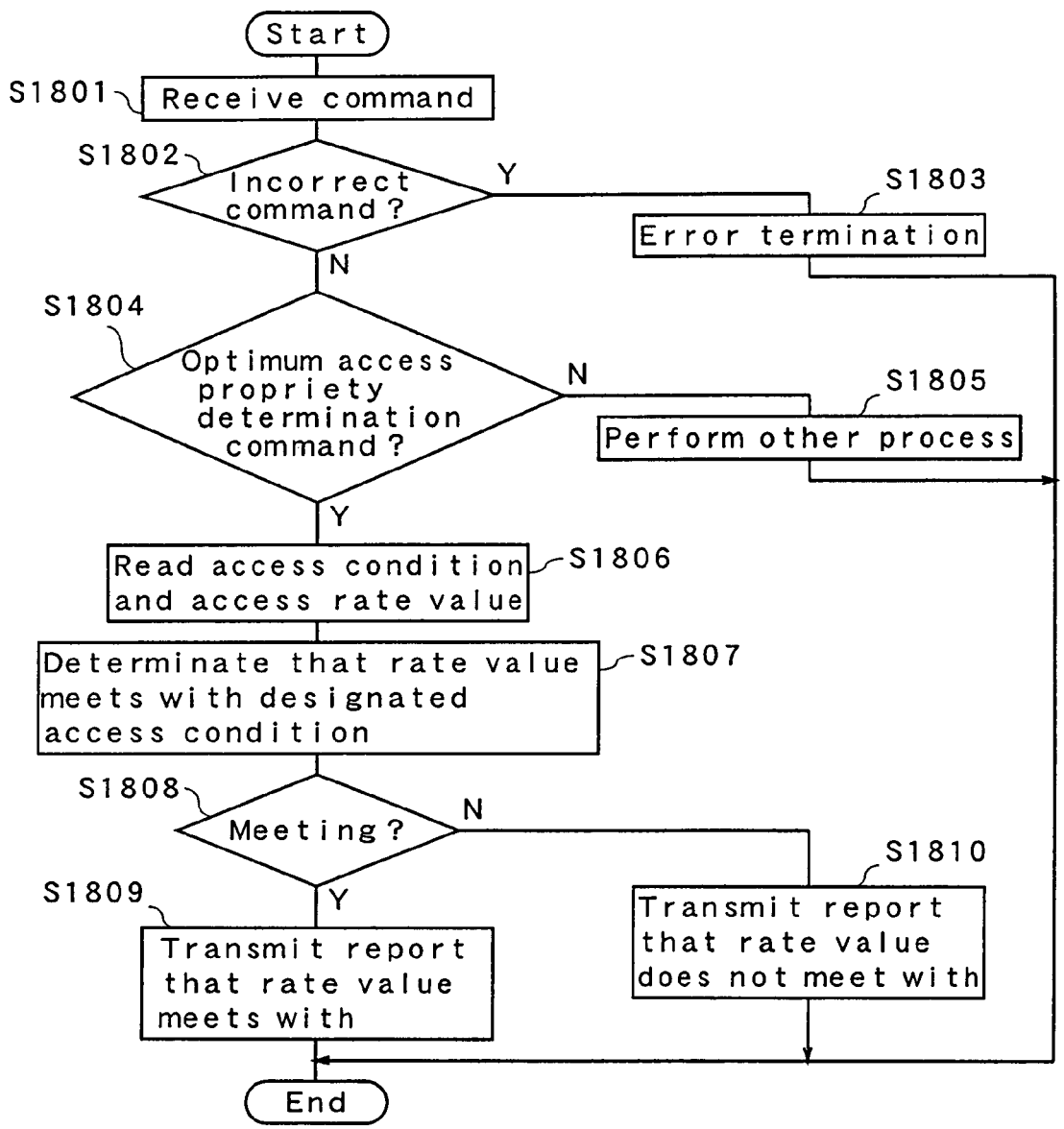
FIG. 18 is a flow chart showing internal process of the semiconductor memory card in the fourth method in accordance with the first embodiment of the present invention.

Next, process order at the side of the semiconductor memory card 111 as shown in FIG. 18 will be described. Similarly to the first method, the access device 100 also issues the card type acquisition command in this method and the process at the side of the semiconductor memory card 111 is the same as the process shown in FIG. 9. FIG. 18 is a view showing the process order at the side of the semiconductor memory card 111 in the case where the optimum access propriety determination command is issued from the access device 100 in description of FIG. 17. When the process in FIG. 18 is started, a command is received at S1801, it is determined whether or not the received command is an incorrect command and when the command is the incorrect command, error termination is done (S1802, S1803). When the received command is not an incorrect command, it is determined whether or not the command is the optimum access propriety determination command (S1804) and when the command is not the determination command, other process is performed (S1805). When the command is the determination command, the semiconductor memory card 111 reads the access condition and access rate values from the card information storage part 132 (S1806). Next, referring to the read access condition and the access rate values corresponding to them, it is determined whether or not the access rate values designated by the access device 100 are met when the access device 100 performs access on the access condition designated in the arguments of the command (S1807, S1808). When the access rate values are met, the fact that the access rate values are met is informed to the access device 100 and process is finished (S1809). When the access rate values are not met, the fact that the access rate values are not met is informed and process is finished (S1810).

As described above, in the process order shown in FIGS. 17 and 18, the access device 100 can input the access condition and access rate values to the semiconductor memory card 111 and confirm whether or not the access rate values are met when accessing the semiconductor memory card 111 on the access condition. The access condition and access rate values in this method are similar to the information shown in FIG. 14, for example. According to this method, prior to access, the access device 100 can recognize whether or not desired access performance is met in the assumed access method.

Subsequently, as a fifth method, the case where a flag representing rate performance level among information on the access rate of the semiconductor memory card 111 is used will be described. The flag may be used in place of the access rate values described in the first method to fourth method and may be contained in the access rate values as shown in FIG. 7. The process between the access device 100 and semiconductor memory card 111 in this method uses any of processes described in the first method to fourth method.

FIG. 19(a) is a view showing an example of rate performance level determination reference in this method and FIG. 19(b) is a view showing an example of determination results. The rate performance level determination reference shown in FIG. 19(a) is stored as the fifth information in the card information storage part 132. The rate performance level determination reference shown in FIG. 19(a) uses standard values of transfer rate in each of reading process, writing process and erasing process as values for determination, and based on the determination reference, one of the rate performance levels "high-rate, "medium-rate" and "low-rate" is allocated to each access value. Similarly, as to the worst values of transfer rate, the rate performance level determination reference exists. In the example shown in FIG. 19(b), the rate performance level "high-rate" is allocated to each access rate value.

In this method, access performance of the semiconductor memory card 111 is classified not only in numerical value but in objective level in this manner so that the access device 100 may acquire level from the semiconductor memory card 111. Thus, the access device 100 can easily recognize access performance of the semiconductor memory card 111.

Subsequently, as a sixth method, the case where a flag representing power consumption level of information on physical characteristics of the semiconductor memory card 111 is used will be described. The method in which the access device 100 inputs the flag to the semiconductor memory card 111 and the access condition corresponding to it and access rate values are acquired will be described. In this method, it is assumed that information on a plurality of access condition and access rate values with associating the power consumption level exists in the card information storage part 132.

The process between the access device 100 and semiconductor memory card 111 in this method uses any of processes described in the first method to fourth method. Here, the case where the process is applied to the first method is described as an example. Process at the side of the access device 100 is the same as the process order shown in FIG. 8. However, a distinction between them lies in that the power consumption level representing the level of power consumption is added as an argument of the optimum access information acquisition command issued to the semiconductor memory card 111 by the access device 100 at S806. The power consumption level represents the degree of the power consumed by the semiconductor memory card 111 by dividing into a plurality of levels, and for example, the power consumption is represented in 3 grades of "large power consumption", "medium power consumption" and "small power consumption".

Figure 20:
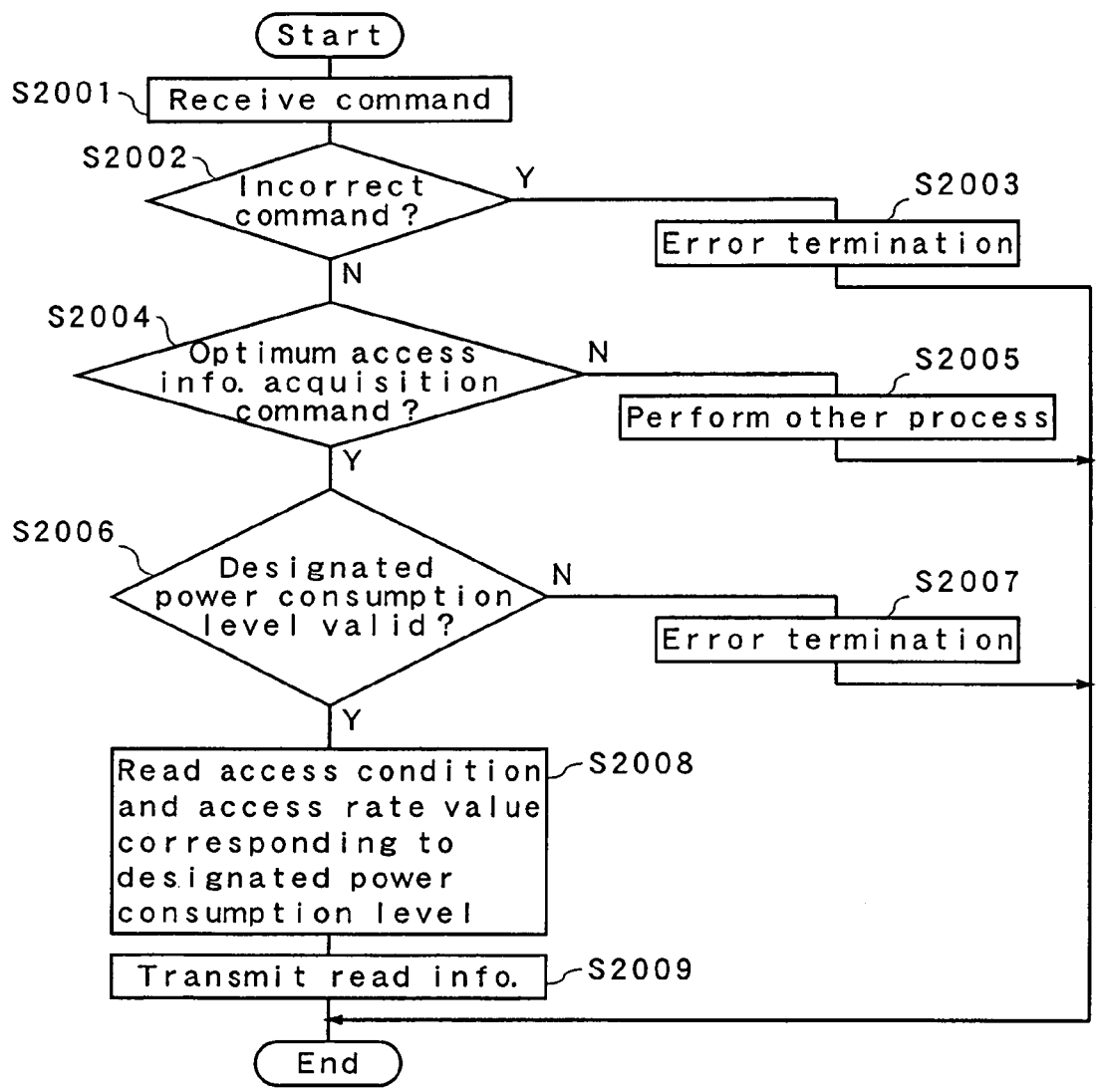
FIG. 20 is a flow chart showing internal process of the semiconductor memory card in a sixth method in accordance with the first embodiment of the present invention.

Next, process order at the side of the semiconductor memory card 111 as shown in FIG. 20 will be described. Also in this method, processes at S2001 to 2005 are the same as the processes of S1001 to S1005 at the side of the semiconductor memory card 111 as shown in FIG. 10. When the received command is the optimum access information acquisition command, it is determined whether or not the power consumption level designated as the argument of the optimum access information acquisition command issued from the access device 100 is a valid value at S2006. When the level is not valid, error process is performed (S2007). When the level is valid, access condition and access rate values for optimum access in the designated power consumption level are read from the card information storage part 132 at S2008. Then, the read information is transmitted to the access device 100 and process is finished (S2009). That is, in this method, it is assumed that plural pieces of information stored in the card information storage part 132 with associating the power consumption level exist, and information according to the power consumption level designated by the access device 100 is selected and the selected information is transmitted to the access device 100.

In this method, when information on access rate is thus acquired from the semiconductor memory card 111, a value representing the power consumption level that the access device 100 assumes is designated in the semiconductor memory card 111 and the access device 100 acquires information on access rate at the time when the semiconductor memory card 111 operates with the designated electrical power consumption. Whereby, when the access device 100 intends to drive the semiconductor memory card 111 with low power consumption, the access device 100 can recognize necessary access condition and access rate values at this time.

Although in this method as in the first method, a flag of the power consumption is input to the semiconductor memory card 111 and the access condition and access rate values corresponding to it are acquired, the power consumption level in addition to the access condition may be shown in the memory card and the access rate corresponding to it may be acquired as described in the second method. Alternatively, as described in the third method, the flag representing the power consumption level in addition to the access rate may be input to the semiconductor memory card 111 and the access condition corresponding to it may be acquired. Furthermore, as described in the fourth method, the flag representing the electrical power consumption in addition to the access condition and access rate may be input and the result of whether the condition is met may be acquired from the semiconductor memory card 111.

Subsequently, a seventh method is a method in which the semiconductor memory card 111 returns information that the access device 100 minimally requires to calculate the access rate values. This method will be described using FIGS. 21 to 25. In this case, contents of the below-mentioned access performance basic information list (APBIL) may be held in the process time inside card shown in FIG. 7 of the card information storage part 132 shown in FIG. 7.

Figure 21:
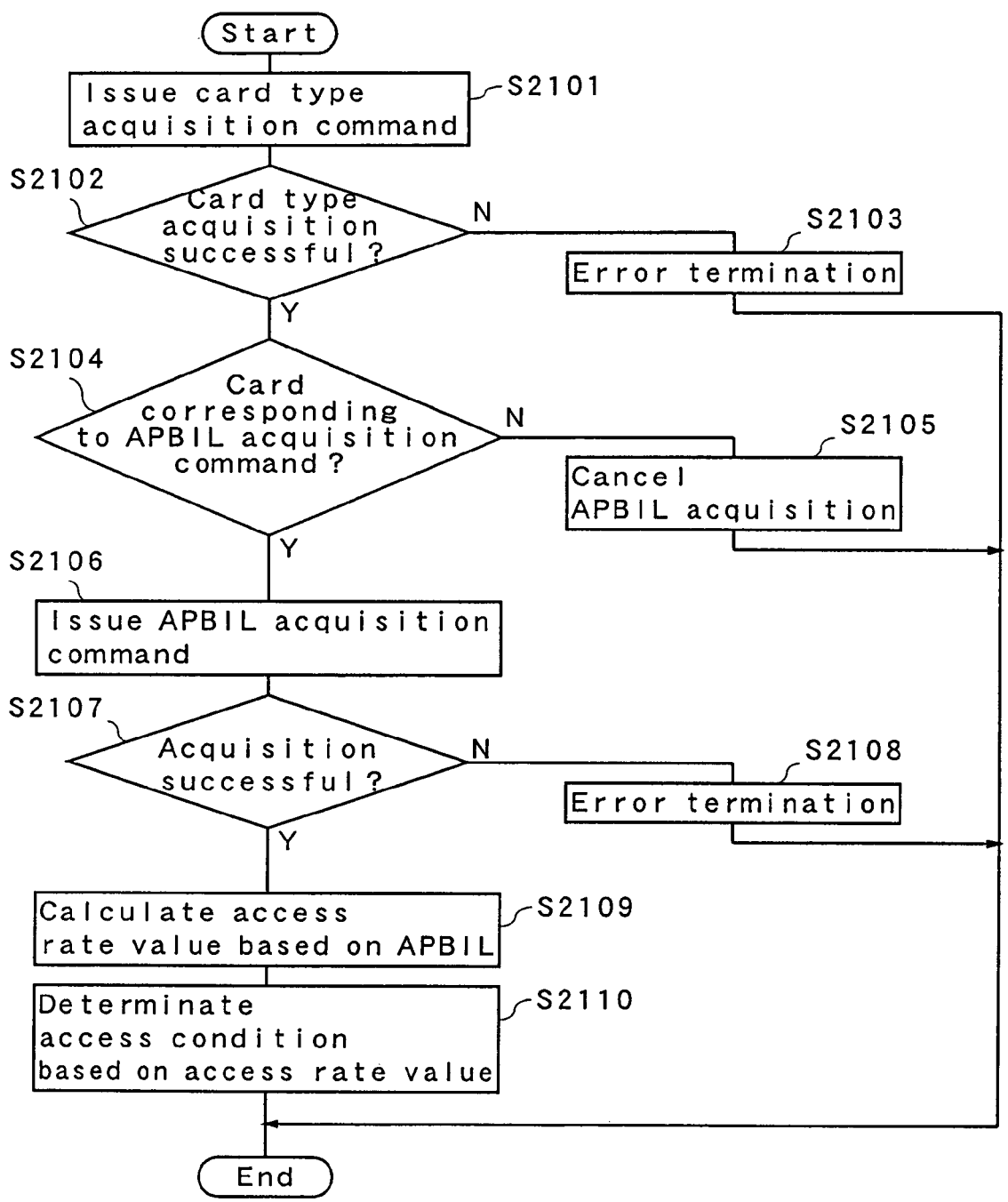
FIG. 21 is a flow chart showing internal process of the access device in a seventh method in accordance with the first embodiment of the present invention.
Figure 22:
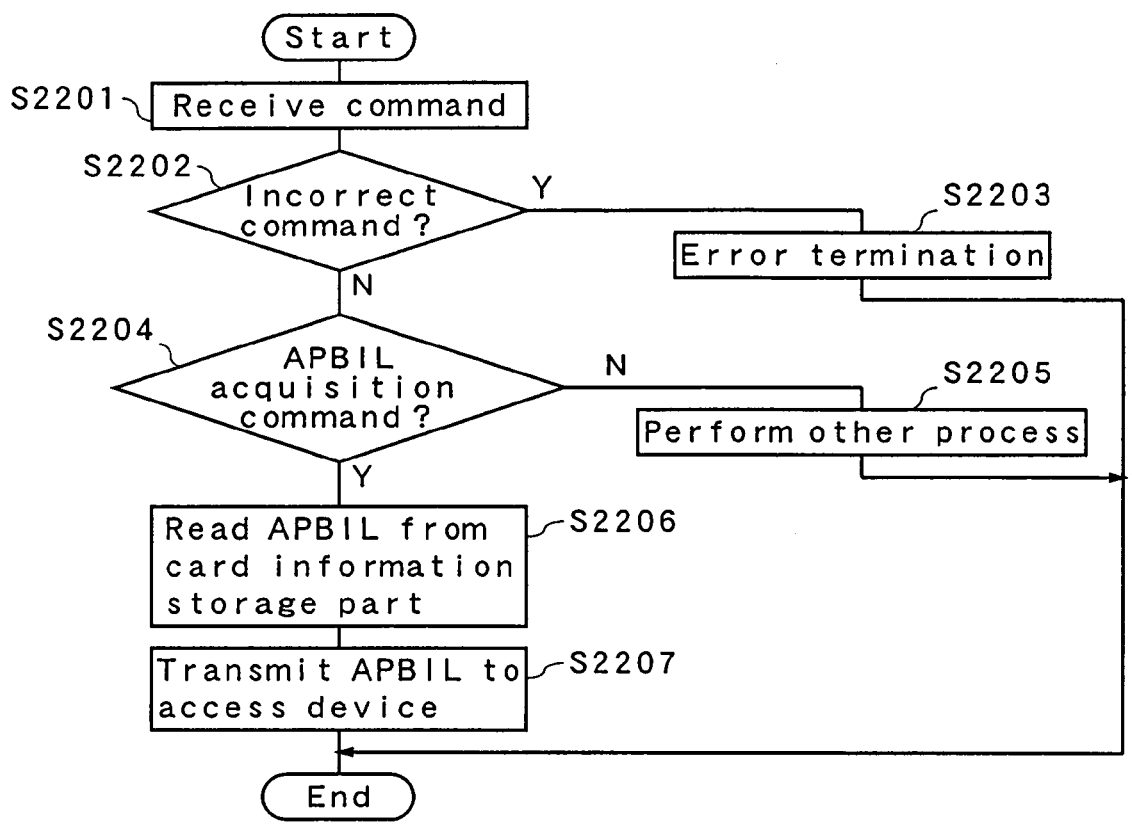
FIG. 22 is a flow chart showing internal process of the semiconductor memory card in the seventh method in accordance with the first embodiment of the present invention.

FIG. 21 is a view showing process order at the side of the access device 100 in this method and FIG. 22 is a view showing process order at the side of the semiconductor memory card 111 in this method. In the process order at the side of the access device 100 shown in FIG. 21, the card type acquisition command is firstly issued (S2101) and it is determined whether or not acquisition is successful (S2102). When acquisition is unsuccessful, error termination is done (S2103) and when acquisition is successful, it is determined whether or not the card responds to an access performance basic information list acquisition command at S2104. When the card does not respond to the command, acquisition of an access performance basic information list is canceled at S2105. When the card responds to the command, the access performance basic information list acquisition command is issued at S2106. Then, it is determined whether or not acquisition of the information list has succeeded (S2107) and when acquisition is unsuccessful, error termination is done (S2108). When acquisition of the information list is successful, access rate values are calculated from the information list at S2109. At a step S2010, access condition required to meet the access rate necessary for the access device 100 are calculated based on the calculated access rate values. These two steps will be described referring to figures after describing the process order at the side of the semiconductor memory card 111 in this method.

Next, the process order at the side of the semiconductor memory card 111 as shown in FIG. 22 will be described. In this method as in the first method, the access device 100 issues the card type acquisition command and the process at the side of the semiconductor memory card 111 is the same as the process shown in FIG. 9. FIG. 22 is a view showing the process at the side of the semiconductor memory card 111 in the case where the access performance basic information list acquisition command is issued from the access device 100. In the process shown in FIG. 22, a command is received (S2201) and when the received command is an incorrect command, error termination is done (S2202, S2203). When the command is not an incorrect command, it is checked whether or not the command is the access performance basic information list acquisition command at S2204. When the received command is not the command, other process is performed (S2205) and the access performance basic information list acquisition command is read from the card information storage part 132 (S2206, S2207).

Figure 25:
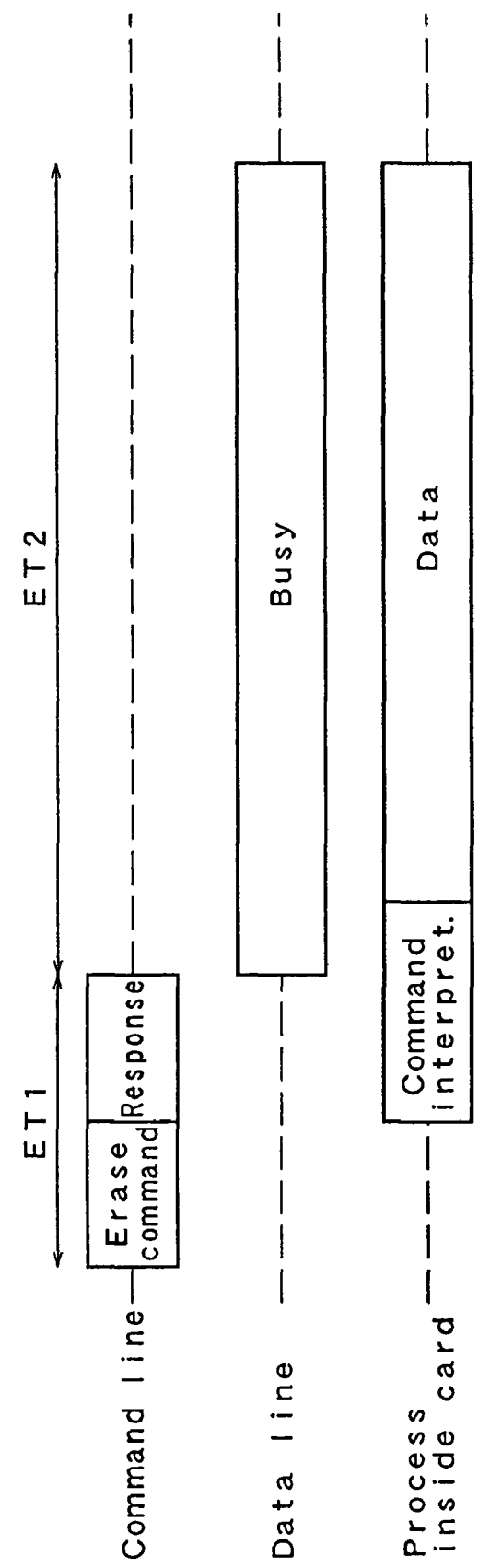
FIG. 25 is an explanation view showing an example of the access timing between the access device and semiconductor memory card in the erasing process in the seventh method in accordance with the first embodiment of the present invention.

Next, an access performance basic information list using FIGS. 23, 24 and 25 and a method of calculating access rate values using this list will be described. FIG. 23 is a view showing an example of the access performance basic information list (APBIL) that the semiconductor memory card 111 returns to the access device 100. FIGS. 24 and 25 are views showing an example of timing of command-response between the access device 100 and semiconductor memory card 111. Numerical values representing the access performance of the semiconductor memory card 111 include transfer rate and etc. However, since factors for determining the transfer rate between the access device 100 and semiconductor memory card 111 exist not only in the semiconductor memory card 111 but also in access device 100, condition at the side of the access device 100 needs to be considered to derive actual transfer rate. In this method, by allowing the access device 100 to acquire information on determination factors of the access performance at the side of the semiconductor memory card 111, the access device 100 can calculate the access rate in consideration with the factors at the side of the access device 100.

FIG. 23 is a view showing an example of the access performance basic information list (APBIL) as information on the factors for determining the access performance at the side of the semiconductor memory card 111. As shown in the figure, each of the reading process, writing process and erasing process each has tables 1-A, 1-B and 1-C, respectively.

FIG. 23(b) shows busy time per data transfer of 512 bytes in the writing process. In this information list, a table which varies depending on the process unit size, sequential access (SA) and random access (RA) as the factors for changing the process time is shown.

Next, a method of calculating access rate values on the basis of the access performance basic information list shown in FIG. 23 will be described. FIGS. 24 and 25 are views showing an example of timing of command-response between the access device 100 and semiconductor memory card 111. Each of FIGS. 24(a), 24(b) and 25 corresponds to the reading process, writing process and erasing process, respectively. The access rate value in the reading process shown in FIG. 24(a) is calculated on the basis of a total of a command issuance process time RT1, process time inside card RT2 and data transfer time RT3. Here, the RT1 and RT3 are time periods determined depending on a clock frequency which inputs to the semiconductor memory card 111 by the access device 100 and the time can be calculated at the side of the access device 100. On the other hand, the RT2 is a time period required for process inside card and is determined depending on the semiconductor memory card 111. Thus, the access performance basic information list acquired from the semiconductor memory card 111 stores information necessary for determining the RT2 therein.

Similarly, the access rate value in the writing process shown in FIG. 24(b) is calculated on the basis of a total of a command issuance process time WT1, process time inside card WT2 and data transfer time WT3. Therefore, as in the reading process, the access performance basic information list stores information necessary for determining the process time inside card WT2 therein.

Similarly, the access rate value in the erasing process shown in FIG. 25 is calculated on the basis of a total of a command issuance process time ET1 and process time inside card ET2. Therefore, as in the reading process, the access performance basic information list stores information necessary for determining the process time inside card ET2 therein.

Here, using the writing process as an example, a calculation example of the access rate value will be described. Time required for data process of unit size (whole write time: WT_A) is calculated as the access rate value. WT_A can be obtained according to the following equation (1).

$$WT\_A = WT1 + \Sigma WT2 + \Sigma WT3 \quad (1)$$

Here, assuming that the data transfer amount required from command input until response acquisition is completed is 160 bits and the input clock frequency is sMHz, the command issuance process time WT1 can be obtained according to the following equation (2).

$$WT1 = 160/(s \times POW(10,6)) \quad (2)$$

Here, POW (X, Y) means X raised to the $Y^{th}$ power.

Next, $\Sigma WT2$ is the total of time required for process inside card and can be obtained according to the following equation (3), assuming that the busy time described in FIG. 24(b) is t (second) and the process unit size is n (byte).

$$\Sigma WT2 = t \times n/512 \quad (3)$$

Next, $\Sigma WT3$ is the total of data transfer time and can be obtained according to the following equation (4), assuming that 4 bits is used as the bit width and that the total number of transfer clocks is 1049 clocks in the case where CRC added to confirm validity of the transfer data is added to data of 512 bytes.

$$\Sigma WT3 = (1049 \times n/512)/(s \times POW(10,6)) \quad (4)$$

Therefore, assuming that the input clock frequency is 25 MHz, that the process unit size is 128 KB and that the access method is sequential access as an example of calculation, t becomes 9.2 μs and WT_A is calculated as 13.1 ms.

In this method, information on factors for determining the access rate at the side of the semiconductor memory card 111 is acquired from the access device 100 to output the access performance corresponding to it. Thus, the access device 100 can calculate the access rate in consideration with the factors at the side of the access device 100.

Next, an eighth method is a method in which a list of access rate values in various access condition is held in the card information storage part 132 and the semiconductor memory card 111 returns in response to an request of the access device 100. This method will be described using FIGS. 26 to 28.

FIGS. 26, 27 and 28 are views showing an example of an access performance table held in the semiconductor memory card 111. FIG. 26(a) shows data size which can be processed in unit time for each input clock and FIG. 26(b) shows standard values and worst values concerning sequential access and random access for each access unit in detail. FIG. 27(a) shows required time for unit size data process in the reading process, writing process and erasing process for each distinct input clock. FIG. 27(b) shows standard values and worst values of the required time for unit size data process in detail in the writing process in which the input clock is 25 MHz, for each process unit size and in sequential access and random access. FIG. 28(a) expresses access performance as process rate at the time of access in unit size and shows tables of the reading process, writing process and erasing process for each input clock. FIG. 28(b) shows standard values and worst values in detail for each process unit size in sequential access and random access in the case of the input clock of 25 MHz and writing process. These pieces of information are different from each other only in their expressing method of access performance and all information expresses the access rate of the semiconductor memory card 111.

Figure 29:
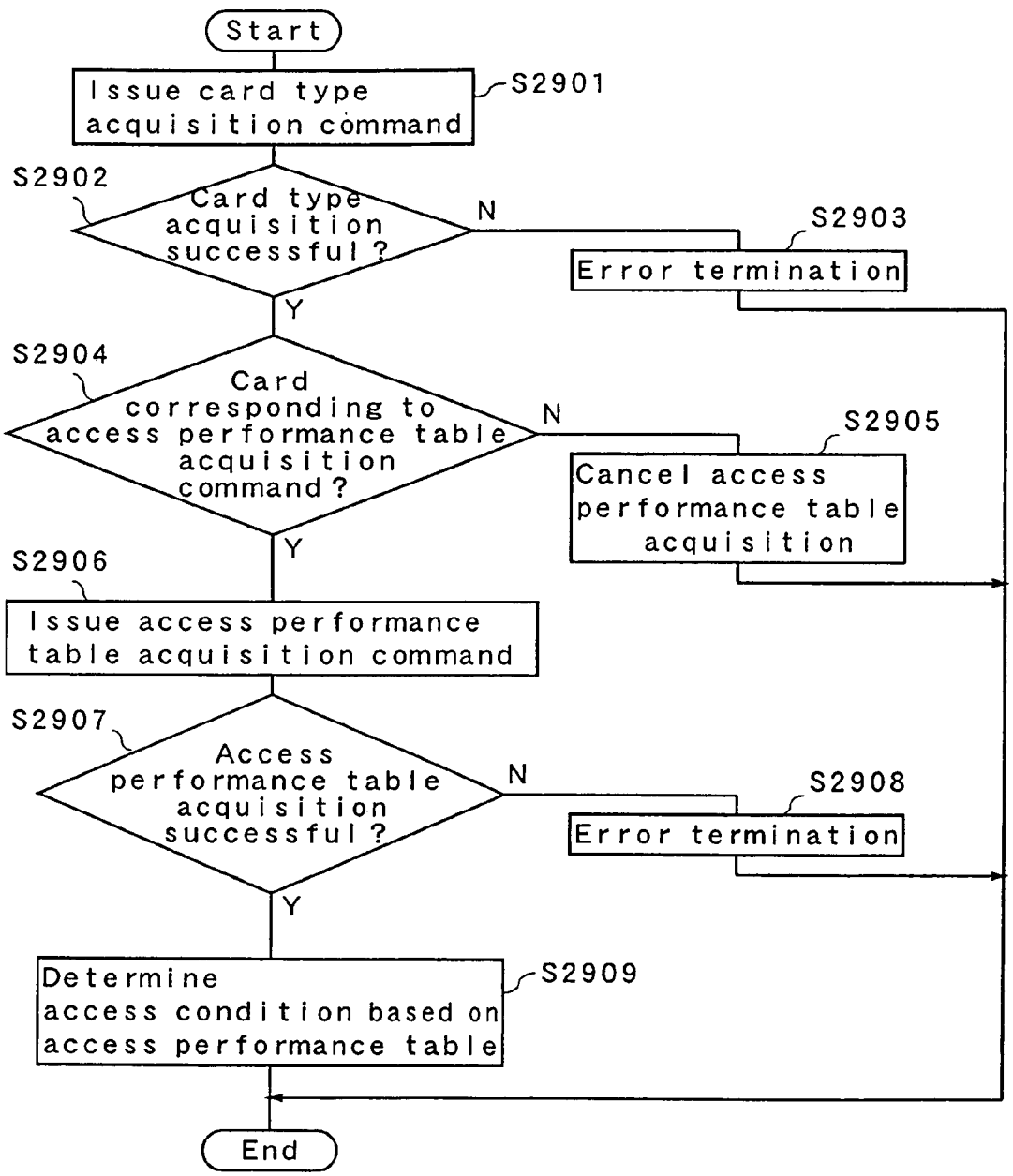
FIG. 29 is a flow chart showing internal process of the access device in the eighth method in accordance with the first embodiment of the present invention.
Figure 30:
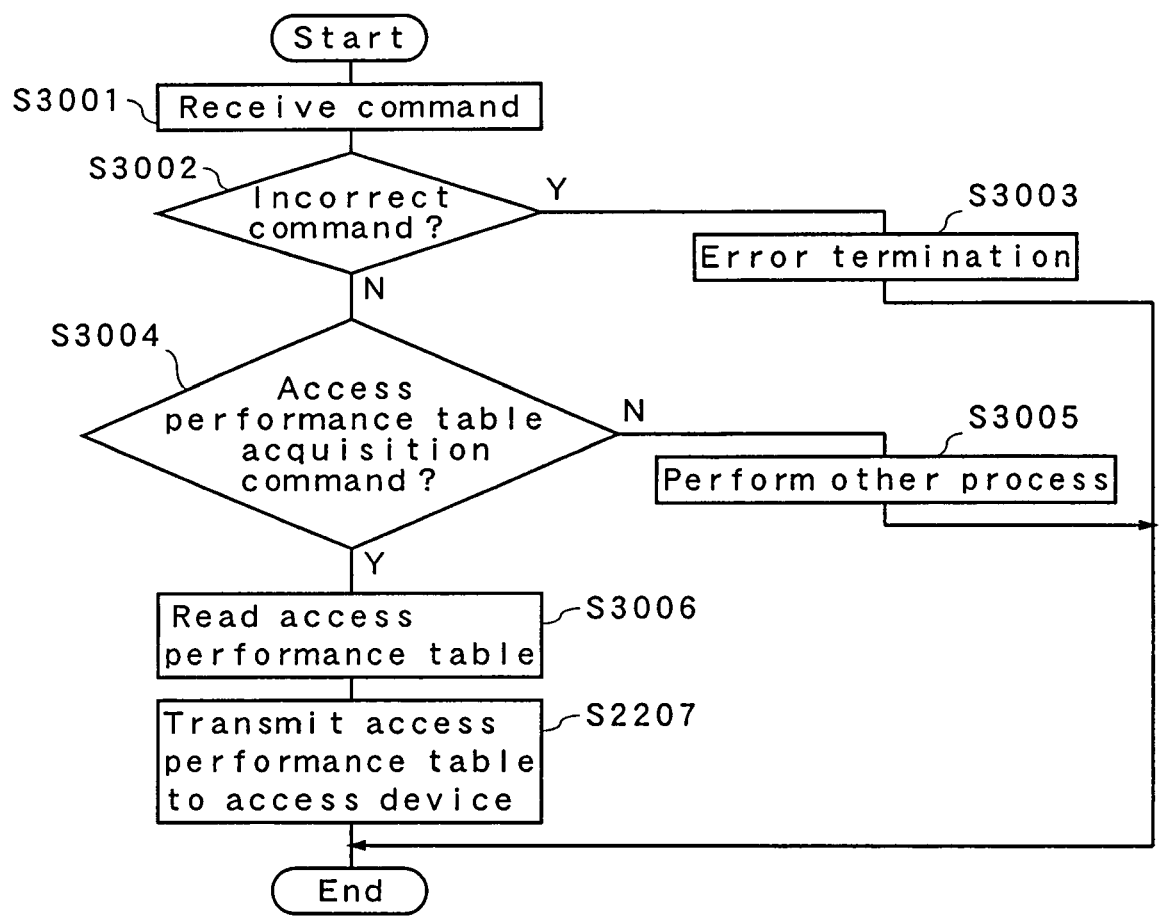
FIG. 30 is a flow chart showing internal process of the semiconductor memory card in the eighth method in accordance with the first embodiment of the present invention.

FIG. 29 is a view showing process order at the side of the access device 100 in this method and FIG. 30 is a view showing process order at the side of the semiconductor memory card 111 in this method. As shown in FIG. 29, the access device 100 firstly issues the card type acquisition command (S2901) and determines whether or not acquisition of card type has succeeded (S2902). When an error occurs in the acquisition, error termination is done (S2903) and when the acquisition is successful, it is determined whether or not the card responds to the access performance table acquisition command at S2904. When the card does not respond to the command, the acquisition of the access performance table is canceled (S2905) and when the card responds to the command, the access performance table acquisition command is issued (S2906). Then, it is determined whether or not acquisition of the access performance table has succeeded at S2907 and when an error occurs, error termination is done (S2908). When acquisition of the access performance table has succeeded, the access condition are determined based on the access performance table at S2909 and the process is finished.

As shown in FIG. 30, the semiconductor memory card 111 receives a command, when the received command is an incorrect command, error process is performed (S3001 to 3003) and it is determined whether or not the received command is the access performance table acquisition command (S3004). When the received command is not the command, acquisition of the access performance table is canceled (S3005), and when the received command is the command, the access performance table is read from the card information storage part 132 (S3006). Then, the access performance table is transmitted to the access device at S3007 and the process is finished.

That is, this method is different from the seventh method in that since the access device 100 acquires information on access rate from the semiconductor memory card 111, the access rate need not be calculated at the side of the access device 100. In this method, the access device 100 can acquire the access performance table and recognize a list of the access condition with respect to the semiconductor memory card 111 and access rate values in accessing the semiconductor memory card on each access condition. Whereby, the access device 100 can recognize how much the access rate value is in the case of access on the access condition that the access device 100 assumes itself and on what access condition access should be done to meet the access rate value that the access device 100 requires.

As described above, in the semiconductor memory card 111 in accordance with this embodiment, the card information storage part 132 holds access performance at the time when the access device 100 accesses the semiconductor memory card 111 therein. The semiconductor memory card 111 transmits a part or all of the information to the access device 100 in response to a request of the access device 100. Thus, the access device 100 can know the access performance of the semiconductor memory card 111. Therefore, the access device 100 can access the semiconductor memory card 111 according to an optimum access method, thereby bringing out the best performance of the semiconductor memory card 111.

It is noted that the information stored in the card information storage part 132 may be updatable. For example, it may be configured so that the determination reference is changed later by inputting the rate performance level determination reference shown in FIG. 19(a) from outside of the semiconductor memory card 111 and updating the reference. As still another example, when information on access performance changes in respond to that the state in the semiconductor memory card 111 changes, it may be configured so that the state in the semiconductor memory card 111 is observed and the information on the access performance changes in respond to that the internal state changes. Furthermore, although determination of the type of the semiconductor memory card 111 is made at the head of all processes at the side of the access device 100 in this embodiment, the type determination may be made only once when firstly accessing the semiconductor memory card 111. Furthermore, all of the information on the access performance shown in FIG. 7 need not be used, only a part of the information may be used or a part of the information may be used in combination with other information. Moreover, although the example in which information as rate performance level and power consumption level is each divided into three types of levels is described, the information may be divided into a plurality of types other than three types of levels. Furthermore, although three types of examples shown in FIG. 26, FIG. 27 and FIG. 28 are described as the access performance tables, other expression form may be used as long as the information represents the access performance of the semiconductor memory card 111 and furthermore, a plurality of expression forms may be combined and used. Moreover, although the first memory 118 which stores the card information therein is described as an updatable nonvolatile memory, an unupdatable nonvolatile memory may be used when the memory need not be updated. In addition, it may be configured so that the card information is stored in the nonvolatile memory 117, not in the first memory 118.

Second Embodiment

In a second embodiment of the present invention, an access device which acquires information on access performance of the semiconductor memory card from the semiconductor memory card having the card information storage part and uses the information for controlling a file system in the access device will be described.

The configuration of the semiconductor memory card and access device in accordance with this embodiment is the same as the configuration shown in FIG. 1. In this embodiment, especially, a file system controller 106, access condition determination part 107, card information acquisition part 108, and card use condition storage part 110 in the ROM 104 in the access device 100 will be described in detail.

Figure 31:
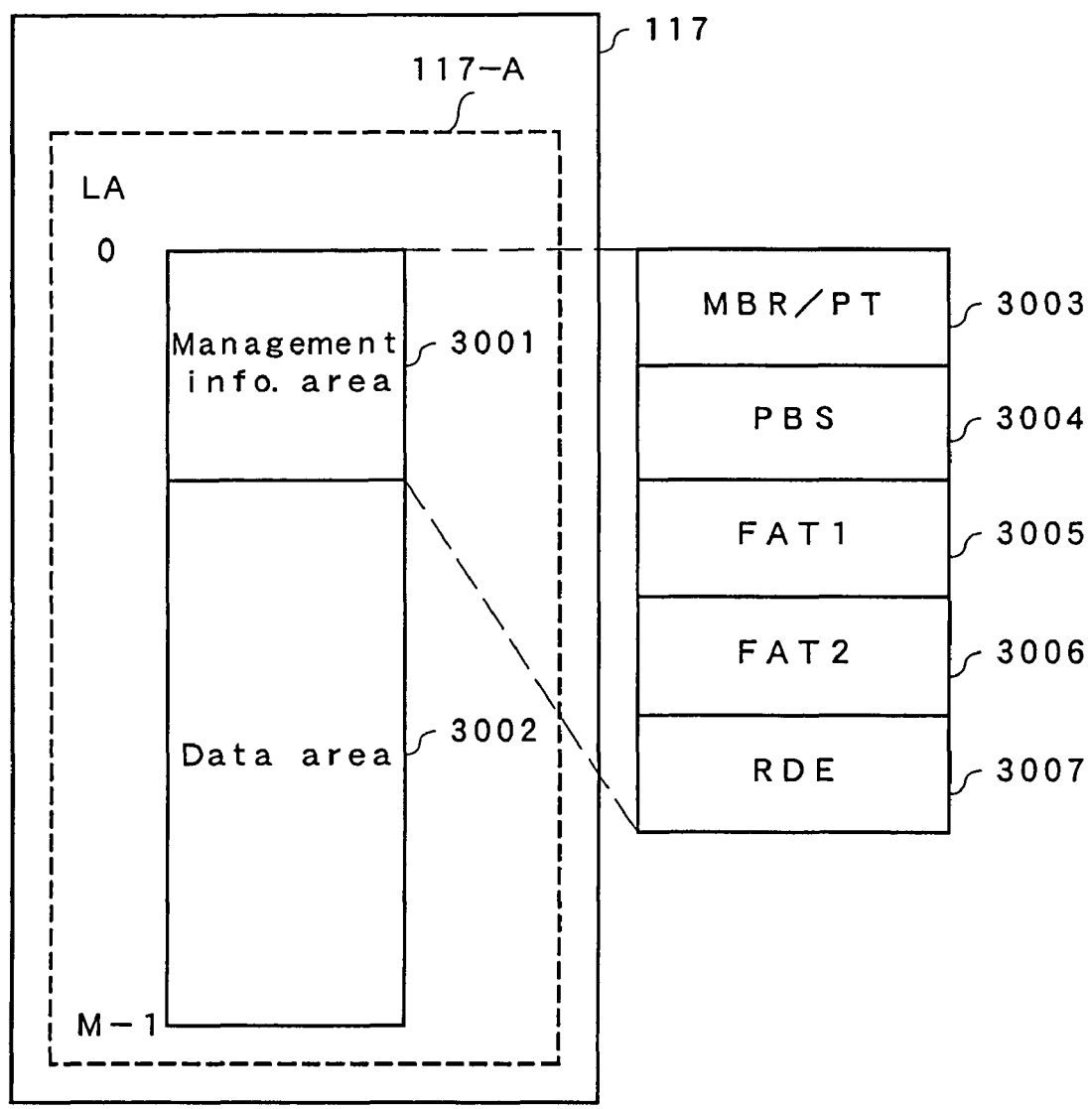
FIG. 31 is an explanation view showing the configuration of a FAT file system in accordance with a second embodiment of the present invention.

Before detailed description in this embodiment, a FAT file system will be described as an example of a file system used for managing data stored in the semiconductor memory card 111. FIG. 31 shows the configuration of the FAT file system. A file system management area 117-A in FIG. 31 means an area managed according to the file system of the nonvolatile memory 117 in the semiconductor memory card 111 and corresponds to whole or a part of the area described as the user data 131 in FIG. 1. In FIG. 31, LA represents a logical address. In the FAT file system, a management information area 3001 for managing the whole of the file system management area 117-A exists at the head of the file system management area 117-A, followed by a data area 3002 for storing data and the like in the file. The management information area 3001 consists of a master boot record and partition table (hereinafter referred to as MBRPT) 3003, partition boot sector (hereinafter referred to as PBS) 3004, file allocation table (hereinafter referred to as FAT) 3005, 3006 and route directory entry (hereinafter referred to as RDE) 3007.

The MBRPT 3003 is a part which stores information for managing the areas by dividing it into a plurality of areas called as partitions therein. PBS 3004 is a part which stores management information in 1 partition therein. The FAT 3005, 3006 are parts which represent physical storage positions of data contained in a file. The RDE 3007 is a part which stores information on a file and directory immediately below a route directory therein. Since the FAT 3005, 3006 are important areas representing physical storage positions of the data contained in the file, the two FATs 3005, 3006 having the same information generally exist in the file system management area for duplication.

The data area 3002 is managed by being divided into a plurality of clusters, and data contained in the file is stored in each cluster. A file which stores a lot of data therein stores the data over a plurality of clusters and link between the clusters is managed by link information stored in the FAT 3005, 3006.

Figure 32:
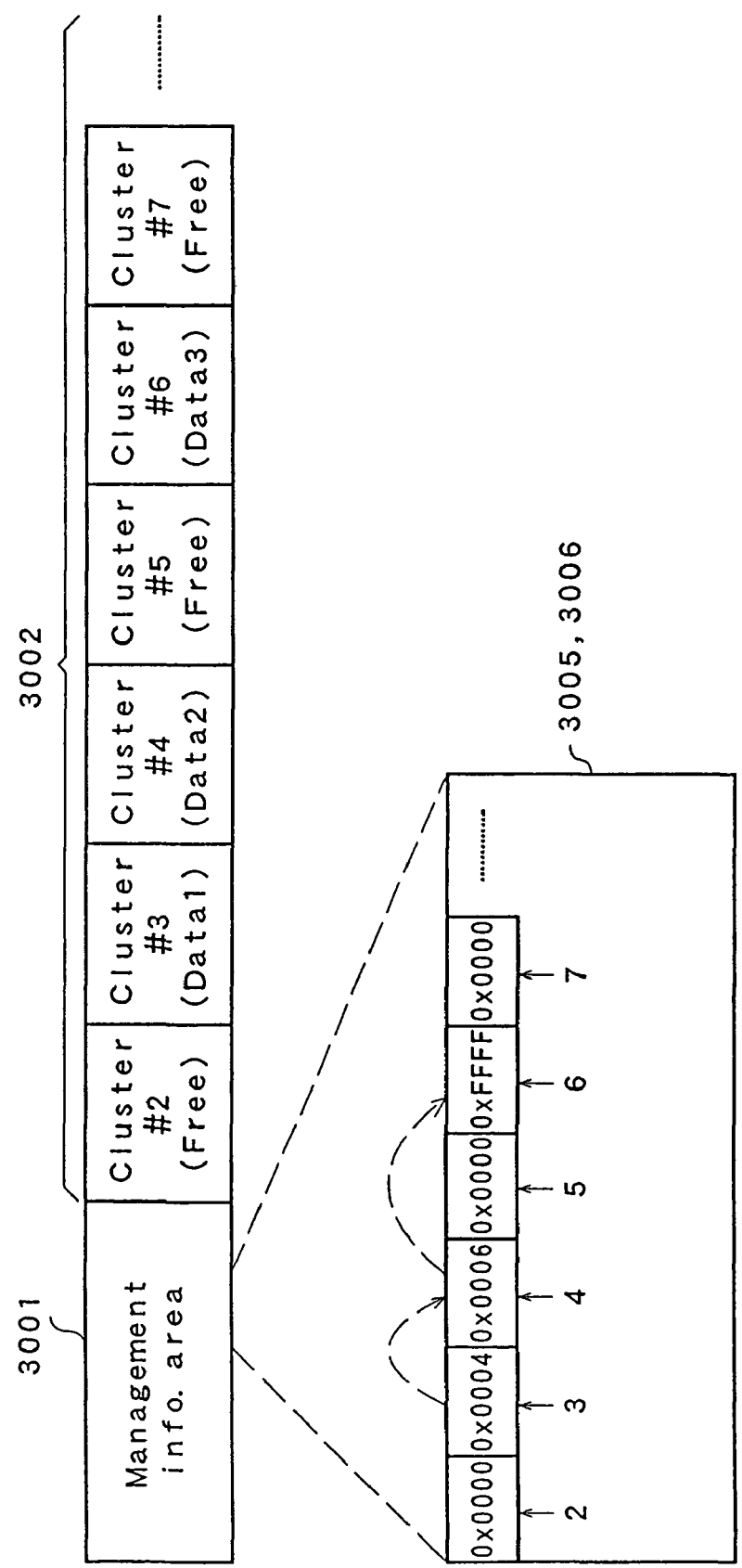
FIG. 32 is an explanation view showing an example of data storage of the FAT file system in accordance with the second embodiment of the present invention.

Next, an example of data storage in the FAT file system will be described using FIG. 32. The data area 3002 is managed in units of fixed length blocks called as clusters and cluster numbers starting from 2 in ascending order are given to the each cluster. The FAT 3005, 3006 manage link information representing the use state of each cluster and link between the clusters and consist of FAT entries corresponding to the cluster numbers. The FAT entry has any size of three types of 12 bit, 16 bit and 32 bit per cluster according to the type of the FAT file system. In the example shown in FIG. 32, the case where 1 entry is represented by 16 bits is shown. Any value of the cluster number of a next linked cluster, 0x000 representing that the concerned cluster is the free area and 0xFFFF representing that the concerned cluster is a link termination is stored in the FAT entry. Parts shown by pointers in an enlarged view in FIG. 32 show the FAT entries corresponding to the cluster numbers 2 to 7, respectively. In this example, the FAT entries corresponding to the cluster numbers 2, 5 and 7 stores 0x000 therein, which means that the three clusters are free areas. The FAT entry corresponding to the cluster number 3, FAT entry corresponding to the cluster number 4 and FAT entry corresponding to the cluster number 6 store 0x0004, 0x0006 and 0xFFFF, respectively, which means that data is divided and the divided data are stored in the three clusters corresponding to the cluster numbers 3, 4 and 6.

Figure 33:
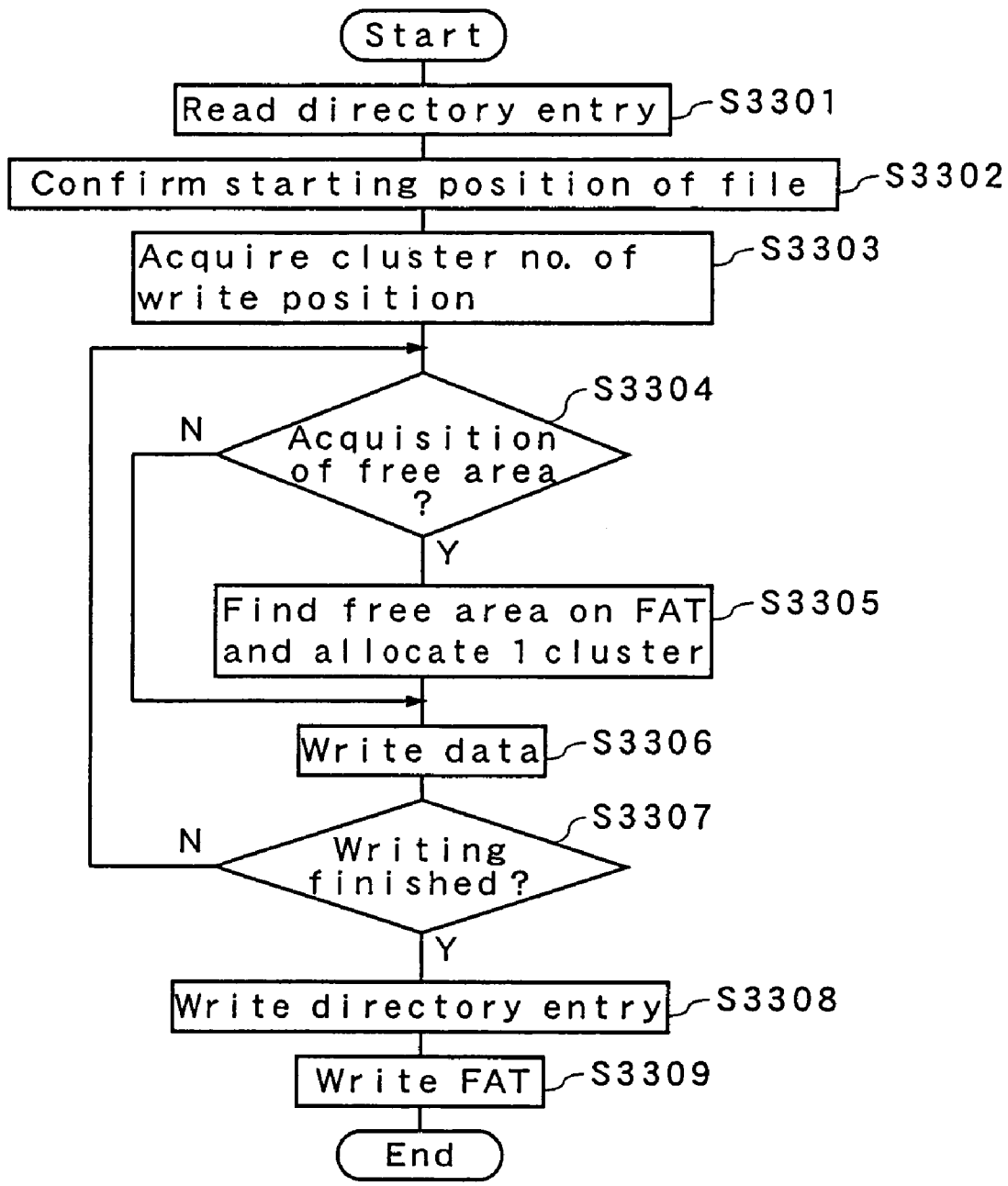
FIG. 33 is a flow chart showing data writing process of the FAT file system in accordance with the second embodiment of the present invention.

Next, an example of a file data writing in the FAT file system will be described using FIG. 33, FIG. 34 and FIG. 35. FIG. 33 is a flow chart showing writing process and FIG. 34 is a view showing an example of a directory entry 3301, FAT 3005, 3006 and data area 3002 before the writing process. FIG. 35 is a view showing an example of the directory entry 3301, FAT 3005, 3006 and data area 3002 after the writing process. In the FAT file system, the directory entry 3301 which stores information such as file name, file size and file attribute therein is stored in a part of the route directory entry 3007 and data area 3002. FIG. 34(*a*) shows an example of the directory entry 3301. A file shown by the directory entry 3301 has a file name of FILE1. TXT and stores data in the file therein starting from the cluster number (Cl. No.) 10. The file size is 60000 bytes. FIG. 34(*b*) shows an example of the FAT data of the cluster numbers 9 to 14. In FIG. 34(*c*), the size of 1 cluster is assumed to be 16384 bytes and data in the file FILE1. TXT is stored over four clusters 10 to 13.

FIG. 33 is a view showing process order of file data writing in the FAT file system. Using FIG. 33, file data writing process will be described. In the file data writing process, firstly, the directory entry 3301 of a target file is read (S3301). Next, a file starting cluster number stored in the read directory entry is acquired to confirm a starting position of file data (S3302). Next, the FAT 3005, 3006 are read and a link is tracked on the FAT 3005, 3006 from the starting position of the file data acquired at S3302 to acquire a cluster number at a writing position (S3303). Next, it is determined whether or not the free area needs to be newly allocated to the file in data writing (S3304). When allocation of the free area is unnecessary, the operation proceeds to process at S3306. When allocation of the free area is necessary, the free area is searched on the FAT 3005, 3006 and the free area of 1 cluster is allocated to the termination of the file (S3305). Next, data to be written in the cluster referred currently is written to the data area 3002 as much as possible (S3306). Next, it is determined whether or not writing of all data is finished (S3307). When data still remains, the operation returns to the process at S3304. When writing of all data is finished, the file size and time stamp stored in the directory entry 3301 is updated and written to the semiconductor memory card 111. Finally, the FAT 3005, 3006 are written to the semiconductor memory card 111 and process is finished (S3309).

When data of 10000 bytes is further written to the file FILE1. TXT having the data of 60000 bytes shown in FIG. 34, as shown in FIG. 35, new data is written to the cluster number Cl. No 14 to change the file to a file having data of 70000 bytes.

In this manner, in the FAT file system, an area is allocated in units of clusters as a file data storage area and data is stored in the area. Furthermore, a plurality of clusters allocated to 1 file are not necessarily continuous and discontinuous areas may be allocated. In the worst case, the file data is written to the discontinuous areas divided in the units of clusters. In this case, the access size to the semiconductor memory card 111 at one time is 1 cluster or less and thus, when the access unit required to access the semiconductor memory card 111 at highest rate is larger than the cluster size, access with the best performance of the semiconductor memory card 111 cannot be realized.

In this embodiment, by acquiring information on access performance from the semiconductor memory card 111 and using the information for processing of the file system, the method of accessing the file according to the access method most suitable for the semiconductor memory card 111 is provided.

Subsequently, determination process of a file system access unit in this embodiment will be described. The file system access unit (hereinafter referred to as FS access unit) is a management unit newly provided in this embodiment in addition to the cluster generally used as the management unit by which the file system carries out area management. The size of cluster cannot be easily changed since its upper limit is defined for ensuring compatibility between devices using the file system. However, the access unit required for optimum access to the semiconductor memory card 111 does not necessarily have the size within the higher limit size of cluster. Thus, in this embodiment, the FS access unit as a new area management unit set based on the information on access performance acquired from the semiconductor memory card 111 is provided and used for process of the file system. The access according to characteristics of the semiconductor memory card 111 can be realized while keeping comparability with the existing file system.

Figure 36:
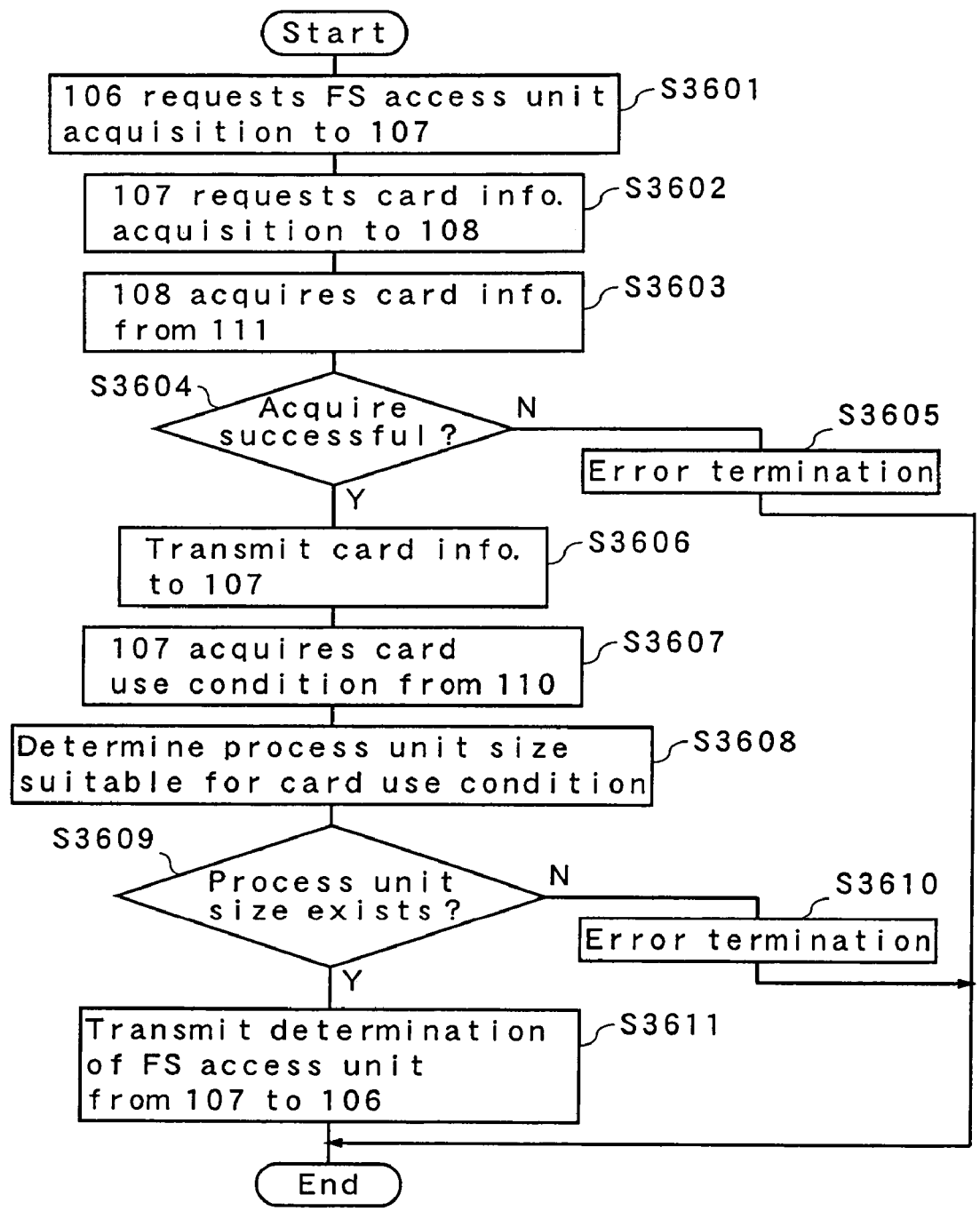
FIG. 36 is a flow chart showing FS access unit acquisition process in accordance with the second embodiment of the present invention.

Referring to FIG. 36, the determination process of the FS access unit in the present embodiment will be described. FIG. 36 is a view showing an example of process order in which the file system control part 106 acquires the FS access unit from the access condition determination part 107. In FIG. 36, firstly, the file system control part 106 requests acquisition of the FS access unit to the access condition determination part 107 (S3601). Next, the access condition determination part 107 requests acquisition of card information to the card information acquisition part 108 (S3602). Next, using any of the methods described in the first embodiment, the card information acquisition part 108 acquires card information from the semiconductor memory card 111 (S3603). When acquisition of the card information is unsuccessful, the card information acquisition part 108 informs an error to the file system control part 106 via the access condition determination part 107 and process is finished (S3604, S3605). When acquisition is successful, the card information acquisition part 108 transmits the card information to the access condition determination part 107 (S3606). Next, the access condition determination part 107 acquires access condition at the time when the access device 100 accesses the semiconductor memory card 111 and card use condition as information such as a desired access rate value from the card use condition storage part 110 (S3607). Next, the card information is compared with the card use condition to determine whether or not the process unit size suitable for the card use condition exists (S3608). When no suitable process unit size exists, for example, the semiconductor memory card 111 cannot meet the access rate value shown by the card use condition, the error is informed to the file system control part 106 and the process is finished (S3609, S3610). When the suitable process unit size exists, the FS access unit is determined to be the process unit size and the access condition determination part 107 transmits the FS access unit to the file system control part 106 and the process is finished (S3611).

In this manner, in this embodiment, the card information is compared with the card use condition and the FS access unit is determined to be the most suitable access unit to access the semiconductor memory card 111. As shown in FIG. 28(*b*), in the case of the input clock of 25 MHz and sequential access in the writing process, the semiconductor memory card 111 having the access performance of 6 MB/s in units of 16 KB and 10 MB/s in units of 128 KB as an standard value is assumed. Here, when the access device 100 requires the access performance of 8 MB/s, the FS access unit is determined to be 128 KB. By accessing the semiconductor memory card 111 in units of FS accesses, desired access performance can be obtained.

Furthermore, as an example of the card use condition, the access condition and access rate values as shown in FIG. 14 are given. That is, the access condition in FIG. 14(*a*) is information showing condition on the assumed access method for the semiconductor memory card 111 and the access rate values shown in FIG. 14(*b*) are access performance values obtained when accessing the semiconductor memory card 111 on the condition. The access device 100 holds these information on access performance, thereby enabling determination on whether or not the semiconductor memory card 111 can meet the self-requiring access performance.

Furthermore, like the first method described in the first embodiment, the process order shown in FIG. 36 is the process order in which the access device 100 does not input the information on the access condition and access rate values. When the access device 100 needs to input the access condition as in the second method described in the first embodiment, a step in which the access condition determination part 107 acquires the card use condition from the card use condition storage part 110 to inform the condition to the card information acquisition part 108 is added between the steps S3601 and S3602 in the process shown in FIG. 36.

Hereinafter, some methods using the FS access unit determined in the process order shown in FIG. 36 for process of the file system will be described.

Figure 37:
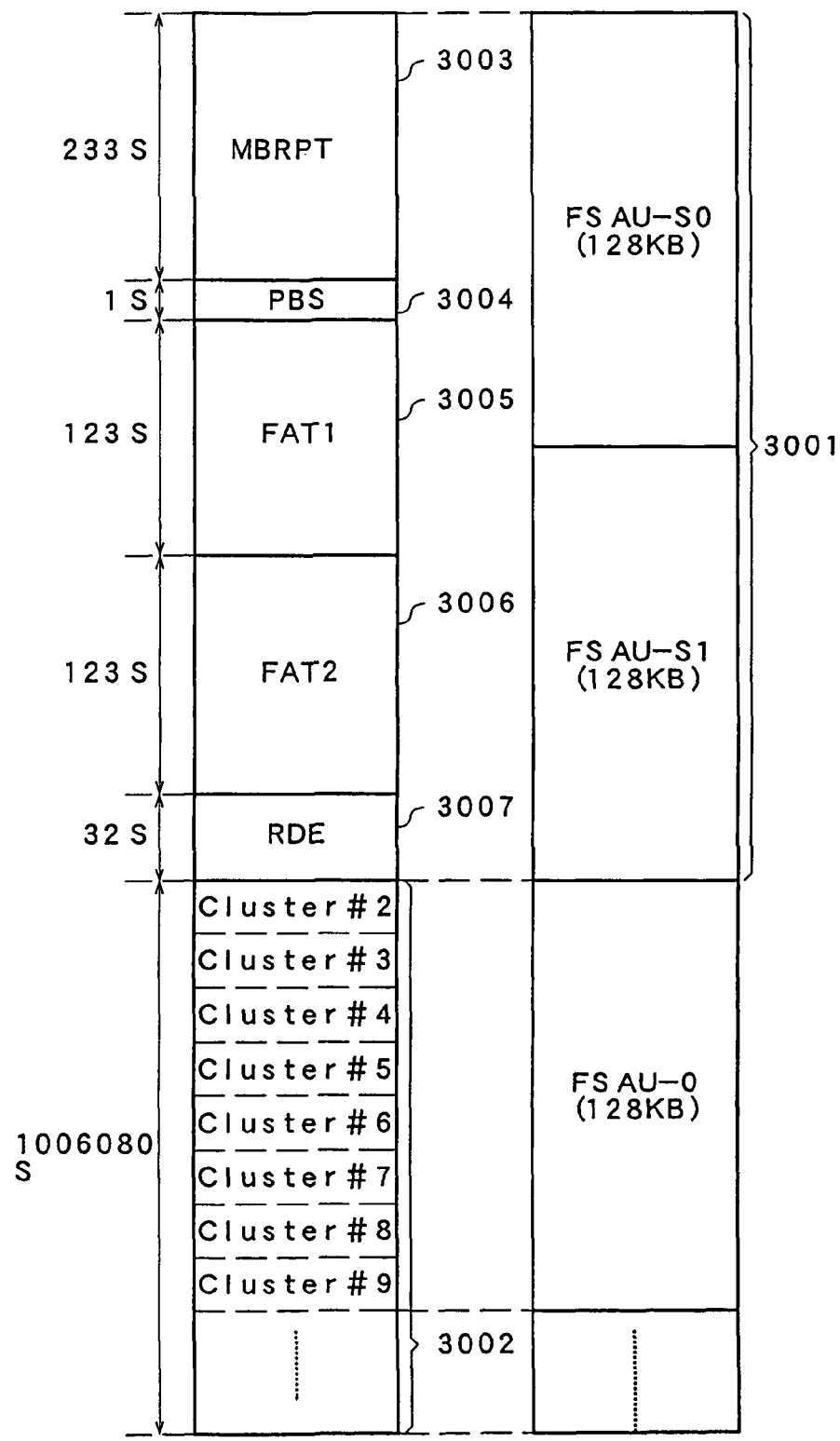
FIG. 37 is an explanation view showing a configuration example of formatted file system using an FS access unit in a first method in accordance with the second embodiment of the present invention.

As a first method, a method of formatting the file system in consideration with the FS access unit will be described. FIG. 37 shows a configuration example in the case where the file system is formatted in consideration with the FS access unit. Here, the FS access unit is set as 128 KB so as to have a length of multiples of the cluster size. Here, 1 cluster is set as 16 KB. In FIG. 37, the management information area 3001 consists of the MBRPT 3003, PBS 3004, FAT 3005, 3006 and RDE 3007. In this embodiment, the size of the management information area 3001 is adjusted so as to be set to have a length of M times larger than the FS access unit (M is an integer). Here, as shown in the figure, the management information area 3001 uses 512 sectors (S) over two FS access units FSAU-S0 and FSAU-S1.

Whereby, the head of the data area 3002 corresponds to the FS access unit boundary and the remaining area of the data area 3002 can be efficiently managed in FS access units. Furthermore, since the FS access unit is set so as to have a length of multiples of the cluster size, area management in the data area 3002 is performed in FS access units and can be matched with area management in cluster units.

Figure 38:
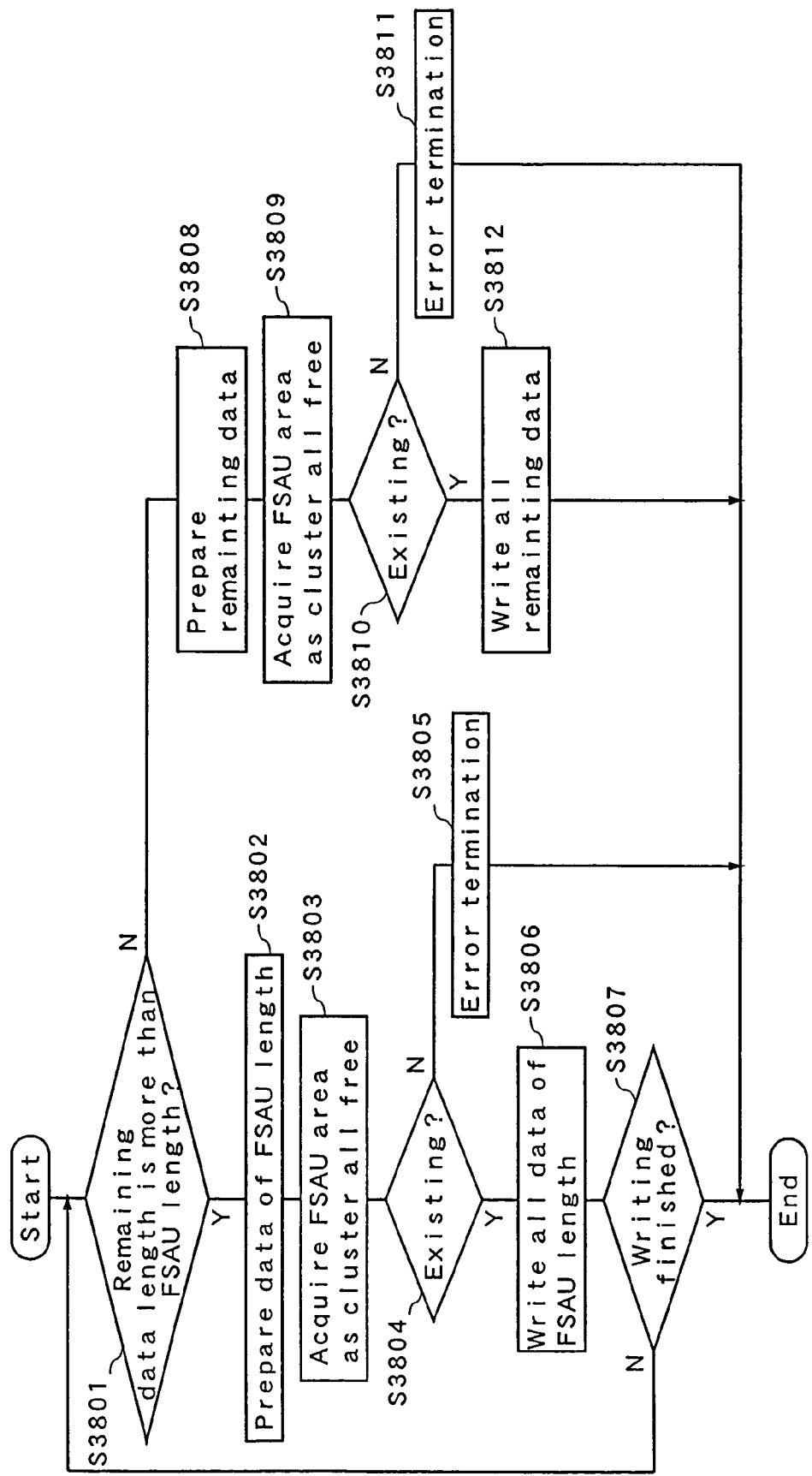
FIG. 38 is a flow chart showing the writing process of file data using the FS access unit in a second method in accordance with the second embodiment of the present invention.

Subsequently, as a second method, a method of writing file data in consideration with the FS access unit will be described. FIG. 38 is a view showing file data writing process order in this method. In the file data writing process, firstly, it is determined whether or not remaining writing data length is longer than FS access unit length (S3801). When the writing data length is less than the FS access unit length, the operation proceeds to process at S3808. When the writing data length is the FS access unit length or more, prior to writing to the semiconductor memory card 111, data of the FS access unit length is prepared (S3802). Next, the free area is searched on the FAT 3005, 3006 for each FS access unit and an area in which the area contained in the FS access unit consists of only free clusters is acquired (S3803). When no free area exists, an error is informed and the process is finished (S3804, S3805). When the free area exists, data of the FS access unit length is collectively written in the acquired free area (S3806). Next, it is determined whether or not the writing of all of the data is finished (S3807). When the writing is not finished, the operation returns to the process at S3801. When the writing is finished, the process is finished. When the remaining data length is shorter than the FS access unit at S3801, remaining data of the data length shorter than the FS access unit length is prepared (S3808). Next, as at the step S3803, an area in which the area contained in the FS access unit consists of only free clusters is acquired (S3809). When no free area exists, an error is informed and the process is finished (S3810, S3811). When the free area exists, the remaining data is collectively written in the acquired free area and the process is finished (S3812).

Here, in the file data writing process, when no free area in the FS access unit exists, writing process results in an error, however, the free area of data length smaller than the FS access unit length may be acquired and data may be written in the acquired free area.

Figure 39:
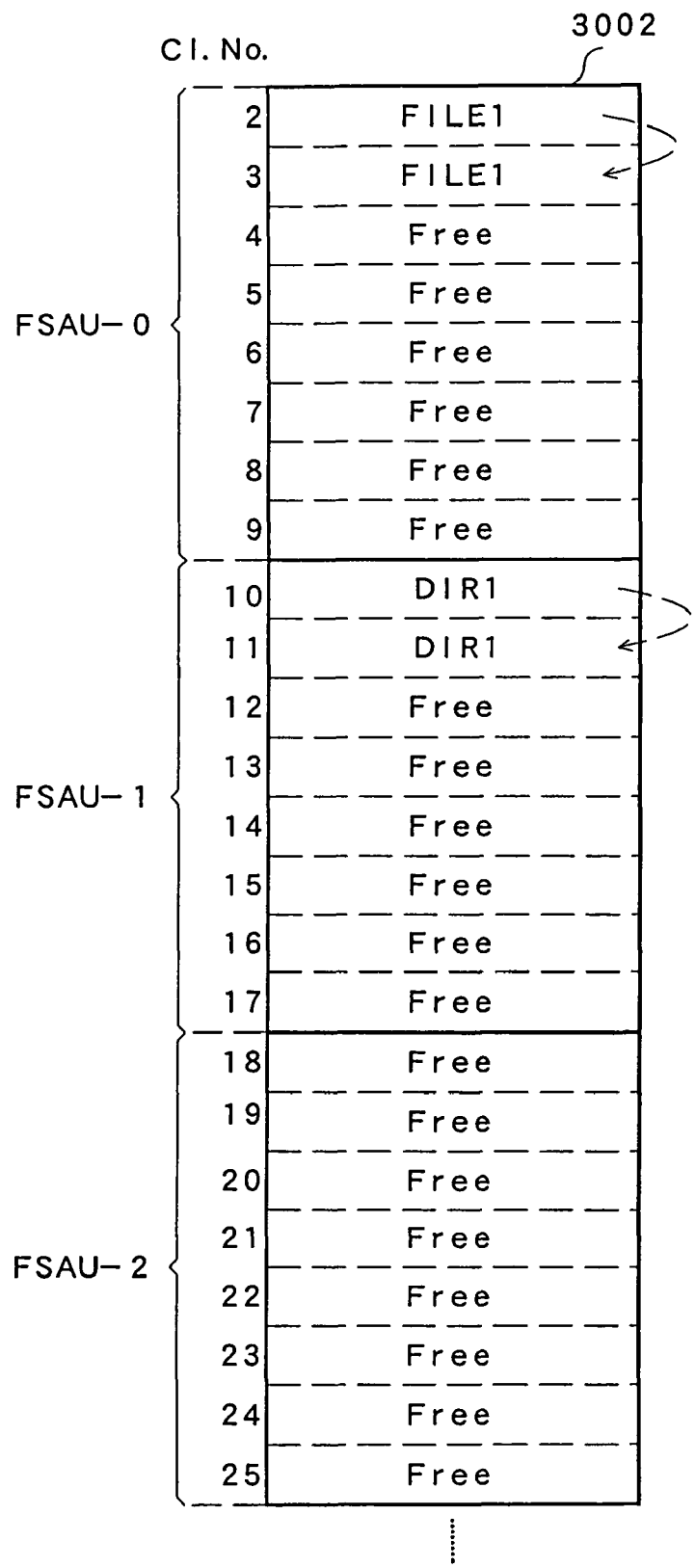
FIG. 39 is an explanation view showing an example of data arrangement in the second method in accordance with the second embodiment of the present invention.

FIG. 39 is a view showing an example of use state of the data area. In this example, data in a file FILE1 is written to the FS access unit FSAU-0 and information in a directory DIR1 is written to the FS access unit FSAU-1. In the case of such data arrangement, according to this method, an area of the FS access unit FSAU-2 (area of the cluster numbers Cl. Nos. 18 to 25) is selected as the file data writing area. In other words, areas of the FS access unit FSAU-0 and FS access unit FSAU-1 in which file data or directory information of at least 1 cluster exists are not used for the file data writing area. Therefore, since the continuous area in the FS access unit is ensured for file data having a relatively large file size, high-rate access to the semiconductor memory card 111 in suitable access units can be realized.

Figure 40:
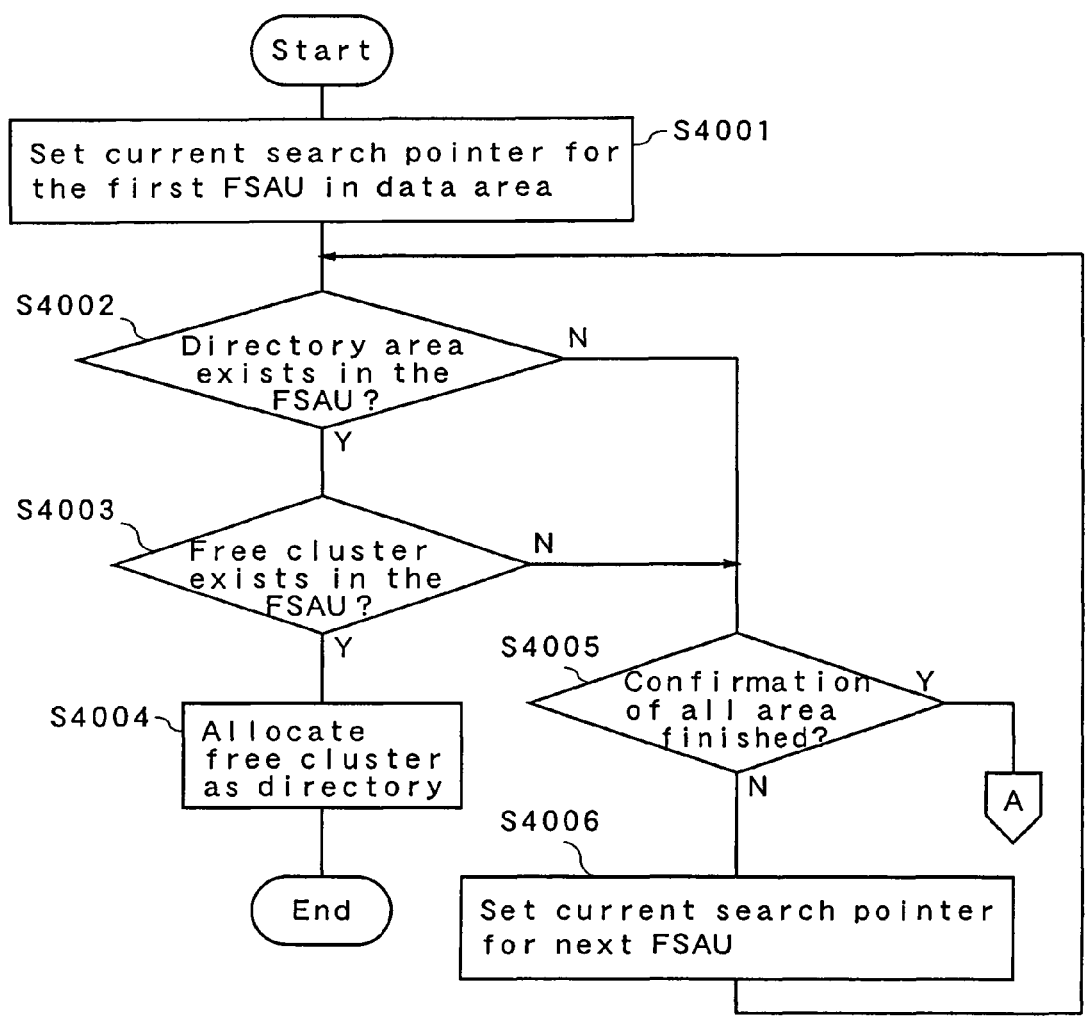
FIG. 40 is a flow chart showing the directory area allocation process using the FS access unit in a third method in accordance with the second embodiment of the present invention.
Figure 41:
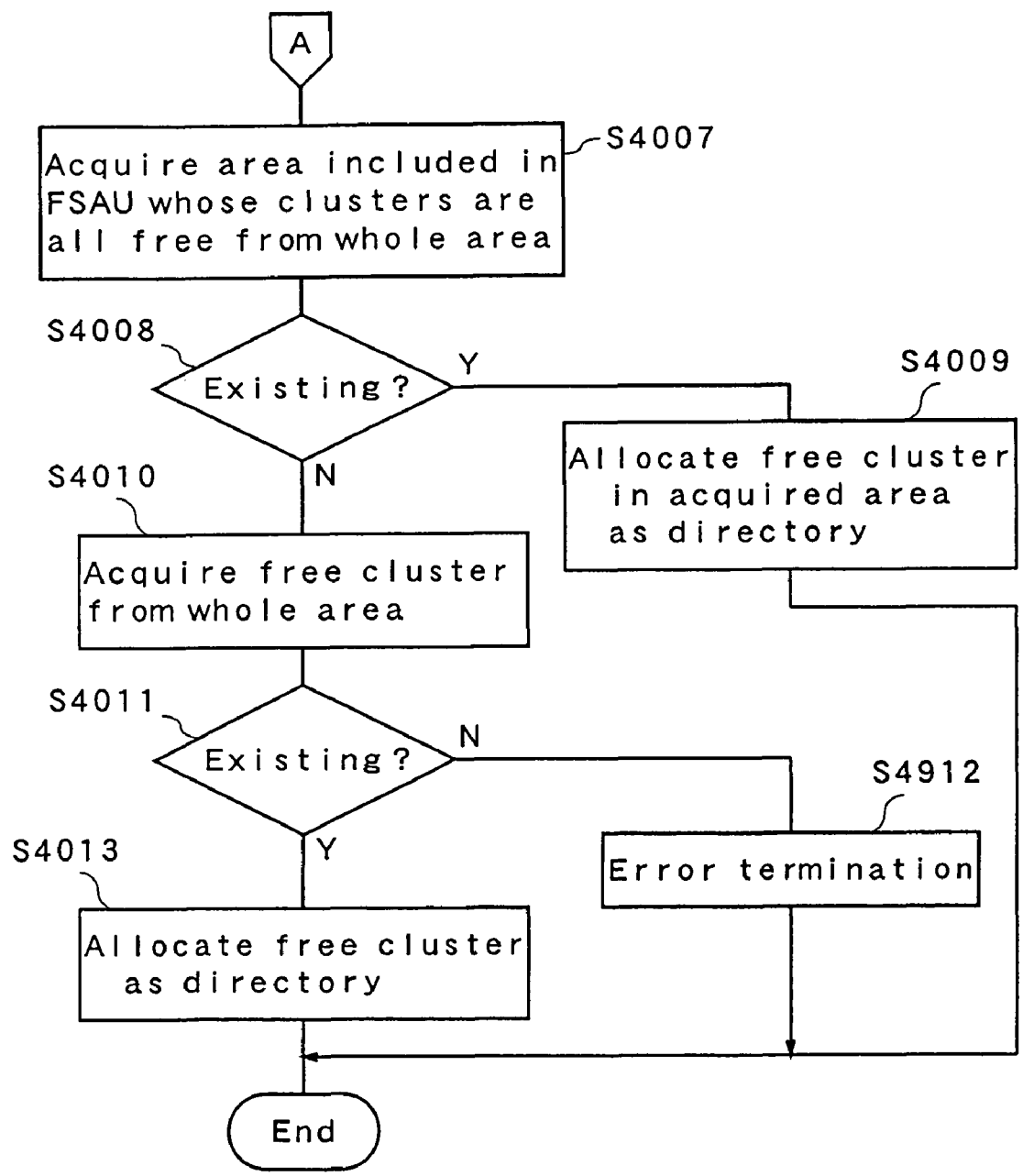
FIG. 41 is a flow chart showing the directory area allocation process using the FS access unit in the third method in accordance with the second embodiment of the present invention.

Subsequently, as a third method, a method of allocating a directory area in consideration with the FS access unit will be described. FIGS. 40 and 41 are views showing process order of directory area allocation in this method. In the directory area allocation process, firstly, a current search pointer is set for the first FSAU in the data area (S4001). Next, it is determined whether or not the directory area exists in the currently referred FS access unit (S4002). When no directory area exists, the operation proceeds to process at S4005. When the directory area exists, it is determined whether or not the free cluster exists in the currently referred FS access unit (S4003). When no free cluster exists, the operation proceeds to process at S4005. When the free cluster exists, the free cluster is allocated to the directory area and process is finished (S4004). When there is no area in the determination at S4002 and S4003, it is determined whether or not confirmation of all of the data area 3002 has been completed (S4005). When confirmation has not been completed, the current search pointer is set for the next FS access unit (S4006) and the operation returns to the process at S4002.

Then, when confirmation for the whole area is completed, in FIG. 41, an area in which the area contained in the FS access unit consists of only free clusters is acquired from the whole of the data area 3002 (S4007). When the free area exists, 1 free cluster contained in the acquired area is allocated to the directory area and process is finished (S4008, S4009). When no free area exists, the free clusters are acquired from the whole of the data area (S4010). When no free cluster exists, an error is informed and process is finished (S4011, S4012). When the free area exists, the acquired free cluster is allocated to the directory area and the process is finished (S4013).

Figure 42:
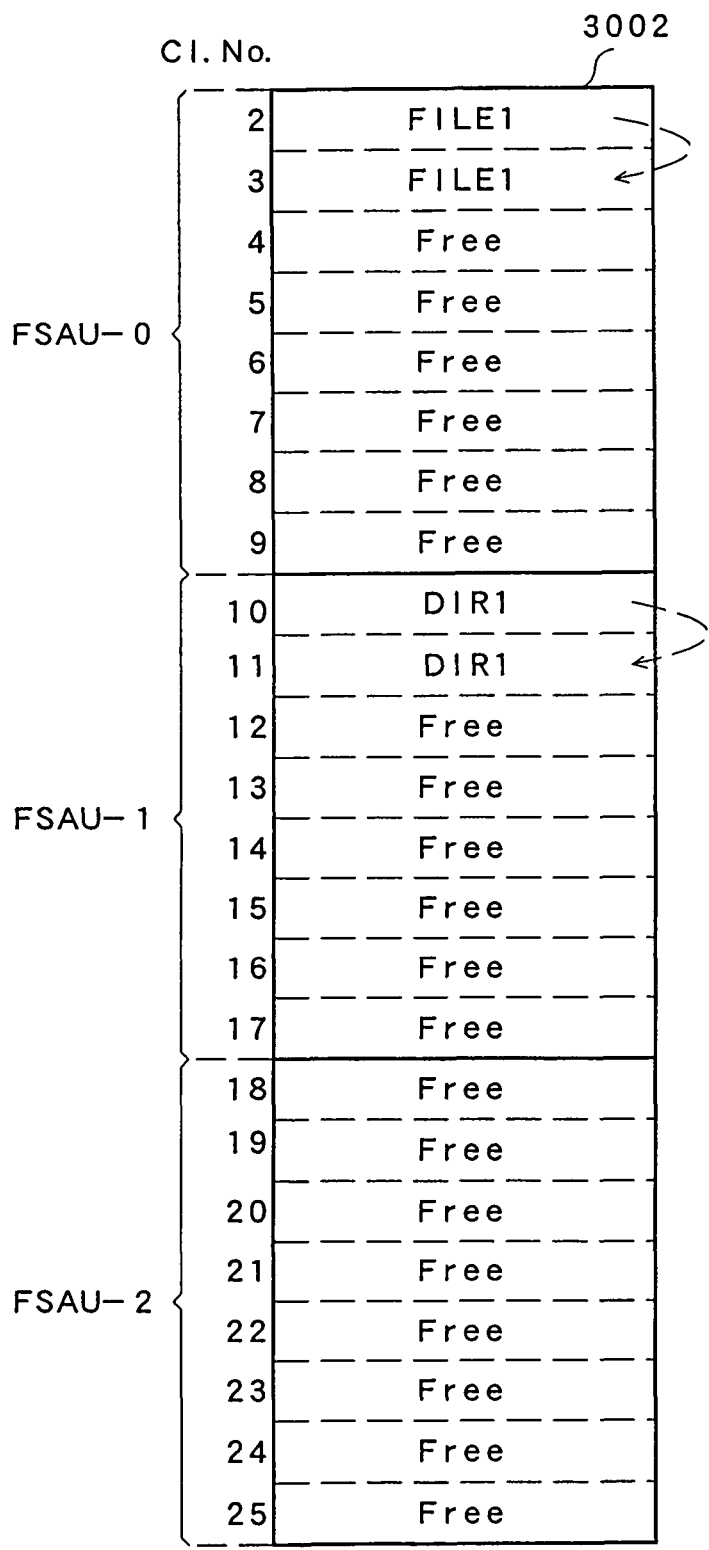
FIG. 42 is an explanation view showing an example of a data arrangement in the third method in accordance with the second embodiment of the present invention.

FIG. 42 is a view showing an example of use state of the data area. It is supposed, in the data arrangement as shown in FIG. 42, data is contained in the FS access unit FSAU-0 and the directory area is contained in the cluster numbers 10, 11 of the FS access unit FSAU-1. In this case, according to this method, the directory is allocated to the free clusters contained in the FS access unit FSAU-1, that is, cluster numbers 12 to 17. By allocating the directory area in this manner, the directory area is preferentially stored in the same FS access unit, resulting in that the free area of FS access unit length is easy to be generated. Thus, the continuous area for file data can be efficiently ensured according to the second method.

Figure 43:
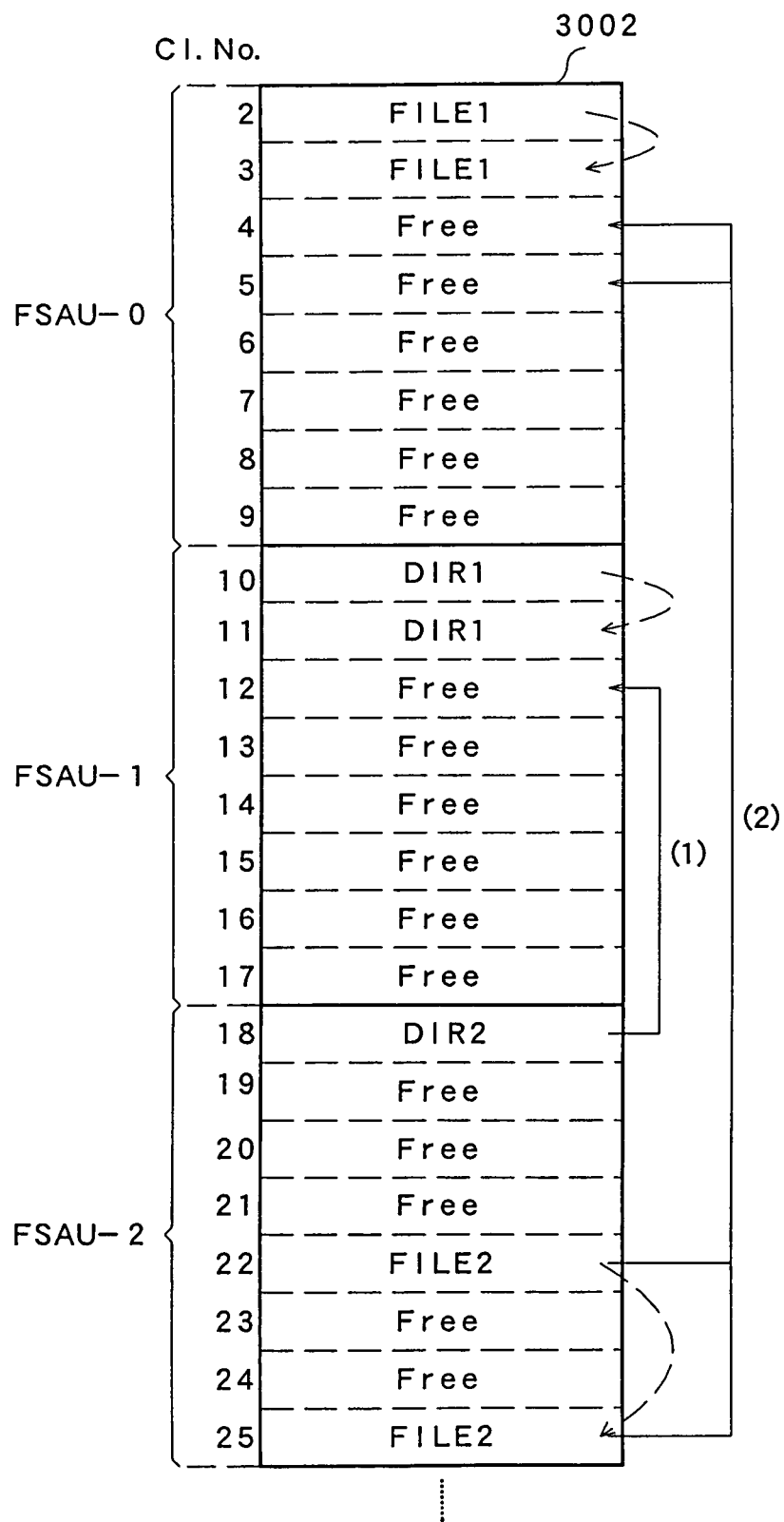
FIG. 43 is an explanation view showing an example of data arrangement before defragmentation process using the FS access unit in a fourth method in accordance with the second embodiment of the present invention.

Subsequently, as a fourth method, a method of performing defragmentation in consideration with the FS access unit will be described. Defragmentation is process in which file data arranged in distribution in the recording medium is rearranged to be arranged in the continuous area to realized high-rate access to the file data. According to this method, in this defragmentation process, defragmentation in consideration with the FS access unit is performed. FIG. 43 is a view showing an example of data arrangement before the defragmentation process. In this example, file data or directory is stored in all of the three FS access units FSAU-0, FSAU-1 and FSAU-2. Thus, in the free area acquisition process in FS access units in the second method, the free area cannot be acquired. Here, through the defragmentation process in consideration with the FS access unit, the directory area contained in the FS access unit FSAU-2 is moved to the free cluster in the FS access unit FSAU-1 and the directory area is collected in the FS access unit FSAU-1. This process is shown by (1). Furthermore, file data in the FS access unit FSAU-2 (FILE 2) is moved to the free cluster area in the FSAU-0 and the file data is collected in the FS access unit FSAU-0. This process is shown by (2). As a result, data arrangement is changed to that shown in FIG. 44, the FS access unit FSAU-2 becomes the free area, In the free area acquisition in FS access units according to the second method the acquired free area can be allocated as the free area for file data.

That is, according to this method, in the defragmentation process, by collecting the directory area in the same FS access unit and further collecting the file data smaller than the FS access unit size in the same FS access unit, the free area having a length of multiples of the FS access unit is generated to a maximum extent. Thus, the continuous area for file data can be ensured according to the second method. Furthermore, it is unnecessary to combine all areas used for storage of file data in the recording medium into 1 continuous area to make the whole free area 1 continuous area, and by performing the defragmentation process so as to generate the free area having a length of multiples of FS access unit, required time for the defragmentation process can be shortened.

Figure 45:
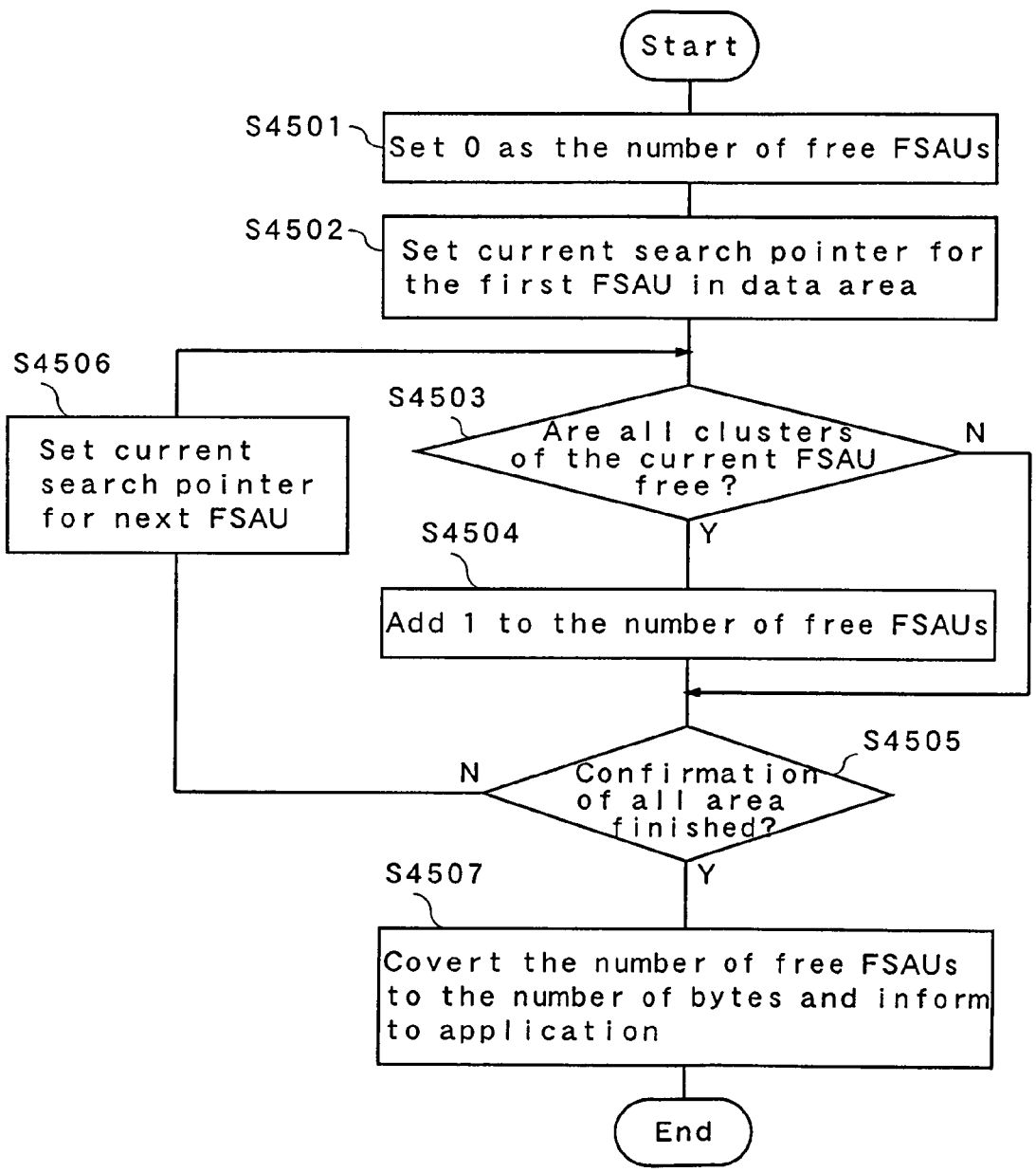
FIG. 45 is a flow chart showing the remaining free area length acquisition process using the FS access unit in a fifth method in accordance with the second embodiment of the present invention.

Subsequently, as a fifth method, a method of acquiring remaining free area length in units of FS access units will be described. FIG. 45 is a view showing remaining free area length acquisition process order in this method. In the remaining free area length acquisition process, firstly, 0 is set as a free area FS access unit number (S4501). Next, the current search pointer is set for the first FSAU in the data area (S4502). Next, it is determined whether or not all the clusters of the current FS access unit are free (S4503). When the clusters are all free clusters, 1 is added to the space FS access unit number (S4504). Next, it is determined whether or not confirmation of all areas is completed (S4505). When confirmation is not completed, the current search pointer is set for the next FS access unit and the operation returns to the process at S4503 (S4506). When confirmation is completed, a numerical value stored in the space FS access unit number is converted into the number of bytes, the number is informed to the application program 105 and process is finished (S4507).

Here, although the example in which the remaining free area length is converted into the number of bytes and the number is informed in the remaining free area length acquisition process is described, the remaining free area length may be converted into the number of sectors or clusters and the number may be informed as long as the remaining free area length can be correctly recognized.

Figure 46:
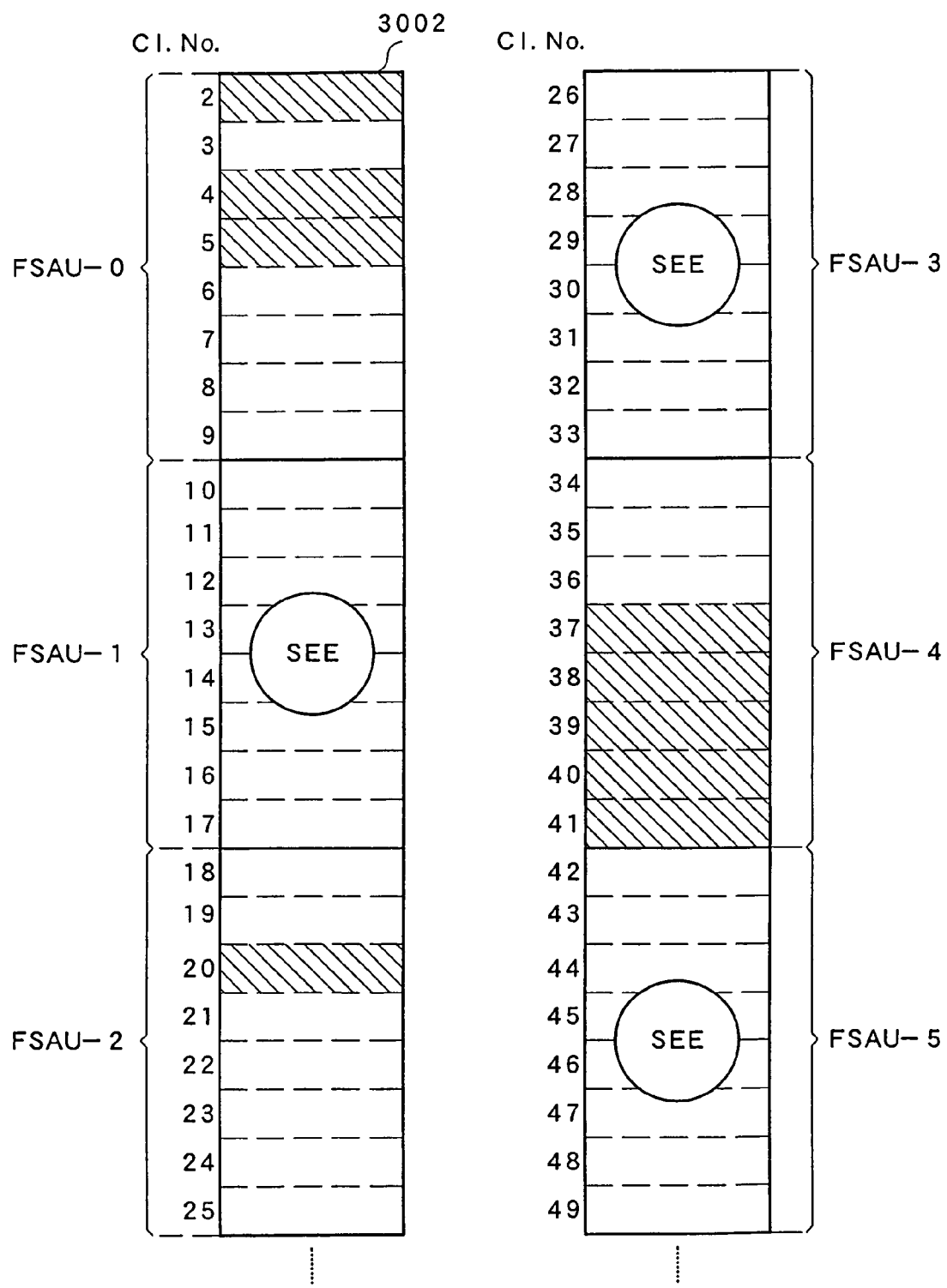
FIG. 46 is an explanation view showing an example of data arrangement in the fifth method in accordance with the second embodiment of the present invention.

FIG. 46 is a view showing data arrangement state in the data area 3002 and shows clusters in use by hatching. In the case where data is arranged in this manner, in the remaining free area length acquisition process, three continuous areas (SEE) exist as shown in the figure. Thus, three FS access units FSAU-1, FSAU-3 and FSAU-5 in which all of the areas in FS access units are free clusters are determined as free areas.

According to this method, by calculating the number of free areas having the FS access unit length and informing the number to the application program 105, the application program 105 can recognize the remaining area length of FS access unit. Whereby, it becomes possible to recognize how much remaining data can be written when access which meets access performance required by the access device 100 is performed for each FS access unit.

As described above, the access device 100 in accordance with the second embodiment acquires information on access performance from the semiconductor memory card 111, determines an optimum access unit and uses the access unit in process of the file system. Thus, the access device 100 can access the semiconductor memory card 111 according to the access method most suitable for the semiconductor memory card 111 to derive the best performance of the semiconductor memory card 111.

Figure 47:
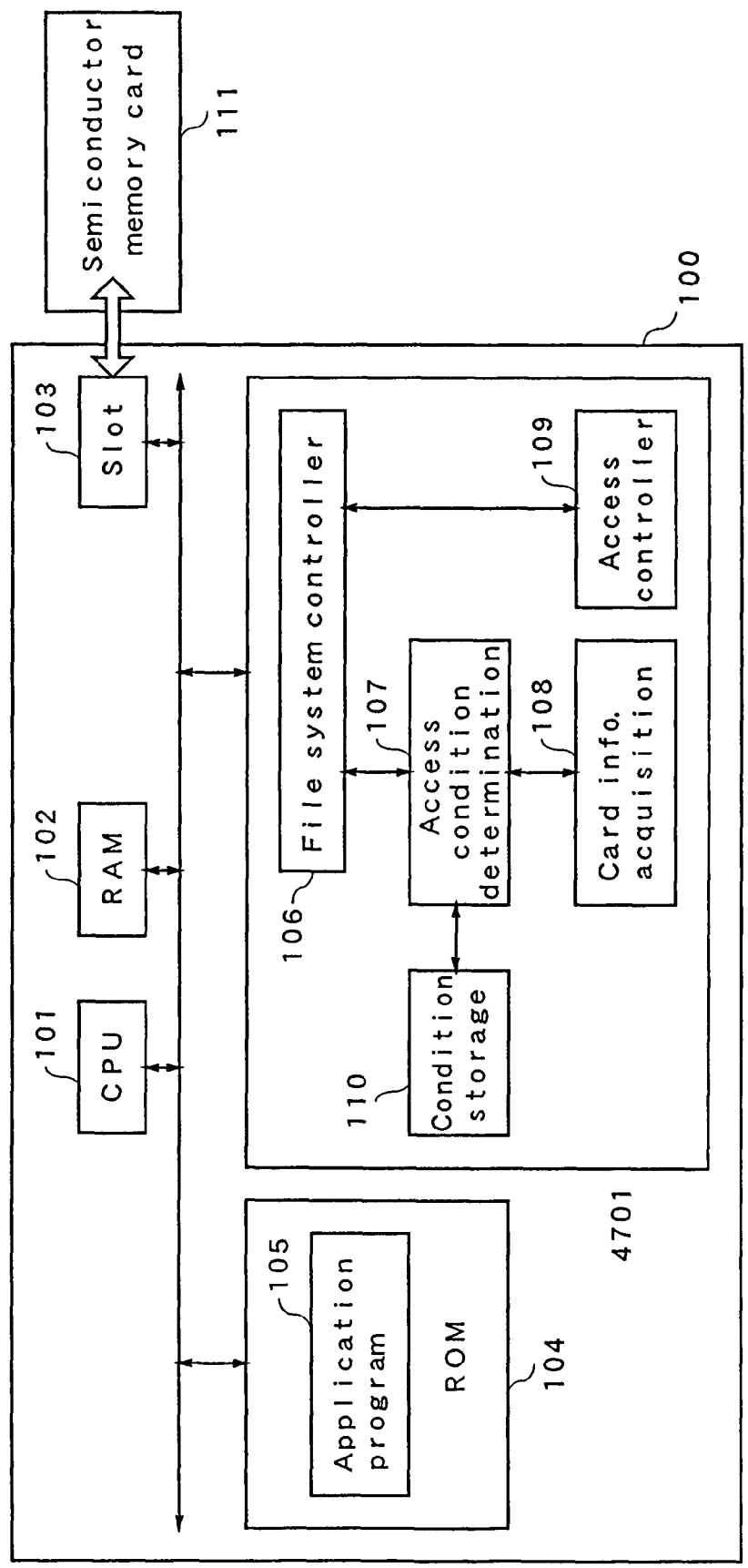
FIG. 47 is an explanation view showing another example of an access device using the semiconductor memory card control LSI in accordance with the second embodiment of the present invention.

Although the example in which the file system control part 106 and the like are realized by the programs on the ROM 104 of the access device 100 is described in the second embodiment, all or part of the functions of the programs may be added to the access device 100 as hardware. For example, as shown in FIG. 47, only the application program 105 may be stored in the ROM 104 and the file system control part 106, access condition determination part 107, card information acquisition part 108, access control part 109 and condition storage part 110 may be configured to be hardware and added to the access device 100 as a semiconductor memory card control LSI 4701. The configuration shown in FIG. 47 is merely an example, and an only part of the functions described in the present embodiment, for example, a function of automatically unifying data transfer to the semiconductor memory card 111 in FS access units and transmitting the data, may be configured as hardware by setting the FS access unit to the semiconductor memory card control LSI 4701. Furthermore, although this embodiment is described by using the FAT file system as an example of the file system, the other file systems such as UDF may be used as long as the file system performs area management for each management unit size.

INDUSTRIAL APPLICABILITY

A semiconductor memory card, access device and access method can realize high-rate access to a semiconductor memory card by optimizing process at the side of the access device or semiconductor memory card, or process at both sides. Such semiconductor memory card, and access device and method can be used in digital AV equipments, cellular phone terminals, digital cameras, PCs, etc., which use the semiconductor memory card as a recording medium. Furthermore, they work suitably especially when used in a recording medium and equipments which record high-quality AV data with high transfer rate.

The invention claimed is:

1. A semiconductor memory card which is used in connecting to an access device, comprising:
   a host interface which transmits a control signal and data to the access device and receives a signal from the access device;
   a nonvolatile memory in which a plurality of continuous sectors are grouped into an erase block as a minimum unit for data erasing and which includes an address management information area and user data area;
   a memory controller which controls erasing, writing and reading of data for said nonvolatile memory;
   a control part which controls said semiconductor memory card on the basis of the control signal acquired via said interface; wherein said semiconductor memory card further comprises;
   a memory for a card information storage including a card information storage part which stores at least
   first information on physical characteristics in said semiconductor memory card,
   second information on an access condition at the time when said access device accesses said semiconductor memory card, and
   third information on an access rate of said semiconductor memory card when said access device performs access on said access condition;
   wherein said second information includes a minimum sequential area size for sequential access.

2. The semiconductor memory card according to claim 1, wherein said card information storage part stores
   fourth information on an abnormal process of said semiconductor memory card.

3. The semiconductor memory card according to claim 1, wherein said third information in said card information storage part includes
   a flag representing rate performance of said semiconductor memory card as said information on said access rate.

4. The semiconductor memory card according to claim 1, wherein
   said control part, in response to a request from said access device, reads information on said access condition for accessing said semiconductor memory card, and information on said access rate when accessing to said semiconductor memory card on said access condition from said card information storage part, and transmits the information to said access device.

5. The semiconductor memory card according to claim 1, wherein
   said control part, in response to information on said access condition designated by said access device, reads information on said access rate when accessing the semiconductor memory card on said access condition from said card information storage part, and transmits the information to said access device.

6. The semiconductor memory card according to claim 1, wherein
   said control part, in response to information on said access rate designated by said access device, reads information on said access condition to said semiconductor memory card required to meet said access rate from said card information storage part, and transmits the information to said access device.

7. The semiconductor memory card according to claim 1, wherein
   said control part, when reading information on said access condition designated by said access device and information on said access rate from said card information storage part and accessing said semiconductor memory card on said access condition, determines whether or not the access rate is met and transmits a determination result to said access device.

8. The semiconductor memory card according to claim 1, wherein
   said card information storage part has information on said access rate of said semiconductor memory card for a plurality of levels of power consumption of said semiconductor memory card as said third information, and
   said control part, in response to a request from said access device and designation of the power consumption level, reads information on said access condition for accessing said semiconductor memory card and information on said access rate when accessing said semiconductor memory card on said access condition from said card information storage part, and transmits the information to said access device.

9. The semiconductor memory card according to claim 1, wherein
   said card information storage part has information on said access rate of said semiconductor memory card for a plurality of levels of power consumption of said semiconductor memory card as said third information, and
   said control part, in response to information on said access condition designated by said access device and designation of the power consumption level, reads information on said access rate when accessing said semiconductor memory card on said access condition and designated electrical power consumption level from said card information storage part, and transmits the information to said access device.

10. The semiconductor memory card according to claim 1, wherein
    said card information storage part has information on said access rate of said semiconductor memory card for a plurality of levels of power consumption of said semiconductor memory card as said third information, and
    said control part, in response to information on said access rate designated by said access device and designation of the power consumption level, reads information on said access condition to said semiconductor memory card required to meet said access rate from said card information storage part, and transmits the information to said access device.

11. The semiconductor memory card according to claim 1, wherein
    said card information storage part has information on said access rate of said semiconductor memory card for a plurality of levels of power consumption of said semiconductor memory card as said third information, and
    said control part reads information on said access condition designated by said access device and information on designation of the power consumption level and said access rate from said card information storage part, determines whether or not said access rate is met when accessing said semiconductor memory card on said access condition and designated electrical power level, and transmits a determination result to said access device.

12. The semiconductor memory card according to claim 1, wherein
said card information storage part has an access performance basic information list which holds various process times and process unit sizes in said semiconductor memory card according to an access method, and
in response to a request from said access device, said control part transmits said access performance basic information list to said access device.

13. The semiconductor memory card according to claim 1, wherein
said card information storage part holds an access rate in the case where an access condition containing a process unit size of said semiconductor memory card, access method and process contents is changed, and
in response to a request of said access device, said control part transmits information on said access rate to said access device.

14. An access device for accessing a semiconductor memory card in which a plurality of continuous sectors are grouped into a block as a minimum unit for data erasing and stored data is managed according to a file system comprising:
a card information acquisition part for acquiring information on an access condition as a condition at the time when said access device accesses said semiconductor memory card and an access performance which said semiconductor memory card realizes when said access device performs access on said access condition from said semiconductor memory card;
a card use condition storage part for storing information on an access condition which can be used when said access device accesses said semiconductor memory card and information on an access rate desirable for said semiconductor memory card;
an access condition determination part for determining said access condition on the basis of the information acquired by said card information acquisition part, information on access performance of said semiconductor memory card and information stored in said card use condition storage part;
a file system control part for acquiring said access condition determined by said access condition determination part and performing file access suitable for said access condition; and
an access control part for accessing said semiconductor memory card in response to an access request from said file system control part, and wherein
said access condition determination part divides an area of said semiconductor memory card in file system access units on the basis of the information on access performance acquired from said semiconductor memory card.

15. The access device according to claim 14, wherein
said file system control part, when recording file data on said semiconductor memory card, determines a continuous free area having a length of multiples of said file system access unit on the basis of management information of a file system constructed on said semiconductor memory card, and records the file data in said determined continuous free area.

16. The access device according to claim 14, wherein
said file system control part, when recording new file management information on said semiconductor memory card, determines whether or not another file management information is recorded in the area of said file system access unit on the basis of management information of the file system constructed on said semiconductor memory card and a free area for writing new file management information therein exists, and when the free area exists, determines said free area as a writing position of file management information, and records the file management information in said determined free area.

17. The access device according to claim 14, wherein
said file system control part, when the areas of a plurality of said file system access units are partially used, moves data in the used areas of partially used file system access units to an unused area of another file system access unit on the basis of management information of a file system constructed on said semiconductor memory card.

18. The access device according to claim 14, wherein
said file system control part calculates the number of areas in which the whole of said file system access unit is the free area on the basis of management information of the file system constructed on said semiconductor memory card.

19. An access method for accessing a semiconductor memory card in which a plurality of continuous sectors are grouped into a block as a minimum unit for data erasing and stored data is managed according to the file system comprising:
a card use condition storage step for storing information on an access condition which can be used when accessing said semiconductor memory card and information on an access rate desirable for said semiconductor memory card;
a card information acquisition step for acquiring information on an access condition as a condition at the time when said access device accesses said semiconductor memory card and access performance which said semiconductor memory card realizes when said access device performs access on said access condition from said semiconductor memory card;
an access condition determination step for determining said access condition on the basis of the information acquired in said card information acquisition step and information stored in said card use condition storage step; and
a file system control step for acquiring said access condition determined in said access condition determination step and accessing a file in said semiconductor memory card so as to meet said access condition;
wherein said access condition includes a minimum sequential area size for sequential access.

20. The access method according to claim 19, wherein said access condition determination step determines a file system access unit as a size used when accessing said semiconductor memory card according to said access condition.

21. The access method according to claim 20, wherein
when recording file data on said semiconductor memory card, said file system control step determines a continuous free area having a length of multiples of said file system access unit on the basis of management information of the file system constructed on said semiconductor memory card, and
the file data is recorded in said determined continuous free area.

22. The access method according to claim 20, wherein
when recording new file management information on said semiconductor memory card, said file system control step determines whether or not another file management information is recorded in the area of said file system access unit on the basis of management information of the file system constructed on said semiconductor memory card and a free area for writing new file management information therein exists, and when the free area exists, said space area is determined as a writing position of file management information and records the file management information in said determined free area.

23. The access method according to claim 20, wherein when the areas of a plurality of said file system access units are partially used, said file system control step moves data in the used areas of partially used file system access units to an unused area of another file system access unit on the basis of management information of the file system constructed on said semiconductor memory card.

24. The access method according to claim 20, wherein said file system control step calculates the size of an area in which the whole of said access unit is a free area on the basis of management information of the file system constructed on said semiconductor memory card, and the calculated value is informed as a free area length of said semiconductor memory card to an application program.

* * * * *